United States Patent [19]
Mittenthal

[11] Patent Number: 5,838,795
[45] Date of Patent: Nov. 17, 1998

[54] METHOD AND APPARATUS FOR STATISTICAL DIFFUSION IN ITERATED BLOCK SUBSTITUTION

[75] Inventor: Lothrop Mittenthal, Thousand Oaks, Calif.

[73] Assignee: Teledyne Industries, Inc., Los Angeles, Calif.

[21] Appl. No.: 888,454

[22] Filed: Jul. 7, 1997

Related U.S. Application Data

[62] Division of Ser. No. 584,523, Jan. 11, 1996.

[51] Int. Cl.⁶ ........................................................ H04L 9/28
[52] U.S. Cl. .................................. 380/28; 380/37; 380/42
[58] Field of Search ................................. 380/28, 29, 37, 380/42, 59

[56] References Cited

U.S. PATENT DOCUMENTS

| | | |
|---|---|---|
| 3,796,830 | 3/1974 | Smith . |
| 3,798,359 | 3/1974 | Feistel . |
| 3,962,539 | 6/1976 | Ehrsam et al. . |
| 4,078,152 | 3/1978 | Tuckerman, III . |
| 4,195,200 | 3/1980 | Feistel . |
| 4,255,811 | 3/1981 | Adler . |
| 4,316,055 | 2/1982 | Feistel . |
| 4,322,577 | 3/1982 | Brändström . |
| 4,520,232 | 5/1985 | Wilson . |
| 4,668,103 | 5/1987 | Wilson . |
| 4,685,132 | 8/1987 | Bishop et al. . |
| 4,751,733 | 6/1988 | Delayaye et al. . |
| 4,797,921 | 1/1989 | Shiraishi . |
| 4,932,056 | 6/1990 | Shamir . |
| 4,979,832 | 12/1990 | Ritter . |
| 5,003,596 | 3/1991 | Wood . |
| 5,038,376 | 8/1991 | Mittenthal . |
| 5,214,704 | 5/1993 | Mittenthal . |
| 5,245,658 | 9/1993 | Bush et al. . |
| 5,297,206 | 3/1994 | Orton . |
| 5,317,639 | 5/1994 | Mittenthal . |
| 5,511,123 | 4/1996 | Adams . |
| 5,623,548 | 4/1997 | Akiyama et al. . |
| 5,623,549 | 4/1997 | Ritter . |

*Primary Examiner*—Thomas H. Tarcza
*Assistant Examiner*—Pinchus M. Laufer
*Attorney, Agent, or Firm*—Blakely, Sokoloff, Taylor & Zafman

[57] ABSTRACT

A method and apparatus for inter-round mixing in iterated block substitution systems is disclosed. The method involves optimizing inter-round mixing so that each sub-block of data affects each other in the same way. This is accomplished by applying a quick trickle permutation or a quasi quick trickle permutation to blocks of data allocated to n individual substitution boxes.

9 Claims, 21 Drawing Sheets

| | | | | ROUNDS |
|---|---|---|---|---|
| A | B | C | D | 1 |
| D | A | B | C | 2 |
| C | D | A | B | 3 |
| B | C | D | A | 4 |

*FIG. 3A*

| | | | | ROUNDS |
|---|---|---|---|---|
| A | B | C | D | 1 |
| C | A | D | B | 2 |
| D | C | B | A | 3 |
| B | D | A | C | 4 |

*FIG. 3B*

| | | | | ROUNDS |
|---|---|---|---|---|
| A | B | C | D | 1 |
| C | A | D | B | 2 |
| B | D | A | C | 3 |
| D | C | B | A | 4 |

*FIG. 3C*

|   |   |   |   |   |
|---|---|---|---|---|
| A | B | C | D | E |
| E | A | B | C | D |
| D | E | A | B | C |
| C | D | E | A | B |
| B | C | D | E | A |

*FIG. 4A*

|   |   |   |   |   |
|---|---|---|---|---|
| A | B | C | D | E |
| D | A | E | C | B |
| C | D | B | E | A |
| E | C | A | B | D |
| B | E | D | A | C |

*FIG. 4B*

|   |   |   |   |   |
|---|---|---|---|---|
| A | B | C | D | E |
| E | C | A | B | D |
| B | E | D | A | C |
| D | A | E | C | B |
| C | D | B | E | A |

*FIG. 4C*

|   |   |   |   |   |   |
|---|---|---|---|---|---|
| A | B | C | D | E | F |
| C | F | B | E | A | D |
| B | D | F | A | C | E |
| F | E | D | C | B | A |
| D | A | E | B | F | C |
| E | C | A | F | D | B |

*FIG. 5A*

|   |   |   |   |   |   |
|---|---|---|---|---|---|
| A | B | C | D | E | F |
| F | E | D | C | B | A |
| D | A | E | B | F | C |
| B | D | F | A | C | E |
| C | F | B | E | A | D |
| E | C | A | F | D | B |

*FIG. 5B*

METHOD AND APPARATUS FOR STATISTICAL DIFFUSION IN ITERATED BLOCK SUBSTITUTION

This is a Divisional Application of Application Ser. No. 08/584,523, filed Jan. 11, 1996.

BACKGROUND OF THE INVENTION

1. Field of the Invention

The present invention relates generally to the field of encryption and more particularly, to a method and apparatus for inter-round mixing in iterated block substitution systems.

2. Description of the Prior Art

Encryption techniques are generally implemented in the transmission of digital information to conceal information from unintended recipients and for authenticating messages to assure the recipient of sender identity. Encryption is also used for digital signatures, to authenticate and assure the recipient that any third party could not have created the signature. As in physical security systems, encryption provides assurance of integrity including prevention of interference in the information-conveying process or failing that, detecting interference. Interference in this context includes eavesdropping, modifying, introducing misinformation, disavowing messages and falsely claiming receipt of messages.

Almost all cryptosystems involve transformation of information based on one or more keys, at least one of which must be kept secret to protect against adversaries. Block substitution is an encryption process used to encrypt a clear text message which is in the form of a sequence of binary numbers. Typically, a block substitution system consists of alternating steps of encrypting conveniently-sized sub-blocks in individual substitution boxes (S-boxes) and permuting the partly encrypted data. Substitute blocks constitute the encrypted message or cipher text, each substitute block representing a non-ambiguous one-to-one transformation of a clear text block. After dividing the block of clear text into sub-blocks and encrypting the sub-blocks, the encrypted sub-blocks are typically reassembled into a block and the bits in the full block are permuted. The resulting block is again subdivided into sub-blocks for another round of encryption. As shown in FIG. 1, this process of substitution-permutation-substitution is repeated a number of times. In conventional systems, such substitution generally takes place by means of look-up tables, switching arrangements or feedback shift registers. Mixing can also be enhanced by interactions between sub-blocks as shown in the techniques illustrated in FIGS. 2A and 2B.

There are however, two limitations in the application of such conventional techniques. First, it is time-consuming to permute the individual bits after each round. In typical systems, there may be 32 to 64 such bits to rearrange. Secondly, the permutation of bits after each round is not only the same after each round, but is usually never changed over time. The reason for this is that after such a permutation of the bits has been found to be statistically good, it is usually difficult to find another that is both as good and yet different. However, without changing the codes or substitution schemes frequently, the encryption may be more easily broken by cryptanalysis.

In addition, in permuting data, if the number of rounds is the same as the number of sub-blocks, then the sub-blocks (i.e., the contents of the S-boxes) identified, for example, as A, B, C, and D in FIGS. 3A, 3B and 3C, can be assigned to the S-boxes as shown schematically in FIGS. 3A, 3B and 3C to obtain successively more thorough mixing. Although the examples shown in FIGS. 3A, 3B and 3C are for four rounds with four sub-blocks (i.e., for 4×4 Latin square), the pattern also holds for any even number that is greater than 4.

If there are interactions between pairs of S-boxes, for example, as shown in FIGS. 2A and 2B, it is desirable that these interacting pairs be different in successive rounds. This means changing neighbors at the end of each round.

The Latin square shown in FIG. 3A provides one method of mixing whereby the sub-blocks always have the same neighbors and the same successors. The Latin square shown in FIG. 3B provides an alternate method of mixing whereby the sub-blocks always have different neighbors but the same successors. This method provides better mixing than that shown in FIG. 3A. The complete Latin square in FIG. 3C gives the most thorough mixing (as among the three methods shown in FIG. 3A–3C) since it is a row- and column-complete Latin square with different neighbors and different successors. These mixing patterns can be specified by a table, as discussed above and shown in FIGS. 3A, 3B and 3C, but this can be quite cumbersome for large numbers of sub-blocks and rounds.

There is a need in the technology for iterated block substitution systems in which the block substitution tables and pattern of inter-round mixing are changed frequently. Interactions between sub-blocks enhance the mixing process and allow for inter-round mixing in which sub-blocks rather than individual bits are permuted. In that case, the inter-round permutation of sub-blocks must ensure that pairing of sub-blocks is uniformly distributed. In addition, it is necessary in successive rounds that each sub-block of data be acted upon by each S-box. There is also a need in the technology, in the case that inter-round mixing permutes all of the individual bits rather than the sub-blocks, to find a ready source of large permutations which interchange all of the bits in a statistically unbiased fashion.

BRIEF SUMMARY OF THE INVENTION

A method and apparatus for inter-round mixing in iterated block substitution systems is disclosed. A quick trickle permutation is defined to be a permutation in which the spacings $a_i$ from the location of element $i$ to the location of element i+1 are all different. A finite group (G, ∘) with group elements $a_0=e$ (the identity), $a_1, a_2, \ldots a_{n-1}$ and group operation "∘" is sequenceable if the group elements can be arranged in such an order that the partial sums (products) $b_0=a_0, b_1=a_0 \circ a_1, b_2=a_0 \circ a_1 \circ a_2$, etc., are all different. The ordered set $a_0, a_1, a_2, \ldots$ is called a sequencing, and the set of partial sums $b_0, b_1, b_2, \ldots$ is called a directed terrace.

A finite group (G, ∘) with group elements $a_0=e$ (the identity), $a_1, a_2, \ldots, a_{n-1}$ and group operation "∘" is quasi-sequenceable if an ordered set can be found in which each $a_i$ occurs twice, or $a_i$ and $a_i^{-1}$ each occurs once, or $a_i^{-1}$ occurs twice and if the set of partial sums (products) $b_i$, as defined above, are all different. The ordered set $a_0=e$ (the identity), $a_1, a_2, \ldots$ is called a quasi-sequencing, and the set of partial sums $b_0, b_1, b_2, \ldots$ is called a terrace. A quasi-quick trickle permutation is defined to be one in which the set of spacings, $a_i$, as defined above, are a quasi-sequencing.

Quick trickle and quasi trickle permutations can be used for inter round permutations of sub-blocks or individual bits (bit transposition) to obtain respectively row completeness or quasi row completeness in Latin squares. Sequencing, quasi-sequencing, directed terraces and terraces can be used as sets of exponents of the permutations, each to be used after a different round, to obtain column completeness or quasi column completeness in a Latin square. Such Latin squares are optimal statistical mixing qualities. Quasi sequencings are more common than sequencings, but the former can be used to find the latter.

Efficient mechanisms for finding Quick Trickle permutations, sequencings and directed terraces are disclosed. These permutations, sequencings and directed terraces provide thorough and varied mixing patterns for encryption. Various properties of the permutations, sequencings and directed terraces and methods of applying them are disclosed.

BRIEF DESCRIPTION OF THE DRAWINGS

FIG. 3A is a table illustrating a 4×4 Latin square with the same neighbors and the same successors.

FIG. 3B is a table illustrating a 4×4 row-complete Latin square with different neighbors and the same successors.

FIG. 3C is a table illustrating a 4×4 row- and column-complete (or complete) Latin square with different neighbors and different successors.

FIG. 4A is an 5×5 Latin square having the same neighbors, the same successors and predecessors.

FIG. 4B is a table illustrating a 5×5 quasi row-complete Latin square having the same successors and predecessors and in which each pair of neighbors, without regard to order, occurs twice.

FIG. 4C is a table illustrating a 5×5 quasi complete Latin square in which each pair of neighbors and successors or predecessors, without regard to order, occurs twice.

FIG. 5A is a table illustrating a 6×6 row-complete Latin square.

FIG. 5B is a 6×6 row-complete, quasi column-complete Latin square.

DETAILED DESCRIPTION OF THE INVENTION

Figure 1:
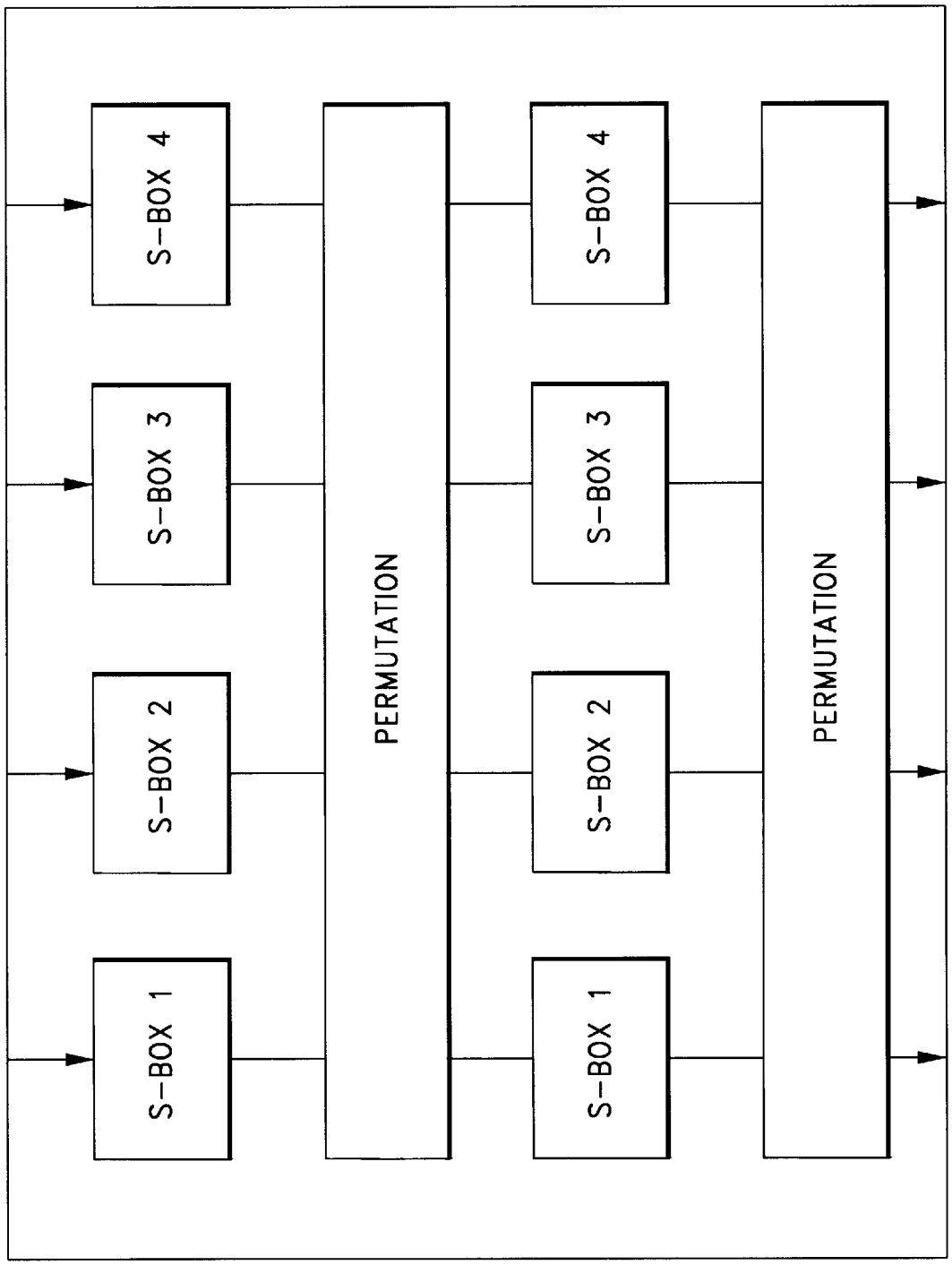
FIG. 1 is a block diagram illustrating the substitution/permutation (S/P) method of encrypting data.

The present invention relates to apparatus and methods for encryption of data based on inter-round mixing using quick trickle permutations in iterated block substitution systems.

I. Theory of Operation

As known in the technology, the permutation of n distinguishable objects or elements are each different arrangement of the elements. Thus, the number of permutations of n elements is $n(n-1)(n-2)\ldots(3)(2)(1)=n!$. The symbol $_nP_n$ is generally used to indicate this result. If the n elements are taken r at a time, where r<n, then $_nP_r=n(n-1)(n-2)\ldots(n-r+1)=n!/(n-r)!$ In the present invention, a quick trickle permutation is defined to be a permutation in which the spacings $a_i$ from the location of element i to the location of element i+1 are all different. With reference to FIG. 3A, the second row in the table of FIG. 3A can be obtained by shifting the sub-blocks in the first row one position to the right after each round of permutation. This is equivalent to employing the permutation p=(1 2 3 4) to the contents of S-boxes 1, 2, 3, and 4 at the end of each round. This process of shifting the sub-blocks as described above may be equivalently performed by applying successive powers of p to the original arrangement in Round 1, i.e.,

| | |
|---|---|
| $p^0 = (1)(2)(3)(4)$ | Round 1 |
| $p = (1\ 2\ 3\ 4)$ | Round 2 |
| $p^2 = (1\ 3)(2\ 4)$ | Round 3 |
| $p^3 = (1\ 4\ 3\ 2)$ | Round 4 |

That is, $p^0$ is applied to the sub-blocks A, B, C, D respectively of row 1 in round 1, so that the sub-blocks are located in S-box 1, 2, 3 and 4 respectively. To obtain row 2, the permutation p=(1 2 3 4) is applied to the sub-blocks A, B, C and D of row 1 in round 2. To obtain row 3, the permutation $p^2$=(1 3)(2 4) is applied to the sub-blocks of row 1, in round 3. To obtain row 4, the permutation $p^3$=(1 4 3 2) is applied to the sub-blocks in row 1, in round 4. As $a_i$ is defined as the spacing or separation from element i to element i+1 in the permutation, then for p=(1 2 3 4), $a_1$=1, $a_2$=1, and $a_3$=1, that is, the spacing from 1 to 2 is 1; the spacing from 2 to 3 is 1; and the spacing from 3 to 4 is 1. Thus, the spacings $a_i$ from the location of element i to the location of element i+1 are all the same. Similarly, for $p^3$=(1 4 3 2), $a_i$=3 in all cases. These are not quick trickle permutations.

To generate a row-complete Latin square as shown in FIG. 3B, a permutation is needed in which the spacings between originally adjacent numbers, i.e., the integers in their natural order, are all different.

Consider g=(1 2 4 3) where the spacing from 1 to 2 is $a_1$=1, the spacing from 2 to 3 is $a_2$=2, and the spacing from 3 to 4 is $a_3$=3 (using the convention of measuring from left to right). Thus, g is a quick trickle permutation. Applying g to the contents of S-boxes 1, 2, 3 and 4 at the end of each round produces the row-complete Latin square illustrated in FIG. 3B.

Equivalently, one could apply successive powers of g to the original arrangement in round 1, i.e.:

| | |
|---|---|
| $g^0$ = (1) (2) (3) (4) | Round 1 |
| g = (1 2 4 3) | Round 2 |
| $g^2$ = (1 4) (2 3) | Round 3 |
| $g^3$ = (1 3 4 2) | Round 4 |

Furthermore, the complete Latin square in FIG. 3C can be obtained by permuting the rows in FIG. 3B. This can be accomplished directly by applying successively, to the rows in FIG. 3C:

| | |
|---|---|
| g = (1 2 4 3) | to the contents of the S-boxes (shown in row 1) after Round 1 (to obtain the arrangement as shown in row 2); |
| $g^2$ = (1 4) (2 3) | to the contents of the S-boxes (shown in row 2 after Round 2 (to obtain the arrangement as shown in row 3); and |
| $g^3$ = (1 3 4 2) | to the contents of the S-boxes (shown in row 3 after Round 3 (to obtain the arrangement as shown in row 4). |

Equivalently, one could apply the following powers of g to the original arrangement in round 1, i.e.:

| | |
|---|---|
| $g^0$ = (1) (2) (3) (4) | Round 1 |
| g = (1 2 4 3) | Round 2 |
| $g^2 \circ g = g^3$ = (1 3 4 2) | Round 3 |
| $g^3 \circ g^2 \circ g = g^2$ (1 4) (2 3) | Round 4 | where the symbol "∘" means composition of the permutations. Note that the sequence of powers applied to g is (0 1 3 2). This sequence (i.e.,(0 1 3 2) is applied to the original S-box arrangement and (0 1 2 3) is applied to the successive contents of the S-box.

As described earlier, the permutations, known as quick trickle permutations, applied in each the above-cited examples have distinct spacings. The present invention describes the apparatus and methods of generating and applying quick trickle permutations to provide mixing patterns in iterated block substitution systems.

II. Generating Quick Trickle Permutations

As described earlier, a quick trickle permutation is one in which the spacings $a_i$ from the location of element i to the location of element i+1 are all different. More generally, consider a signal processing block substitution system of n=2s sub-blocks and n rounds. By definition, a quick trickle permutation will be characterized by a set of n−1 spacings, $a_1, \ldots, a_{n-1}$, where the spacings are all different. The trivial spacing of 1 to itself, that is, $a_0 \equiv 0$, is included in the permutation. The set of integers $\{a_0, a_1, a_2, \ldots, a_{n-1}\}$ is thus an ordered arrangement or permutation of the n integers $\{0, 1, 2, \ldots, n-1\}$, that is, the integers modulo n. This is the group $Z_2^n$ with the group operation of addition modulo n.

Proposition 1: In a quick trickle permutation of the integers (1, 2, . . . ,n=2s), the net spacing from 1 to n is s.

The foregoing proposition is established by the following analysis. The net spacing in the quick trickle permutation from the initial integer 1 to the integer j+1 is defined as:

$$b_j = \sum_{i=0}^{j} a_i \bmod n.$$

This set of partial sums of integers mod n, in some arbitrary order, will, generally, not be distinct; however, if the spacings $a_i$ are defined by a quick trickle permutation, $b_i$ must be distinct, otherwise, two or more numbers would occupy the same position relative to 1. In addition, since the order of addition is immaterial, for n=2s:

$$b_{n-1} = \sum_{i=0}^{n-1} a_i = \sum_{i=0}^{n-1} i = \frac{n(n-1)}{2} = \frac{n(n-2)}{2} + \frac{n}{2} \equiv s \bmod n. \quad \text{Eqn. (1)}$$

An immediate corollary of the foregoing is that if g is a quick trickle permutation and k is an integer where GCD (k,n)=1, then $g^k$ is also a quick trickle permutation. If not, there would be a pair of spacings $a_1 \neq a_j$ such that $ka_i \equiv ka_j$ mod n, or $k(a_i - a_j) = cn$ for some positive integer c. Then, k divides c and $$a_i - a_j = \frac{c}{k} n > n$$

which is not possible.

Thus, any quick trickle permutation defines a group of permutations in which those without subcycles are also quick trickle permutations. For those powers yielding permutations with cycles, all spacings $a_i$ are not defined, but for those which are defined, the spacings $a_i$ are all different.

A. Sequenceable Groups

Quick trickle permutations are related to sequenceable groups.

A finite group (G, ∘) with group elements $a_0$=e (the identity), $a_1, a_2, \ldots a_{n-1}$ and group operation "∘" is sequenceable if the group elements can be arranged in such an order that the partial sums (products) $b_0 = a_0, b_1 = a_0 \circ a_1, b_2 = a_0 \circ a_1 \circ a_2$, etc., are all different. The ordered set $a_0, a_1, a_2, \ldots$ is called a sequencing, and the set of partial sums $b_0, b_1, b_2, \ldots$ is called a directed terrace.

As known in the technology, the groups of integers modulo n, $Z_n$, for n even with addition modulo n as the group operation, are sequenceable. In the case of quick trickle permutations, the ordered set of distinct spacings $\{a_i\}$ is a sequencing. The fact that they are derived from a permutation guarantees that the partial sums are directed terraces.

B. Applications to Inter-Round Mixing

Quick Trickle Permutations, sequenceable groups and directed terraces may be applied to the process of inter-round mixing as follows.

First, the use of Quick Trickle Permutations in inter-round mixing will be described. For n=2s and n rounds of encryption with n S-boxes, one may select any quick trickle permutation on n integers for encrypting data. Examples of Quick Trickle Permutations are listed in the Appendix. The positions of the S-boxes are the same in each round. For the present discussion and in a first example, the permutation is used at the end of each round to assign the output of a given S-box as the input to another S-box. For example, if the permutation is:

$$g = (c_1, c_2, \ldots c_n)$$

where normally $c_1$=1, then the output of S-box $c_i$ becomes the input to S-box $c_{i+1}$. This same permutation would be used at the end of each round. Equivalently, one could track and control the sub-blocks of data as they are partially encrypted in each round and pass through the system. For convenience, one may order the sub-blocks initially as 1,2,3, . . . ,n; the same as the S-boxes. At the end of round 1, the sub-blocks are permuted by the permutation g. At the end of the second round, the initial order is permuted by $g^2$, and so on until at the end of the (n−1)th round, the initial order is permuted by $g^{n-1}$. As noted earlier, this produces a row-complete Latin square but the columns of sub-blocks, that is, the sequence in which the sub-blocks pass through each S-box is the same except for the starting point.

Next, an application of sequencings to inter-round mixing will be described. FIG. 3B is a table illustrating a 4×4 row-complete Latin square with different neighbors and the same successors. FIG. 3C is an example where the rows as generated above in the row-complete Latin Square are left unchanged but the order of the rows is changed. If the rows are labeled $1,2,3,\ldots,n,$ consecutively, the order has to be permuted in such a way that the spacings between the formerly adjacent rows are now all different. This can be accomplished through the use of a sequencing, where the new arrangement of the original row order is a quick trickle permutation. Since the original row order was determined by the sequence of powers of $g: g^0, g^1, g^2, g^3, \ldots, g^{n-1}$ where $g^0 \equiv I$, the identity permutation $(1)(2)\ldots(n)$, it is necessary only to change each of the exponents of the permutations to obtain the sequence of permutations:

$$g^0, g^a, g^{a_2}, \ldots, g^{a_{n-1}}$$

where $\{0, a_1, a_2, \ldots, a_{n-1}\}$ is a sequencing.

Thirdly, the use of directed terraces to inter-round mixing will be described. Instead of applying permutations successively at the end of each round, one may apply them cumulatively to the original order, $1,2,3,\ldots,n$. In this case, the following is used:

$$g^0, g^0 \circ g^{a_1} = g^{b_1}, g^0 \circ g^{a_1} \circ g^{a_2} = g^{b_2}, \ldots$$

where the sequence of exponents $\{0, b_1, b_2, \ldots b_{n-1}\}$ is a directed terrace.

The above methods will be discussed in detail in the following sections.

C. Quasi-Complete Latin Squares and Quasi-Quick Trickle Permutations

Complete Latin squares do not exist for all values of n. A sufficient condition for the existence of a complete Latin square is that there exists a sequenceable group of order n. Commutative (Abelian) sequenceable groups of odd order do not exist. Inter-round mixing involves n×n arrays (or n×cn where c is an integer). The arrangement of the n S-boxes and n rounds can be represented by $Z_n$, the group of integers modulo n. As discussed earlier, the n×n array cannot be a row-complete Latin square if n is odd. However, it may well be desirable to use an odd number of S-boxes in a block substitution system. In this case, a substitute for the complete Latin square is the quasi-complete Latin square.

An n×n Latin square is said to be quasi-row-complete if the pairs of adjacent elements which occur in the rows include each unordered pair of distinct elements exactly twice. It is called quasi-column-complete if the adjacent (succeeding or preceding) pairs of elements in the columns include each unordered pair of distinct elements exactly twice. A Latin square is called quasi-complete if it is both quasi-row-complete and quasi-column-complete. (See FIGS. 4A, 4B and 4C.)

A finite group (G, $\circ$) with group elements $a_0 = e$ (the identity), $a_1, a_2, \ldots, a_{n-1}$, and group operation "$\circ$" is called quasi-sequenceable if a sequence of n group elements can be found, starting with $a_0 = e$ and with each other group element $a_i$ either occurring twice, or $a_i$ and $a_i^{-1}$ each occurring once, or $a_i^{-1}$ occurring twice, such that the partial sums (products) $\{b_i\}$ consist of each of the group elements exactly once. The sequence of distinct elements $\{b_i\}$ is called a terrace and the sequence of elements from $\{a_i\}$, some duplicated, some missing, is called a quasi-sequencing.

The quasi-sequencing defines a permutation with pairs of spacings that are equal, or complementary modulo n. Observe that while sequencings and direct terraces do not exist for n odd, for n even, both sequencings and quasi-sequencings exist. For example with n=6; the permutation p=(1 5 4 2 3 6) has quasi-sequencing $\{0\ 3\ 1\ 4\ 5\ 4\}$, where 0+0=0 and 3+3=0 mod 6. Note that 0 and 3 both appear once, and 1 and $1^{-1}=5$ appear as a pair, and $4=2^{-1}$ appears twice. The corresponding terrace is $\{0\ 3\ 4\ 2\ 1\ 5\}$. On the other hand, g=(1 5 4 6 2 3) has sequencing $\{0\ 4\ 1\ 3\ 5\ 2\}$ and directed terrace $\{0\ 4\ 5\ 2\ 1\ 3\}$. Applying the permutation g successively produces the row-complete Latin square in FIG. 5A. Now one may take a succession of powers of g, using as exponents, the quasi-sequencing corresponding to the permutation p:

$$g^0 = (1)(2)(3)(4)(5)(6)$$
$$g^3 = (1\ 6)(2\ 5)(3\ 4)$$
$$g = (1\ 5\ 4\ 6\ 2\ 3)$$
$$g^4 = (1\ 2\ 4)(3\ 6\ 5)$$
$$g^5 = (1\ 3\ 2\ 6\ 4\ 5)$$
$$g^4 = (1\ 2\ 4)(3\ 6\ 5)$$

Applying this succession of permutations, one obtains the hybrid Latin square in FIG. 5B which is row complete and quasi-column complete. As applied to inter-round mixing, this gives a great variety of patterns to use in cryptographic algorithms.

As used in the present invention, the permutations associated with quasi-sequencings are called "quasi quick trickle" permutations as distinguished from the "quick trickle" permutations associated with sequencings.

The methods described in relation to the present invention of generating quick trickle permutations, quasi-quick trickle permutations, sequencings, quasi-sequencings, directed terraces and terraces, may readily be carried out with a microprocessor-based system under program control. Alternatively, memory could readily be preprogrammed in read only memory used essentially as look-up tables.

D. Searching for Sequencings

Since any sequencing defines a quick trickle permutation and vice versa, one approach in obtaining sequencings would be to examine arbitrary permutations and to reject those permutations that do not qualify. There are n! permutations of the integers $1, 2, \ldots, n$; however, without loss of generality, one can specify the integer 1 in the leftmost position, leaving (n−1)! possibilities. For a quick trickle permutation, the integer n always appears $$s = \frac{n}{2}$$

positions to the right of 1,
leaving (n−2)! possibilities. This is similarly so for the directed terrace, since the first number is 0 and the last number is $$b_{n-1} = \frac{n}{2} = s.$$

There are other restrictions that reduce the number of possibilities. For example, in the sequencing $\{a_0=0, a_1, a_2, \ldots a_{n-1}\}$, there can be no subset of consecutive numbers which sum to 0 mod n, which is the same as saying that no such subset is an unequal partition of n, 2n, ..., (s−1)n. If there were such a partition, two of the partial sums $b_i$ would be the same. Similarly, no partial sum $b_i$=s mod n is possible since s would not be the last term in the directed terrace. These rules are helpful in eliminating possible candidates for quick trickle permutations but not in constructing them. However, one such sequence that is known to be a directed terrace for any n=2s is:

$\{0, n-1, 1, n-2, 2, n-3, 3 \ldots\}$

The corresponding sequencing is:

$\{0, n-1, 2, n-3, 4, n-5, 6, \ldots\}$ and the corresponding quick trickle permutation is:

$g = (1, 3, 5, \ldots, n-1, n, n-2, \ldots, 2)$

Another simple example of a quick trickle permutation is:

$p = (1, 2, 4, 6, \ldots, n, n-1, n-3, \ldots, 3)$ Eqn. (2)

where $a_i = i$ for i odd and $a_i = n-i$ for i even. For $n = 2s$, the $a_i$ are all different, and since they are derived from a permutation, the $$b_i = \sum_{j=0}^{i} a_j$$

must all be distinct. Also, $g = p^{n-1} = (1, 3, 5, \ldots, n-1, n, n-2, \ldots, 2).$ As pointed out above, a prospective permutation of the integers $0, 1, 2, \ldots, n-1$ with addition modulo $n = 2s$ cannot be a sequencing unless no subset of consecutive numbers is an unequal partition of a multiple of n, less than or equal to $(s-1)n$. It is tempting to examine as a candidate for spacings $a_i = i$ where $0 \leq i \leq n-1$, that is, the possibility that $(0, 1, 2, 3, \ldots, n-1)$ is a sequencing under addition modulo n.

Proposition 2: For $n = 2s$, the sequence $\{0, 1, 2, \ldots, n-1\}$ is a sequencing if and only if $n = 2^k, k > 0$.

The foregoing proposition is established by the following analysis. For $b > a$, let $\{0, 1, 2, \ldots, b\}$ and $\{0, 1, 2, \ldots, a\}$ be two subsets of $\{0, 1, 2, \ldots, n-1\}$. This latter complete sequence cannot be a sequencing if $$\sum_{i=0}^{b} i - \sum_{i=0}^{a} i = cn \equiv 0 \bmod n.$$

From Eqn. (1), page 14, line 20, $c \leq s-1$, that is, $$\frac{n(n-2)}{2}$$

is the largest partial sum which is an integral multiple of n.

$$\sum_{i=0}^{b} i - \sum_{i=0}^{a} i = \frac{b(b+1)}{2} - \frac{a(a+1)}{2} = \frac{(b-a)(b+a+1)}{2}$$

Let $b - a = d \leq n-1$ and assume that for some $c \leq s-1$, $(b-a)(b+a+1) = 2cn$, then:

$$b + a + 1 = \frac{2cn}{d} \text{ and}$$

$$b = \frac{cn}{d} + \frac{d-1}{2}$$

If b is an integer less than n, $\{0, 1, 2, \ldots, n-1\}$ is not a sequencing.

Case 1: $n = 2^k$ $d \leq n-1$. If d is odd, and $d/c$, then $$\frac{cn}{d} \geq n.$$

If $d \chi c$, then $$\frac{cn}{d}$$

is not an integer but $$\frac{d-1}{2}$$

is an integer.

Thus, b is not an integer. If d is even, then $$\frac{d-1}{2}$$

can be expressed as an integer $+\frac{1}{2}$; however, since $d < n$, either $$\frac{cn}{d}$$

is an integer or an integer plus a fraction with an odd denominator. Again, b is not an integer and so $\{0, 1, 2, \ldots, n-1\}$ is a sequencing.

Case 2: $n = e2^l$ where e is odd, $3 \leq e \leq \frac{n}{2}, l \geq 1, n \geq 6.$ Let $d = e$ and $c = 1$. Then $$b = \frac{cn}{d} + \frac{d-1}{2} = 2^L + \frac{e-1}{2}$$

which is an integer.
We can write:

$2^l = 2 + \alpha$ for $\alpha \geq 0$.
$e = 2 + \beta$ for $\beta \geq 1$
$(2 + \alpha) + (2 + \beta) = 4 + \alpha + \beta$
$(2 + \alpha)(2 + \beta) = 4 + 2\alpha + 2\beta + \alpha\beta \geq 4 + 2\beta \geq 4 + \alpha + \beta.$ Thus:

$$b = 2^l + \frac{e-1}{2} < 2^l + e < e2^l = n$$

so that $\{0, 1, 2, \ldots, n-1\}$ is not a sequencing.

Another aid in generating quick trickle permutations is to note that if $\{a_0, a_1, a_2, \ldots, a_{n-1}\}$ is a sequencing, then $\{a_0, a_{n-1}, a_{n-2}, \ldots, a_2, a_1\}$ will also be a sequencing. Conversely, if a sequence is not a sequencing, then the sequence in reverse order also is not a sequencing. This is simply because addition modulo n is associative. Note that $$\sum_{i=b}^{c} a_i = \sum_{i=c}^{b} a_i.$$

There are some patterns which occur in groups of permutations. Since $n = 2s$, $a_i = s$ for some index i in the sequencing corresponding to a quick trickle permutation g. For $GCD(k, n) = 1$ and $k < n$, the permutation and its kth power can be written:

$$g = (1, c_1, c_2, \ldots, c_{n-1})$$

$$g^k = (1, d_1, d_2, \ldots d_i, \ldots d_{n-1}).$$

$c_k = d_1, c_{2k} = d_2$, etc. In general, if $c_i = d_l$ then $kl \equiv i \mod n$. Similarly, if $c_j = d_m$, then $km \equiv j \mod n$. The spacings between these pairs of numbers $c_i \to c_j$, is (j-i) in g and $d_l \to d_m$ is (m-l) in $g^k$. (j-i)$\equiv$(m-l)k mod n. In particular, the spacing $a_i$ from i$\to$i+1 in g becomes $a_i$ where $a_i \equiv ka_i$ mod n. Starting with the basic permutation g, and the associated sequencing $\{O, a_1, a_2, \ldots, a_{n-1}\}$ the corresponding sequencing in $g^k$ is $\{O, ta_1, ta_2, \ldots, ta_{n-1}\}$ where $kt \equiv 1$ mod n, that is, t<n is the integer such that $(g^k)^t \equiv g$ mod n. t is relatively prime to n. t is necessarily odd; so t=2d+1 where d$\geq$0. Consider the number in the sequencing $$\{a_i\}, a_j = s = \frac{n}{2}.$$

$$a'_j = ta_j = (2d+1)\frac{n}{2} = dn + \frac{n}{2} \equiv s \mod n.$$

This proves the following:

Proposition 3: In a group of quick trickle permutations, the sequencings (corresponding to maximal permutations) all have $$a_j = \frac{n}{2}$$

in the same position.

Definition: A sequencing corresponding to a quick trickle permutation for which $a_s = s$, is called symmetric if $a_t + a_{n-t} \equiv 0$ mod n. If $a_t + a_{s+t} \equiv 0$ mod n, it is called antisymmetric.

Note that $a_t + a_{n-t} \equiv 0$ mod n is not a sufficient condition for a sequencing. As shown in Proposition 2, although $$0, 1, 2, \ldots, \frac{n}{2}, \ldots, n-1$$

has this property, it is not a sequencing if $n \neq 2^k$.

Proposition 4: (I) In the symmetric case, the sequencing corresponding to the inverse permutation is $$\{0, a_{n-1}, \ldots, a_{s+1}, a_s, a_{s-1}, \ldots, a_2, a_1\}$$

(II) In the antisymmetric case, the sequencing corresponding to the inverse permutation is:

$$\{0, a_{s+1}, \ldots, a_{n+1}, a_s, a_1, \ldots, a_{s-1}\}$$

The foregoing proposition is established by the following analysis: The sequencing corresponding to the inverse, as shown in the proof of Proposition 3, is $\{0, (n-1)a_1, (n-1)a_2, \ldots, (n-1)a_{n-1}\}$. In (I) $a_1 + a_{n-1} = na_1 \equiv 0$ mod n so $(n-1)a_1 = a_{n-1}$ etc. In (II) $a_1 + a_{s+1} = na_1 \equiv 0$ mod n, so $(n-1)a_1 = a_{s+1}$, etc.

E. Graphic Representation of Quick Trickle Permutations

Figure 6A:
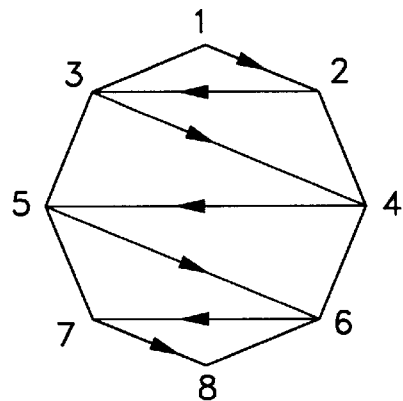
FIGS. 6A–6I are graphical representations of quick trickle permutations and associated sequencings, or portions thereof, showing how one can be transformed into another.

A quick trickle permutation can be represented as a directed graph. For a permutation of order n=2s, the vertices of a regular n-sided polygon, in some order, represent the permutation. Chords connecting numbers i to i+1, represent the spacings with values assigned as the number of edges subtended to the left, with respect to the direction of travel. By definition, for a quick trickle permutation, these chord lengths in terms of edges subtended must all be different. FIG. 6A is an example for n=8 for a permutation of the form of Eqn. (2), as listed in Section II D, i.e., $g_1$=(1 2 4 6 8 7 5 3). In these graphs, there is a single path from each vertex to every successor. Clearly, if one can rearrange the chords, all of different lengths, so that one obtains another directed graph with unique paths, it will represent another quick trickle permutation.

Using the convention mentioned above, the chord lengths or spacings marked by the arrows are, respectively, 0 1 6 3 4 5 2 7. This is the sequencing corresponding to the permutation $g_1$. Clearly, any transformation to this graph which yields the same chord lengths will represent another quick trickle permutation and sequencing; for example, one may reverse the order of the chords or sequencing by following a symmetric, counterclockwise path like that shown in FIG. 6B.

In this case, one has obtained the inverse of the permutation in FIG. 6A (i.e., $g_1^{-1} = g_1^7 = $(1 3 5 7 8 6 4 2) where n=8. The corresponding sequencing is: 0 7 2 5 4 3 6 1, and the existence of the directed terrace is guaranteed by the fact that the above sequencing is the set of spacings in a permutation.

Figure 6B:
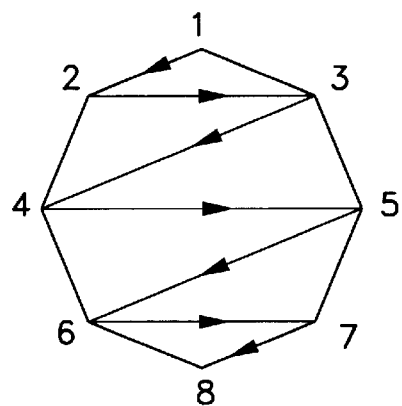
Figure 6C:
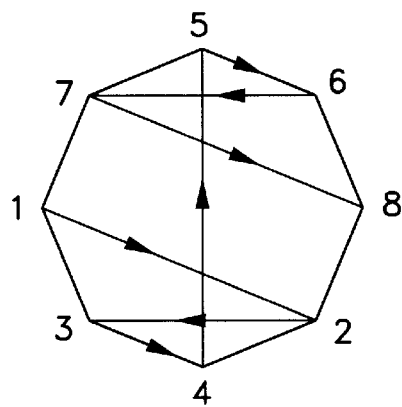
Figure 15:
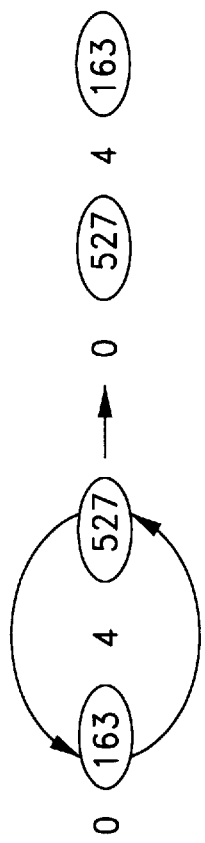
FIG. 15 (Table 1 and 2) illustrates graphical representations of permutations used in the present invention.

If one rotates the chord of length 4 in FIG. 6A by 90°, one obtains the new directed graph in FIG. 6C, where $g_2$=(1 7 5 6 8 2 4 3). In this case, the chord lengths, in order, or the sequencing is: 0 5 2 7 4 1 6 3. Note that this represents a rotation of blocks around $$\frac{n}{2} = 4$$

in the sequencing in FIG. 6A. This representation may be shown as provided in Table 1 of FIG. 15.

$g_2$ is not a power of $g_1$ and, thus, a second group of quick trickle permutations is determined.

$g_2^5$=(1 2 5 3 8 7 4 6) and $g_1$=(1 2 4 6 8 7 5 3) generate two disjoint groups of quick trickle permutations. Additional groups of such permutations can be obtained as follows. These first two are of the form (1 2 4 8 ) and (1 2 5 8 ). It is natural to look for another permutation of the form (1 2 x 8) where x$\neq$4 or 5. x$\neq$3 since this would require that $a_1 = a_2 = 1$. So, either x$\neq$6 or 7, but there are other obvious restrictions, such as, 7 cannot immediately precede 8. Thus, the number of possibilities in a cut and try approach for n=8 is quite manageable. It is easy to see that the following is a quick trickle permutation independent of $g_1$ and $g_2$:

$h_1$=(1 2 7 4 6 5 3) with $\{a_i\}$=0 1 6 4 3 7 5 2

Figure 6D:
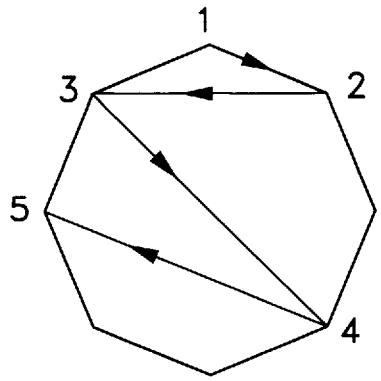

However, $h_1$ can be derived from $g_1$ by modifying the directed graph of $g_1$ shown in FIG. 6A. First of all, the first two chords of length 1 and 6 are left alone and the third and fourth chords of lengths 3 and 4, respectively, are interchanged. This results in the partial graph shown in FIG. 6D.

Figure 6E:
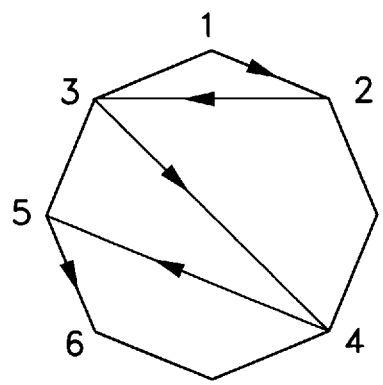

Chords of length 1, 6, 4, and 3 have been used. Remaining to be selected are chords of length 2, 5, and 7. Emanating from vertex 5, a 5-chord would reverse the 3-chord from 4 to 5, and a 2-chord would close the graph at vertex 1. So, the only choice is for a 7-chord from vertex 5. This partial graph is shown in FIG. 6E.

Figure 6F:
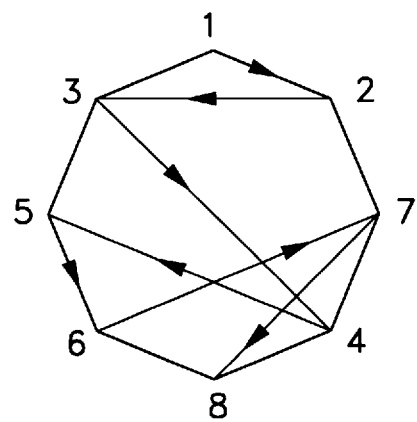
Figure 6G:
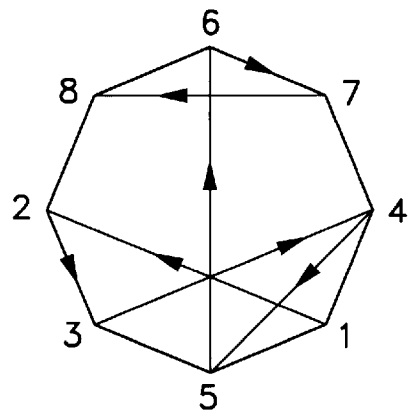
Figure 6H:
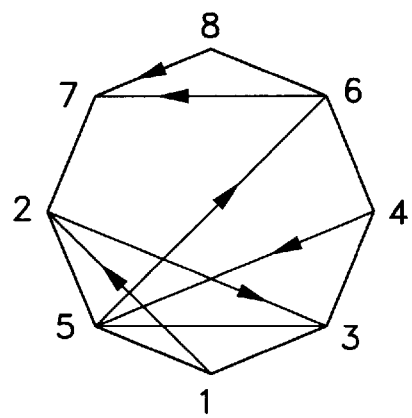

A 2-chord and a 5-chord remain to be fitted in. A 2-chord from vertex 6 would revisit 3. So the only possibility is a 5-chord from vertex 6 followed by the 2-chord, as shown in FIG. 6F. This quick trickle permutation can be used to generate other groups of permutations. First of all, the 4-chord extending from vertex 3 to 4 in FIG. 6F can be rotated 45° to connect the original vertices 1 and 8. The result is shown in FIG. 6G. This is independent of the previous quick trickle permutations in the sense that it is not a power of any of them. As shown in FIG. 6F, $h_1$ can also be modified by reversing the order of the corresponding sequencing. This is shown in FIG. 6H. Once again, this is not a power of a previous quick trickle permutation. Finally, one may rotate the 4-chord, leaving the other chords unchanged to obtain the directed graph in FIG. 6I.

If one uses only two modifications of a directed graph, that is, mirror image and rotation of the diameter or chord subtending four edges, then permutations $h_1$, $h_2$, $h_3$ and $h_4$ form an equivalence class while $g_1$ and $g_2$ form a degenerate equivalence class of two groups. If one permits the more complicated modification of FIG. 6A to FIG. 6F, then the six groups can all be considered equivalent.

Figure 6I:
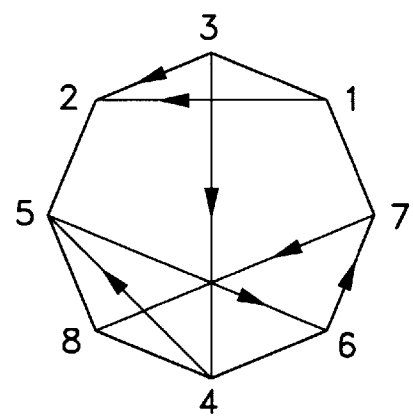

There is a clear distinction between the directed graphs of FIGS. 6A, 6B and 6C on the one hand and those in FIGS. 6G, 6H and 6I on the other hand. The former are symmetric about the diameter or chord of length $$s = \frac{n}{2} = 4;$$

the latter are asymmetric around this diameter. Permutations corresponding to these types of directed graphs will be known, respectively, as symmetric or asymmetric. The corresponding sequencings, omitting the initial zero, are similarly symmetric or asymmetric. As shown above, interchanging the blocks minus the zero, to the left and right of s in the sequencing produces another sequencing.

Simultaneously, reversing the order of these two blocks also produces another sequencing. This is shown schematically as follows:

```
0(block L)s(block R)
0(block L⁻¹)s(block R⁻¹)
0(block R)s(block L)
0(block R⁻¹)s(block L⁻¹)
  where block L = (a₁,a₂, . . . ,aₖ), block L⁻¹ = (aₖ, . . . ,a₂,a₁)
     block R = (aₖ₊₂, . . . ,aₙ₋₁), block R⁻¹ = (aₙ₋₁, . . . ,aₖ₊₂)
     and s is in position k + 1.
```

In the symmetric case, k+1=s, that is s is in the middle of the nonzero numbers $\{a_i\}$ with blocks of s−1 numbers in each of the blocks to the left and right of s. In that case, the second sequencing is in the reverse order of the first and the corresponding permutation is the inverse of the permutation corresponding to the first sequencing. There is a similar correspondence between the third and fourth sequencings. As will be illustrated in the next section, a symmetric quick trickle permutation generates an equivalence class of two permutation groups. In the asymmetric case, inverting the order of the numbers within the left and right blocks does not reverse the order of the sequencing and does not, correspondingly, generate the inverse of the first permutation. An asymmetric quick trickle permutation generates an equivalence class of four permutation groups.

F. Enumeration of Quick Trickle Permutations

Any quick trickle permutations, or equivalently, any sequencing of integers mod n, for n=2s, can be represented as a directed graph sequentially connecting the n vertices of a regular n-gon. Thus, the problem reduces to finding the number of such graphs with n−1 chords of distinct lengths. However, for small n, this can be done directly by eliminating permutations that do not meet the criteria of Section D, and by taking into account the group properties of such permutations.

Again, consider n=8. There are 8!=40,320 permutations of (1 2 3 4 5 6 7 8); however, one may always start with 1 as the first number. n must be $$\frac{n}{2} = s$$

positions to the right of 1 in a quick trickle permutation. So the form must be (1 8 )

There are now 6!=720 possibilities. A permutation of the form (1 2 8 ) will generate quick trickle permutations, i.e., odd powers of the original, with forms:

(1 2 8 , 1 8 2 , and 1 8 2)

So it is not necessary to consider the latter three forms. Similarly, a permutation of the form (1 2 8 ) will generate (1 8 2 ) as an odd power. This leaves 5!=120 possibilities for each of the two forms. Since (1 2 3 8 ) cannot be a quick trickle permutation, the third number from the left must be 4, 5, 6, or 7. It can quickly be verified that the only possibilities are

| Permutations | Sequencings |
|---|---|
| $g_1$ = (1 2 4 6 8 7 5 3) | 0 1 6 3 4 5 2 7 |
| $g_2^5$ = (1 2 5 3 8 7 4 6) | 0 1 2 3 4 5 6 7 |
| $h_1$ = (1 2 7 4 8 6 5 3) | 0 1 6 4 3 7 5 2 |
| $h_3^3$ = (1 2 7 5 8 4 3 6) | 0 1 5 7 6 4 3 2 |

Similarly, it can be verified that for (1 2 8 ) there are four possibilities:

| | Permutations | Sequencings |
|---|---|---|
| $h^7_2$ = | (1 3 2 5 8 4 6 7) | 0 2 7 4 6 3 1 5 |
| $h^3_2$ = | (1 4 2 7 8 3 6 5) | 0 2 3 4 6 7 5 1 |
| $h_4$ = | (1 5 2 7 8 6 4 3) | 0 2 5 7 3 4 6 1 |
| $h^5_4$ = | (1 6 2 3 8 5 4 7) | 0 2 1 3 7 4 6 5 | but the sixth and eighth permutations are, respectively, fifth powers of the fifth and sixth. There are a total of six quick trickle permutation groups for n=8. Each has four maximal quick trickle permutations and four permutations with subcycles. However, there are just two equivalence classes generated by just two permutations as shown in Table 2 of FIG. 15.

If a candidate for a sequencing is being constructed directly, that is, a permutation of (1,2,3, . . . ,n−1) is being sought such that the sequence of partial sums is another permutation, then a necessary and sufficient condition is that:

No consecutive subset of the candidate sequencing $\{a_i, a_{i+1}, \ldots, a_{i+k}\}$ is a partition of cn where c is a positive integer and $$1 \leq c \leq \left( \frac{n}{2} - 1 \right) n$$

that is, $$\sum_{j=0}^{k} a_{i+j} \neq 0 \bmod n \text{ for all } i, k \leq n - 1.$$

This is because in the sequence of partial sums $\{b_i\}$, in the directed terrace, $b_i \neq b_k$ implies that:

$$\sum_{j=0}^{i} a_j \neq \sum_{j=0}^{k} a_j \Rightarrow \sum_{j=0}^{k} a_j - \sum_{j=0}^{i} a_j = a_{i+1} + a_{i+2} + \ldots$$

$$a_k \neq 0 \bmod \neq 0 \bmod n$$

for n. In constructing a sequencing, a helpful, necessary, but not sufficient condition is that:

$$\sum_{j=0}^{i} a_j \neq \frac{n}{2} \bmod n \text{ for all } k < n-1.$$

From Eqn. (1) (see Section II), if $$\sum_{j=0}^{k} a_j = \frac{n}{2} \bmod n,$$

then $$\sum_{j=k+1}^{n-1} a_j = \frac{n(n-2)}{2} \equiv 0 \bmod n,$$

i.e., $\{a_{k+1}, \ldots, a_{n-1}\}$ would be a $$\frac{n(n-2)}{2}.$$

To determine the number of such permutations for a given n would be useful if only to know when to stop looking for more. Again, a negative approach seems to be the most tractable. Sequencings are a special class of permutations of $(1,2,3,\ldots,n-1)$ which contain no consecutive set which is a partition of $n, 2n, \ldots,$ or $$\left(\frac{n}{2} - 1\right)n.$$

Except for partitions of n, these are subsets of all possible unequal partitions since the numbers in the partitions of $2n, 3n, \ldots$ cannot exceed $n-1$.

For n odd, it is possible to extend this to quasi-sequenceable groups and quasi-complete Latin squares.

G. Graph Theory Formulation

As illustrated in the previous sections, the quick trickle permutations can be represented by directed graphs, or digraphs, where the $n=2s$ nodes are constrained to be vertices of a regular n-sided polygon. These are weighted digraphs where the weight is defined to be the number of sides of the polygon subtended by a directed edge or arc of the digraph as viewed to the left of the arc when facing in the direction in which it is pointed. The digraph is trivially connected and open. Each pair of nodes is connected by a path in the sense that the edges and nodes in between are distinct. Of course, a permutation has an arbitrary starting point, e.g., from FIG. 6A, $g_1=(1\ 2\ 4\ 6\ 8\ 7\ 5\ 3)$ is the same as $(3\ 1\ 2\ 4\ 6\ 8\ 7\ 5)$. The corresponding digraphs are isomorphic since there is a one-to-one correspondence between node sets which preserves adjacency. On the other hand, interchanges of the arcs as in FIG. 6C and FIG. 6F produce new digraphs which are not isomorphic to the ones from which they were derived.

There are two obvious ways of relating weighted digraphs to sequencings. First, a path connecting the n vertices of the polygon is drawn such that the weighted arcs are all different. Alternatively, one could find some permutation of $(1,2,3,\ldots,n-1)$ which when used as weighted arcs would connect all n vertices of the polygon and thus would be a path. In the first approach, it is easy to find a path but not so easy to do it with all different weighted arcs.

Figure 7A:
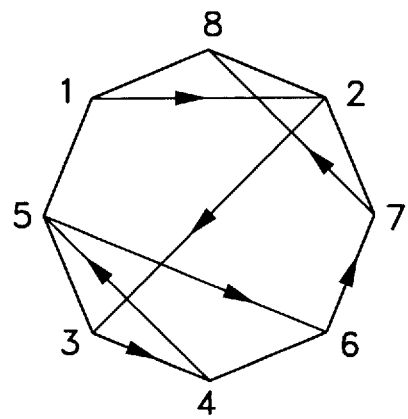
FIG. 7A is a graphical representation of a quasi-sequencing and associated quasi-quick permutation.
Figure 7B:
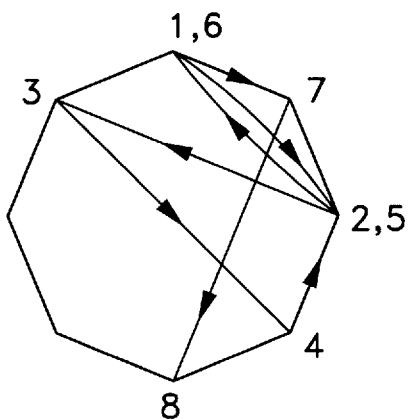
FIG. 7B is a graphical representation of a distinct sequence of numbers which is not a sequencing and does not define a permutation. It is a set of distinct weighted arcs which do not form a path.

FIG. 7A is an example of a path connecting all vertices but not with distinct weighted arcs. FIG. 7B is not a path, but the digraph has distinct weighted arcs. The problem, particularly in the asymmetric case, is to meet both requirements simultaneously.

H. Generation by Extrapolation

This section provides a means of extrapolating from sequencings or quasi-sequencings in $Z_n$, n even or odd, to their counterparts in larger sequenceable groups. As motivation, consider the exhaustive search for quick trickle permutations and sequencings in section F. It is easy to see that there are just two sequencings in $Z_4$:

$$\{0\ 1\ 2\ 3\} \text{ and } \{0\ 3\ 2\ 1\}$$

Each can be used to construct a candidate for a symmetric sequencing in $Z_8$ by appending a symmetric set of complements modulo 8:

$$\{0\ 1\ 2\ 3\} \rightarrow \{0\ 1\ 2\ 3\ \underline{4}\ 5\ 6\ 7\} \rightarrow (1\ 2\ 5\ 3\ 8\ 7\ 4\ 6) =_8 g_2^5$$

$$\{0\ 3\ 2\ 1\} \rightarrow \{0\ 3\ 2\ 1\ \underline{4}\ 7\ 6\ 5\} \rightarrow (1\ 6\ 5\ 2\ 8\ 3\ 4\ 7) =_8 g_1^3$$

Either one of these generates the eight symmetric quick trickle permutations in $Z_8$ without any searching. The next proposition generalizes this concept.

Proposition 5: If $\{a_i\}$ is a quasi-sequencing in $Z_n$, the group of integers modulo n, then $\{a_i\}$ defines one or more symmetric sequencings in $Z_{2n}$.

The foregoing proposition is established by the following analysis.

By convention, $a_0=0$. Define:

$$\hat{a}_i = a_i \quad 0 \leq i \leq n-1 \quad \text{if } a_i \neq a_j \quad \text{for } i \neq j$$
$$\hat{a}_i = a_i + n \quad 0 \leq i \leq n-1 \quad \text{if } a_i = a_j \quad \text{for } i \neq j$$

or $$\hat{a}_j = a_j + n$$
$$\hat{a}_i = n \qquad i = n$$
$$\hat{a}_i = 2n - \hat{a}_{2n-i} \qquad n+1 \leq i \leq 2n-1$$
$$\hat{b}_i = \sum_{j=0}^{i} \hat{a}_j \qquad \bmod 2n$$

A sequencing is considered to be a special case of a quasi-sequencing in which each number and its inverse occur once. The $\{\hat{a}_i\}$ as defined above are distinct modulo $2n$. It is only necessary to show that the set of partial sums $\{\hat{b}_i\}$ are distinct modulo $2n$.

$$b_i = \sum_{j=0}^{i} a_j \bmod n.$$

Since $\{a_i\}$ is a quasi-sequencing, the $b_i$ are distinct. Assume that $\{a_i\}$ is a sequencing. Then for the first half of the $\{\hat{b}_i\}$:

$$\hat{b}_i = \sum_{j=0}^{i} a_j \bmod 2n \quad i \leq n-1,$$

the $\hat{b}_i$ are also distinct since numbers which are distinct modulo n are also distinct modulo 2n.

$$\hat{b}_n = \sum_{j=0}^{n-1} a_j + n \bmod 2n.$$

Clearly, it is distinct from the $\hat{b}_i, i \leq n-1$.

$$\hat{b}_{n+1} = \sum_{j=0}^{n-1} a_j + n + 2n - \hat{a}_{2n-(n+1)} \bmod 2n$$

$$= \sum_{j=0}^{n-2} a_j + 3n \bmod 2n \equiv \hat{b}_{n-2} + n \bmod 2n$$

Similarly, $\hat{b}_{n+2} \equiv \hat{b}_{n-3} + n \bmod 2n$. By induction:

$$\hat{b}_{n+k} \equiv \hat{b}_{n-k-1} + n \bmod 2n$$

and so the $\{\hat{b}_i\}$ are distinct and $\{\hat{a}_i\}$ is a sequencing.

Now assume that $\{a_i\}$ is a quasi-sequencing in $Z_n$ with a single pair $a_j = a_i$ and substitute $a_{j+n} = \hat{a}_j$ for $a_j = \hat{a}_j$. Since $a_j \in Z_n$, $a_j + n < 2n$ This will also change $\hat{a}_{2n-j}$ on the right side of n in the candidate quasi-symmetric sequencing in $Z_{2n}$.

In constructing the corresponding candidate terrace, the original members of $\{\hat{b}_i\}$ are unchanged for i<j and for $2n-j \leq i$. The $\{\hat{b}_i\}$ are replaced by $\{\hat{b}_i + n\}$ for $j \leq i < 2n-j$. As shown above:

$$\hat{b}_j \equiv \hat{b}_{2n-(j+1)} + n \bmod 2n,$$

by letting $j = n-k-1$ so that $n+k = 2n-(j+1)$. So $\hat{b}_j + n \equiv \hat{b}_{2n-(j+1)}$ mod 2n and similarly for all i such that $j \leq i < 2n-j$. Thus, the $\{\hat{b}_i + n\}$ are a permutation of the $\{\hat{b}_i\}$ for $j \leq i < 2n-j$, and the original terrace $\{\hat{b}_i + n\}$ is replaced by a new directed terrace.

If there is a second pair $a_k = d_l$, for $l \neq k$, the same analysis applies with two permutations of the $\{\hat{b}_i\}$ within consecutive intervals $j < k \leq i \leq 2n-k < 2n-j$, and by induction, to larger numbers of pairs.

Corollary: If $\{a_i\}$ is a quasi-sequencing in $Z_n$ with l pairs of identical numbers $a_i = a_j$, it will generate $2^l$ symmetric sequencing in $Z_{2n}$.

Proof: As shown in Proposition 5, either one of the pairs of equal numbers $a_i = a_j$, where $i \neq j$, can be modified to be $a_{j+n}$, and will generate a sequencing in $Z_{2n}$. All of the parts must be modified. Since each pair can be modified in two ways, there are $2^l$ choices. If there are no pairs, there is just one way to do this.

Consider the following examples:

The symmetric sequencing in $Z_8$ corresponding to the permutation ${}_8g_2{}^7$ is $\{0\ 3\ 6\ 1\ \underline{4}\ 7\ 2\ 5\}$. From this, reversing the order and taking complements mod 16, one obtains:

$$\{a_i\} = \{0\ 3\ 6\ 1\ 4\ 7\ 2\ 5\ \underline{8}\ 11\ 14\ 9\ 12\ 15\ 10\ 13\}$$

The corresponding permutation is:

$${}_{16}g_3 = \{1\ 14\ 13\ 2\ 9\ 6\ 12\ 7\ 16\ 3\ 4\ 15\ 8\ 11\ 5\ 10\}$$

The asymmetric sequencing in $Z_8$ corresponding to permutation ${}_8h_1$ is $\{0\ 1\ 6\ \underline{4}\ 3\ 7\ 5\ 2\}$. From this one obtains the symmetric sequencing in $Z_{16}$:

$$\{a_i\} = \{0\ 1\ 6\ 4\ 3\ 7\ 5\ 2\ \underline{8}\ 14\ 11\ 9\ 13\ 12\ 10\ 15\}.$$

It can be verified that the partial sums are a directed terrace. The corresponding quick trickle permutation is:

$${}_{16}g_5 = \{1\ 2\ 10\ 13\ 9\ 6\ 12\ 3\ 16\ 15\ 7\ 4\ 8\ 11\ 5\ 14\}$$

For n=5, there are no sequencings, but there are three groups of quasi-sequencings of four members each. For n=10, there are 288 sequencings in 72 groups of 4 members each. Of these, there are 12 groups of symmetric and 4 groups of anti-symmetric sequencings of 4 members each. Two properly selected quasi-sequencings in $Z_5$ will generate all 64 symmetric and anti-symmetric sequencings in $Z_{10}$. For example, $${}_5q_1: \{0\ 1\ 2\ 1\ 3\} \rightarrow \{0\ 1\ 2\ 6\ 3\ \underline{5}\ 7\ 4\ 8\ 9\}:{}_{10}g_3$$

$${}_5q_1: \{0\ 1\ 2\ 1\ 3\} \rightarrow \{0\ 6\ 2\ 1\ 3\ \underline{5}\ 7\ 9\ 8\ 4\}:{}_{10}g_{10}{}^3$$

These two sequencings in $Z_{10}$ generate the entire groups ${}_{10}g_3$ and ${}_{10}g_{10}$. Then, ${}_{10}g_3$ and ${}_{10}g_{10}$ generate the groups ${}_{10}g_4$ and ${}_{10}g_9$, respectively, with which they share equivalence classes. Similarly, $${}_5q_1{}^2: \{0\ 3\ 1\ 3\ 4\} \rightarrow \{0\ 3\ 1\ 8\ 4\ \underline{5}\ 6\ 2\ 9\ 7\}:{}_{10}g_{11}{}^7$$

$${}_5q_1{}^2: \{0\ 3\ 1\ 3\ 4\} \rightarrow \{0\ 8\ 1\ 3\ 4\ \underline{5}\ 6\ 7\ 9\ 2\}:{}_{10}g_5{}^7$$

These, in turn, generate the groups ${}_{10}g_{12}$ and ${}_{10}g_6$ from shared equivalence classes. This is a total of eight groups of sequencings in $Z_{10}$. The group of quick trickle permutations and sequencings generated by ${}_5q_3$ is not in the equivalence class with ${}_5g_1$.

$${}_5q_3: \{0\ 1\ 3\ 3\ 1\} \rightarrow \{0\ 1\ 8\ 3\ 6\ \underline{5}\ 4\ 7\ 2\ 9\}:{}_{10}g_1$$

$${}_5g_3: \{0\ 1\ 3\ 3\ 1\} \rightarrow \{0\ 1\ 3\ 8\ 6\ \underline{5}\ 4\ 2\ 7\ 9\}:{}_{10}g_7$$

These, in turn, generate the groups ${}_{10}g_2$ and ${}_{10}g_8$ for a total of 12 groups. Missing are the four anti-symmetric groups. They can be generated as follows:

$${}_{10}g_4: \{0\ 7\ 4\ 8\ 9\ \underline{5}\ 1\ 2\ 6\ 3\} \rightarrow \{0\ 7\ 4\ 8\ 9\ \underline{5}\ 3\ 6\ 2\ 1\}:{}_{10}g_{13}$$

$${}_{10}g_{11}: \{0\ 1\ 7\ 6\ 8\ \underline{5}\ 2\ 4\ 3\ 9\} \rightarrow \{0\ 1\ 7\ 6\ 8\ \underline{5}\ 9\ 3\ 4\ 2\}:{}_{10}g_{15}$$

From these two come ${}_{10}g_{14}$ and ${}_{10}g_{16}$, completing the generation of all 64 symmetric and anti-symmetric sequencings in $Z_{10}$. While a quasi-sequencing in $Z_n$ will generate two or more sequencings in $Z_{2n}$, the reverse process is unique.

Proposition 6: If $\{a_i\}$ is a symmetric sequencing in $Z_{2n}$, it generates a quasi-sequencing in $Z_n$.

The foregoing proposition is established by the following analysis: $\{a_i\} = \{0, a_1, a_2, \ldots, a_{n-1}, n, a_{n+1}, \ldots, a_{2n-1}\}$. The $a_i$ are distinct integers modulo 2n since this is a sequencing. Since it is symmetric, $a_i = 2n - a_{2n-i}$. Consider the set $\{0, \hat{a}_1, \hat{a}_2, \ldots, \hat{a}_{n-1}\}$ where $\hat{a}_i = a_i$ modulo n.

If $\hat{a}_i = \hat{a}_j$, then either $a_i = a_j + n$ or $a_i + n = a_j$. Since $\{a_i\}$ is a sequencing, there can be at most two $\hat{a}_i$ with the same value. If there is such an equal pair mod n, then $a_i^{-1}$ mod $n \equiv n - a_i = 2n - (n - a_i)$ is on the right side of n in the sequencing $\{a_i\}$ and, thus, $\hat{a}_i^{-1}$ is not in the set $\{\hat{a}_i\}$. If $\hat{a}_i$ and $\hat{a}_i^{-1}$ are both in $\{\hat{a}_i\}$, then both $a_i$ and $n - a_i$ are on the left of n, then $2n - (n - a_i) = n + a_i \equiv \hat{a}_i$ mod n is on the right of n and not in $\{\hat{a}_i\}$. Thus, each element of $\{\hat{a}_i\}$ is accompanied by its inverse or a duplicate value.

It only remains to show that the partial sums $$\hat{b}_i = \sum_{i=0} \hat{a}_j \bmod n$$

are distinct. It is sufficient to show that there is no consecutive subset such that $$\sum_{i=j}^{k} \hat{a}_i \equiv 0. \mod n$$

Now, $$\sum_{i=j}^{k} \hat{a}_i \equiv \sum_{i=j}^{k} a_i \mod n,$$

and $$\sum_{i=j}^{k} a_i \neq 0 \mod 2n$$

since $\{a_i\}$ is a sequencing. So if $$\sum_{i=j}^{k} \hat{a}_i \equiv 0 \mod n,$$

it implies that $$\sum_{i=j}^{k} a_i \equiv (2c+1)n,$$

i.e., an odd multiple of n, so that $(2c+1)n \equiv 0 \mod n$ but not $\mod 2n$.

Now, consider the partial sum:

$$\sum_{i=j}^{n-k-1} a_i \equiv \sum_{i=j}^{k} a_i + \sum_{i=k+1}^{n-k-1} a_i = (2c+1)n + n = 2(c+1)n \equiv 0 \mod 2n.$$

However, this is not possible since the set $\{a_i\}$ $0 \leq i \leq 2n-1$ is a sequencing.

I. Inter-Round Mixing Using Bit Permutations

Inter-round mixing may be accomplished by bit permutation rather than block permutation. In typical block substitution systems 32 or 64 bits are permuted after each round. However, a block substitution may be designed for an arbitrary size, constrained only by the practicalities of implementation. Since there are generally fewer rounds of encryption than there are bits to be encrypted, Latin squares cannot be formed. However, in the mixing process, it is desirable that the juxtaposition of the bits be broken up. If the permutation used in inter-round mixing has sub-cycles, then subsets of bits will be mixed only among themselves, somewhat like breaking the encryption process into encryption of smaller parallel blocks. If the permutations shift or space different pairs of bits by the same amounts, some patterns will be retained and the mixture will be less than homogeneous.

Quick trickle permutations are ideal for bit permutations because the spacings between originally-adjacent pairs become all different and because the permutations are maximal, that is, with no sub-cycles. However, bit permutation systems require much larger permutations than block permutation systems. For example, typical bit permutations require 32 or 64 numbers, while block permutations usually do not involve shifting around more than 8 numbers. These larger, maximal permutations are difficult to find at random, but symmetric quick trickle permutations can be found deterministically for the commonly-used block substitution systems. If the number of bits is a power of 2, e.g., $32=2^5$ or $64=2^6$, it is easy to construct quick trickle permutations in consecutive steps. If the number of bits has an odd factor, e.g., $28=7 \cdot 2^2$, then a quasi-sequencing for the largest odd factor must first be found.

Method of Generating Large Quick Trickle Permutations

Figure 8:
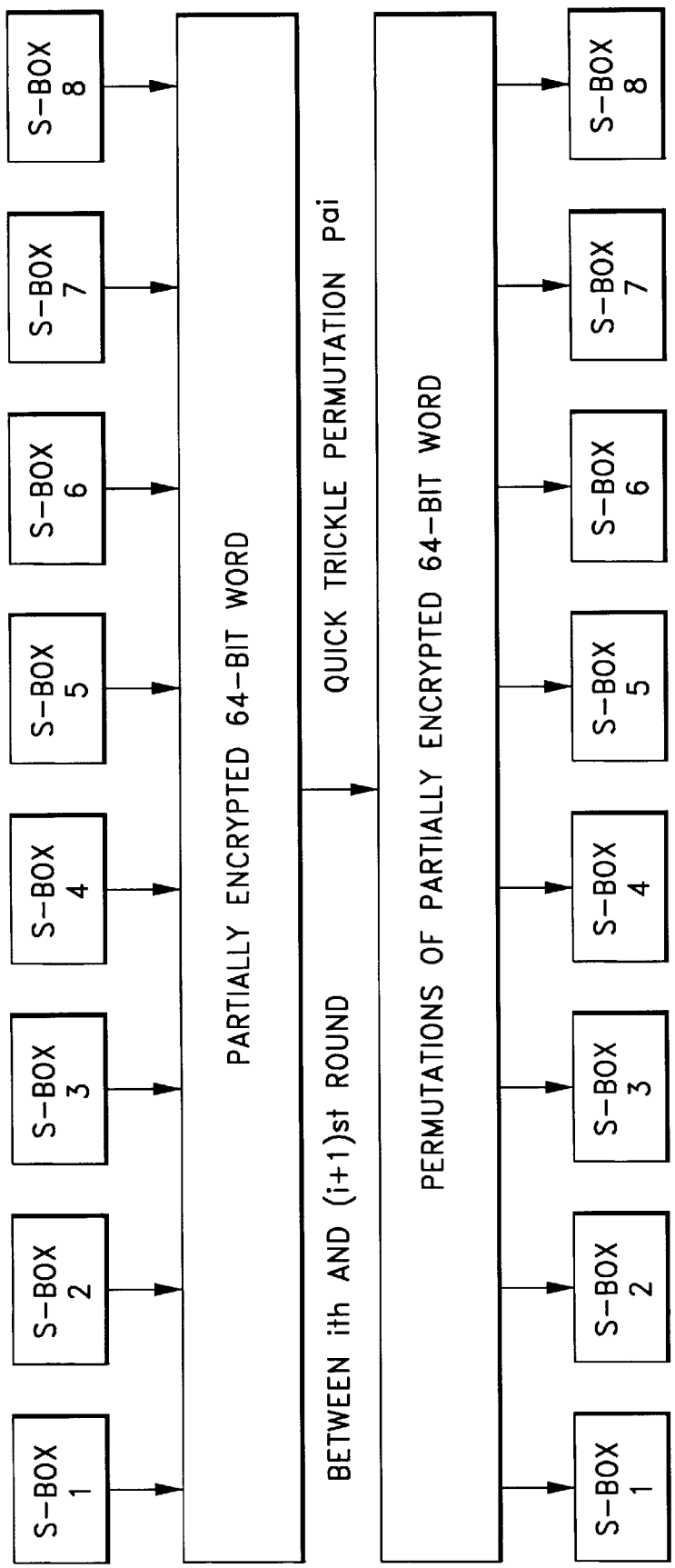
FIG. 8 is a block diagram illustrating bit permutation with large Quick Trickle permutations.

FIG. 8 is a block diagram illustrating bit permutation with large Quick Trickle permutations. The number of bits to be permuted is n. In case I, $n=c2^k$ where c is an odd number. Choose any quasi-sequencing on the integers modulo c.

$$\{0, a_1, a_2, \ldots a_{c-1}\}$$

Take any pair $a_i$ and $a_j$ such that $a_i = a_j$. Add c to either one of these, and accordingly replace either $a_i$ by $a_i+c$ or $a_j$ by $a_j+c$. Rewrite the quasi-sequencing as:

$$\{0, \hat{a}_1, \hat{a}_2, \ldots, \hat{a}_{c-1}\}$$

where $\hat{a}_i = a_i$ or $\hat{a}_i = a_i + c$. Construct a sequencing of size 2c by writing:

$$\{0, \hat{a}_1 \hat{a}_2, \ldots, \hat{a}_{c-1}, c, 2c - \hat{a}_{c-1}, \ldots, 2c - \hat{a}_2, 2c - \hat{a}_1\}$$

This is a sequencing (not a quasi-sequencing) of size 2c, that is, sequencing of the integers modulo 2c. Repeat this process for 4c. However, there will no longer be any duplicate numbers. Write:

$$\{0, \hat{a}_1, \ldots, \hat{a}_{c-1}, c, 2c - \hat{a}_{c-1}, \ldots, 2c - \hat{a}_1, 2c, 4c - [2c - \hat{a}_1], \ldots, 4c - \hat{a}_1\}$$

Continue this iterative process until a sequencing on the integers modulo $n=c2^k$ is derived. Then construct a quick trickle permutation from the final sequencing which has the form:

$$\{0, A_1, A_2, \ldots A_{c-1}, c, A_{c+1}, \ldots 2c, \ldots, 4c, \ldots c2^k - 1, \ldots, A_{n-1}\}$$

where the integers $A_i$ are found by repeated application of the above process. This is shown in earlier sections. The corresponding quick trickle permutation is obtained as described earlier, by letting $A_i$ be the spacing between the integers i and i+1.

In case II, $n=2^k$. In this case, we start with the largest value of k for which we have a quasi-sequencing or a sequencing. If a quasi-sequencing is to be used, the procedure is the same as Case I. If a sequencing is to be used, the process is even simpler. Let the sequencing of the integers modulo $t=2^k$ be:

$$\{0, a_1, a_2, \ldots a_{t-1}\}$$

Since there are no duplications, for the next level we have:

$$\{0, a_1, a_2, \ldots a_{t-1}, a_t, 2t - a_{t-1}, \ldots, 2t - a_1\}$$

This process is repeated until we reach $2^k$.

EXAMPLES

Case I: To find a sequencing for $n=36=9 \cdot 2^2$. Since 9 is odd, there are no sequencings, but a quasi-sequencing found by cut and try is: {0 1 1 2 4 6 2 5 3}. The corresponding quasi-quick trickle permutation is (1 2 3 8 4 6 9 7 5). The next level is $2 \cdot 9 = 18$. 1 and 2 are duplicates in the original quasi-sequencing. We add 9 to one member of each pair. There are four ways to do this. One way is to modify the second member of each pair and construct the following sequencing of the integers modulo 18:

{0 1 10 2 4 6 11 5 3 9 15 13 7 12 14 16 8 17}.

The corresponding directed terrace (partial sums) is:

[0 1 11 13 17 5 16 3 6 15 12 7 14 8 4 2 10 9], and the quick trickle permutation is:

(1 2 16 8 15 6 9 12 14 18 17 3 11 4 13 10 7 5).

The above sequencing can now be used to generate a sequencing of the integers modulo 36:

{0 1 10 2 4 6 11 5 3 9 15 13 7 12 14 16 8 17 18 19 28 20 22 24 29 23 21 27 33 31 25 30 32 34 26 35}

The corresponding directed terrace is:

(0 1 11 13 17 23 34 3 6 15 30 7 14 26 4 20 28 9 27 10 2 22 8 32 25 12 33 24 21 16 5 35 31 29 19 18]

and the corresponding quick trickle permutation is:

(1 2 21 8 15 31 9 12 23 18 20 3 26 4 13 10 30 5 36 35 16 29 22 6 28 25 14 19 17 34 11 33 24 27 7 32)

Case II: To find a quick trickle permutation and sequencing for $n=64=2^6$, start with the asymmetric quick trickle permutation and sequencing found by cut and try for n=16:

Sequencing

{0 1 8 2 3 4 5 6 9 14 15 7 11 10 13 12}

Permutation (1 2 6 11 10 13 9 7 16 3 12 4 15 8 5 14)

Expanding this to n=32 gives:

Sequencing

{0 1 8 2 3 4 5 6 9 14 15 7 11 10 13 12 16 20 19 22 21 25 17 18 23 26 27 28 29 30 24 31}

Permutation (1 2 27 11 23 20 9 26 17 3 12 4 15 25 5 19 32 31 6 22 10 13 24 7 16 30 21 29 18 8 28 14)

This can be extended to n=64

Sequencing

{0 1 8 2 3 4 5 6 9 14 15 7 11 10 13 12 16 20 19 22 21 25 17 18 23 26 27 28 29 30 24 31 32 33 40 34 35 36 37 38 41 46 47 39 43 42 45 44 48 52 51 54 53 57 49 50 55 58 59 60 61 62 56 63}

Permutation (1 2 38 11 23 20 56 26 17 3 12 4 50 40 5 46 33 31 6 43 55 13 24 7 49 35 21 29 18 8 37 14 64 63 27 54 42 45 9 39 48 62 53 61 15 25 60 19 32 34 59 22 10 52 41 58 16 30 44 36 47 57 28 51)

III. Inter-Round Mixing using Quick Trickle Permutations

Various examples of the application of these principles are provided below. Details of these examples are discussed in the following sections.

METHOD 1: n even. n S-boxes and n rounds use 1 Quick Trickle Permutation (QTP) to permute outputs of the S-boxes, to obtain a row-complete Latin square.

METHOD 2: Same as Method 1, except for two things:

a. Instead of a. Instead of using the same QTP after each round, successive powers, 1,2,3, . . . of the QTP are used.

b. The permutations are applied to the partially encrypted sub-blocks rather than to the contents of the S-boxes, i.e., concentration is on the data rather than the S-boxes. The net result is the same as Method 1.

METHOD 3: Similar to Method 1 including permutation. The outputs of the S-boxes, except that different powers (exponents) of the permutation are used after each round to obtain a row and column complete Latin square (complete Latin square). The exponents are a sequencing.

METHOD 4: Similar to Method 3 and also produces a row and column complete Latin square. Like Method 2, it permutes the partially encrypted sub-blocks rather than the components of the S-boxes. The exponents are a directed terrace rather than a sequencing as in Method 3.

METHOD 5: n is odd, so there are no QTPs or sequencings. This method uses Quasi Quick Trickle Permutations (QQP) and quasi-sequencings instead, and is otherwise identical to Method 1.

METHOD 6: This bears the same relationship to Method 2 as 5 does to 1.

METHOD 7: Again this is a substitute for Method 3 when n is odd, i.e. QQP's vs. QTP's and quasi-sequencing instead of sequencings.

METHOD 8: Again this is a substitute for Method 4 when n is odd, i.e. QQP's Vs QTP's and terraces instead of directed terraces.

METHOD 9: n is even as in 1–4. This is similar to Method 3. As in 3, permutations are applied to outputs of S-boxes. The difference is that while QTP's are used as permutations, the exponents are quasi-sequencing instead of sequencing. A hybrid row complete, quasi-column complete Latin Square is achieved.

METHOD 10: Like Methods 2, 4, 6, and 8, it tracks and permutes the partially encrypted sub-blocks. This is similar to Method 4 except that while the permutations are QTP's, the exponents are terraces rather than directed terraces. A hybrid row complete, quasi-column complete Latin square is achieved.

In Methods 1 through 10, it is assumed that the number of rounds is n, the same as the number of S-boxes. The number of rounds could be a multiple of n, but not less than n. In each method, the n sub-blocks are permuted.

METHOD 11: This differs fundamentally from the previous 10 methods in that the individual bits in the data block are being permuted rather than the sub-blocks. Each data block consists of m bits. The data block is divided into n sub-blocks which are partially encrypted by the n S-Boxes. The partially encrypted sub-blocks are reassembled into an m bit block for bit permutation. E.g., if the data comes in blocks of 64 bits which are divided into eight sub-blocks of 8 bits each, methods 1–10 permute the eight sub-blocks among themselves. Method 11 permutes the 64 bits.

Figure 9:
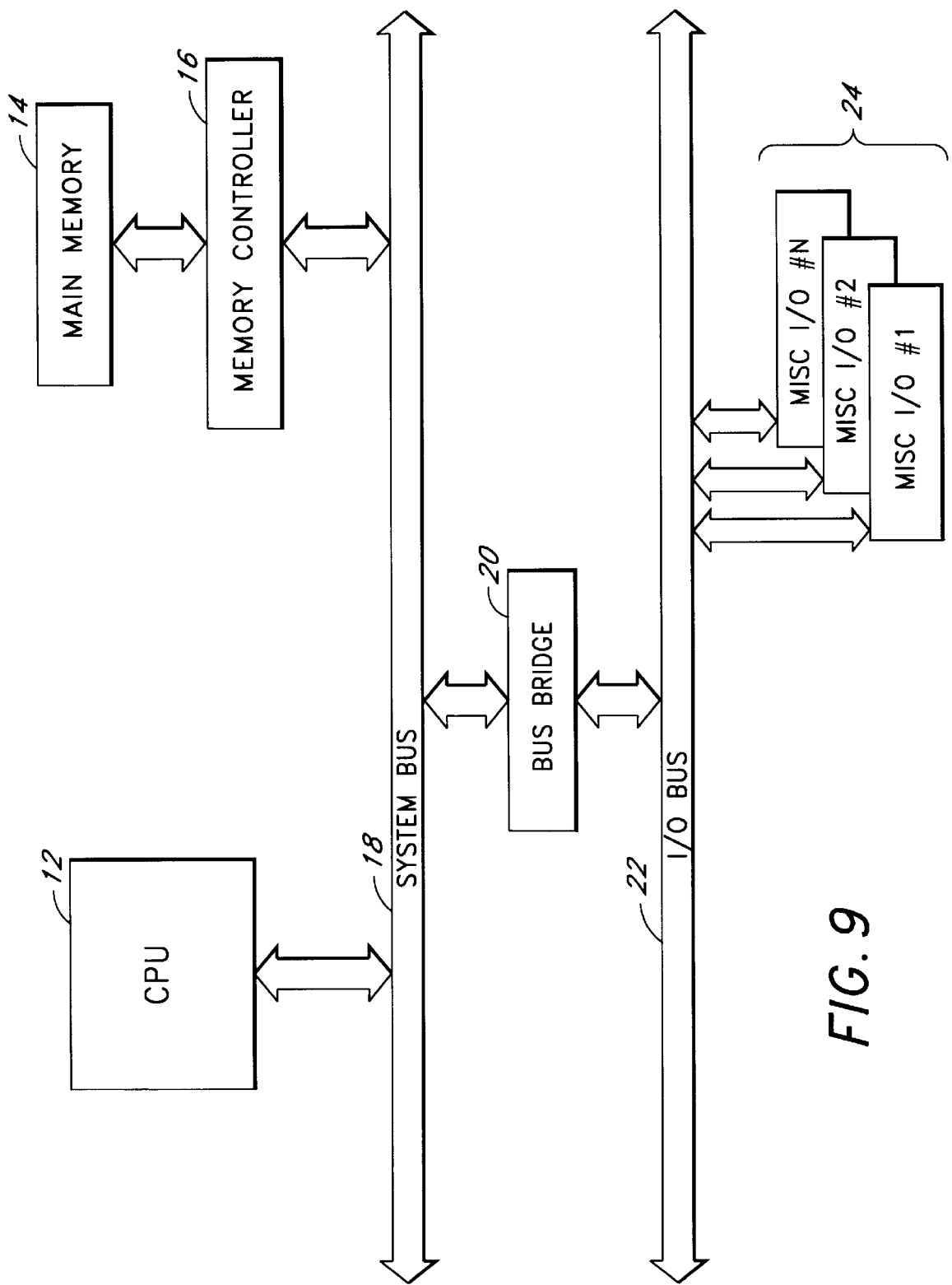
FIG. 9 is a block diagram of an exemplary processing system for encrypting data using the method of the present invention.

The methods described in relation to the present invention may readily be carried out with a microprocessor-based system under program control. FIG. 9 is a system block diagram of an exemplary processor system in which the methods of the present invention are carried out. The processor system 10 shown in FIG. 9 comprises a central processing unit (CPU) 12 and main memory 14 which is coupled to and controlled by memory controller 16. The CPU 12 and memory controller 16 are coupled to a system bus 18. The processor system may also include various Input/Output ("I/O") and peripheral modules (i.e., MISC I/O #1, MISC I/O #2, . . . , MISC I/O #N) 24 which are coupled along an I/O bus 22. It should be understood however that further devices may be installed on the system bus 18 and on the I/O bus 22, as well known in the art. The bus bridge 20 provides an interface between the system bus 18 and the I/O bus 22.

Figure 10:
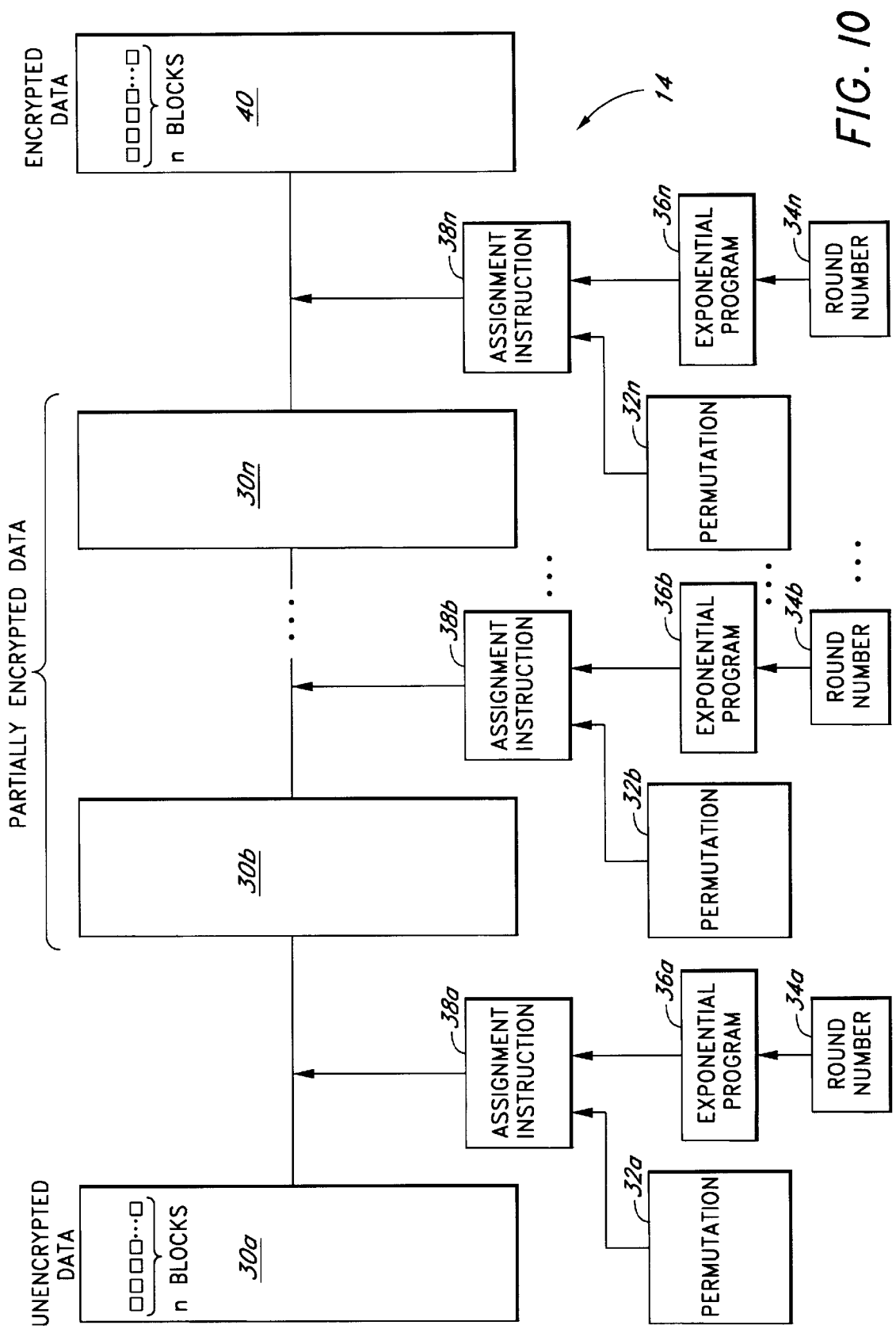
FIG. 10 is a block diagram of exemplary apparatus for encrypting data using the method of the present invention.

FIG. 10 illustrates a block diagram of a system for carrying out encryption in accordance with the techniques of the present invention. Blocks of unencrypted data 30a are first initialized as will be described in detail in the following sections. A predetermined permutation 32a is used in conjunction with an exponential program 36 to provide an assignment instruction 38a. The exponential program 36a is determined based on the round number 34 of the method in use. The assignment instruction 38a is applied to the output of the data as will be described in detail in the following sections. Upon assignment by the assignment instruction 38a, the unencrypted data becomes partially encrypted data 30b. Another permutation 32b along with an exponential program 36b based on the round number 34b of the encryption are applied to provide an assignment instruction 38b which is again applied to the output of the partially encrypted data 30b. This sequence is continued until completion of the number of specified round of encryption to provide encrypted data 40.

Listings of Quick Trickle Permutations, Quasi Quick Trickle Permutations, sequencings, quasi sequencings, terraces and directed terraces can readily be preprogrammed in memory 14, and used essentially as look-up tables. Assignment instructions 38a–38n and exponent programs 36a–36n could readily be implemented using conventional circuitry or implemented through software running in memory 14 so that at least the major elements of an encryption system could be realized in either high speed discrete components or through a custom integrated chip. The assignment program also could take various forms depending upon how often an assignment is desired, the extent to which the assignment order itself is varied, etc., microprocessor based, integrated circuits or other realizations being readily applicable, including shift register implementations as desired.

Figure 2A:
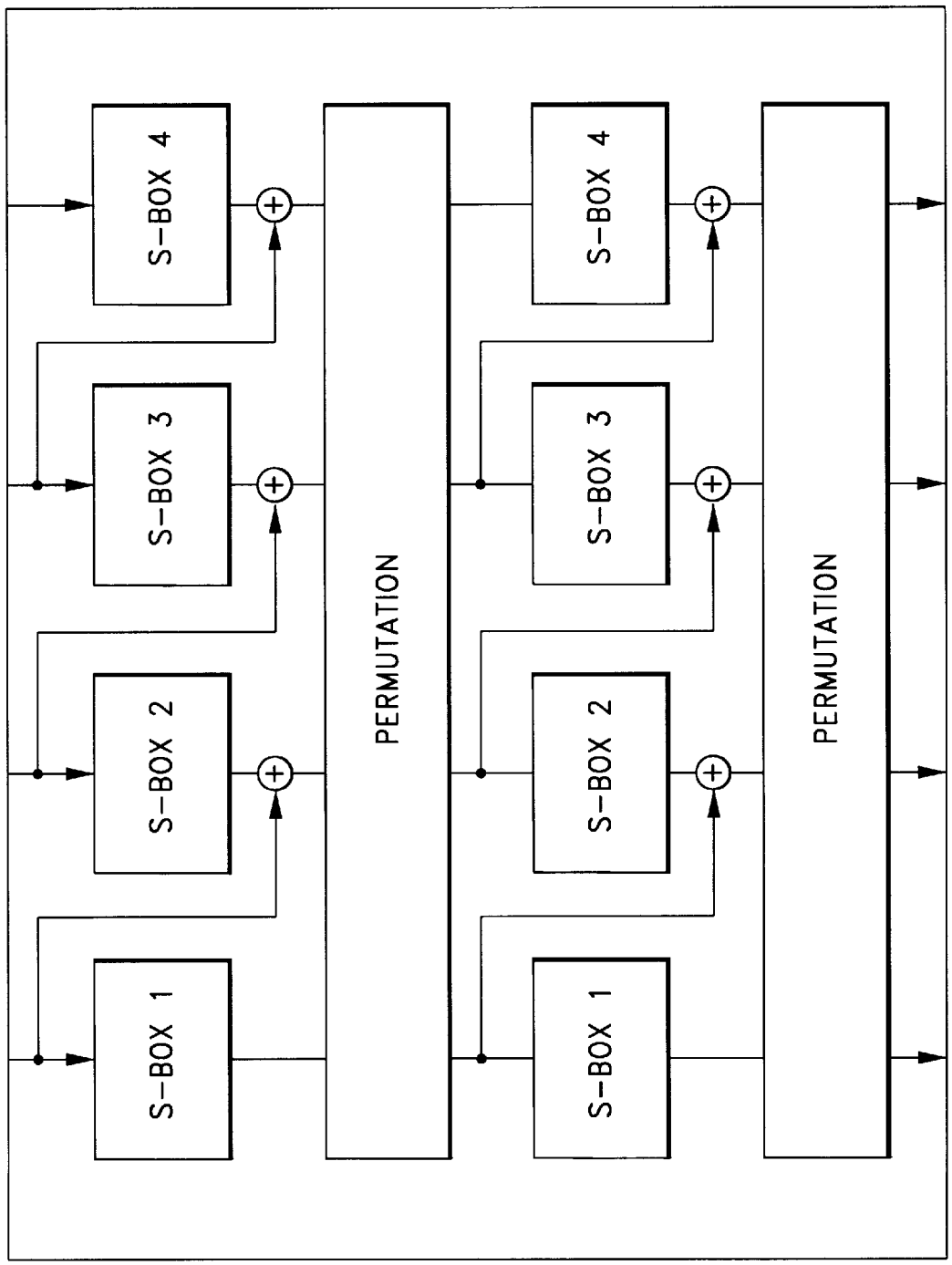
FIGS. 2A and 2B are block diagrams illustrating variations on the S/P method of encrypting data in which there is interaction between sub-blocks of data.
Figure 2B:
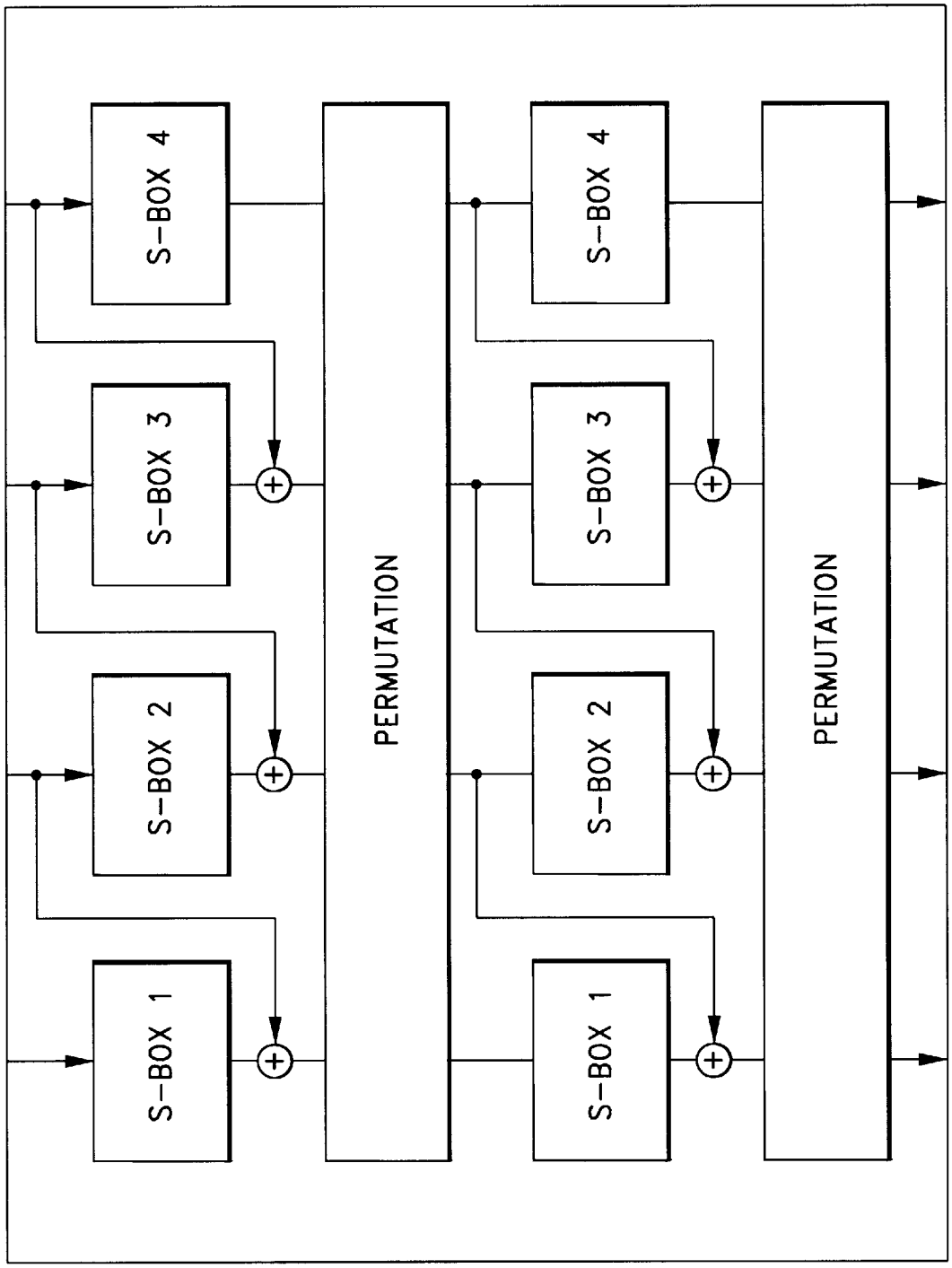
Figure 11:
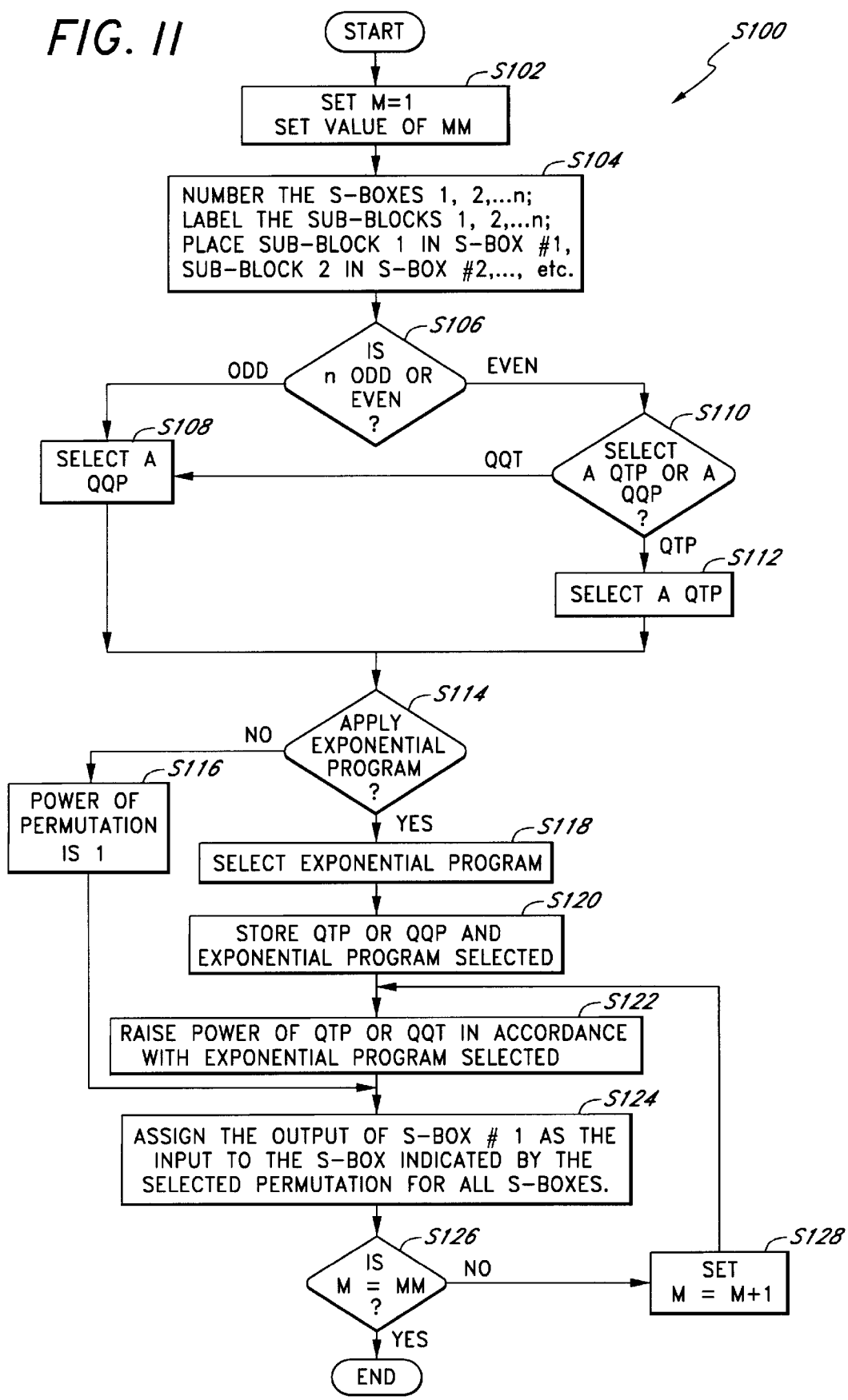
FIG. 11 is a flow chart illustrating a method for encryption in accordance with one aspect of the present invention.

FIG. 11 is a flow chart illustrating a method of encryption in accordance with one aspect of the present invention. Consider a block encryption system in which the blocks of data are subdivided into some number n of sub-blocks of equal size, that is, sub-blocks with the same number of bits in each. Each sub-block will be encrypted by an individual S-box (substitution box) as illustrated in FIGS. 2A and 2B. Assume that there will be n rounds of encryption with mixing between rounds to be accomplished by permuting the partially encrypted sub-blocks and using them as inputs, in their permuted order, to the S-boxes in the next round of encryption.

The process S100 begins by initializing various values used in the method. In step S102, the variable M is a counter which is initially set to 1, and the number of rounds of encryption, MM, is also set. The process S100 then proceeds to step S104 in which the S-boxes are numbered 1,2, . . . ,n from left to right. The sub-blocks are also labeled 1,2, . . . , n and sub-block 1 is placed in S-box 1, sub-block 2 in S-box 2, etc. The process S100 then proceeds to decision box S106 where it inquires if n is odd or even. If n is odd, the process S100 proceeds to process step S108 where a quasi-quick trickle permutation ("QQP") is selected. If n is even, process S100 proceeds to decision block S110 where it inquires if a quick trickle permutation ("QTP") or a quasi-quick trickle permutation is to be selected. If a quick trickle permutation is selected, the process S100 proceeds to process step S112 where a quick trickle permutation is selected. If a quasi-quick trickle permutation is selected instead, the process S100 proceeds to process step S108 where a quasi-quick trickle permutation is selected. Proceeding from either process step S108 or process step S112, the process S100 moves on to decision block S114 where it inquires if an exponential program is to be applied. If not, the process S100 proceeds to process step S116 where the power of permutation is selected to be 1. The process S100 then proceeds to process step S124. If an exponential program is to be applied, the process S100 proceeds to process step S118 where an exponential program is selected. Details of selection of the exponential program are provided in FIGS. 13A and 13B and in the following sections.

The process S100 then proceeds to process step S120 where the quick trickle permutation or the quasi-quick trickle permutation is stored and the exponential program selected. The process S100 then proceeds to process step S122 where the power of the quick trickle permutation or the quasi-quick trickle permutation is raised in accordance with the exponential program selected. Control is then passed to process step S124 where the outputs of the S-box 1, S-box 2, . . . , S-box n are assigned as the inputs to the S-boxes indicated by the selected permutation for all S-boxes. The process S100 then proceeds to decision block S124 where it inquires if the round number N is equal to MM. If not, then it proceeds to process step S128 where M is set to M+1 and the program returns to step S122. If M is equal to MM then the process is terminated.

Figure 12:
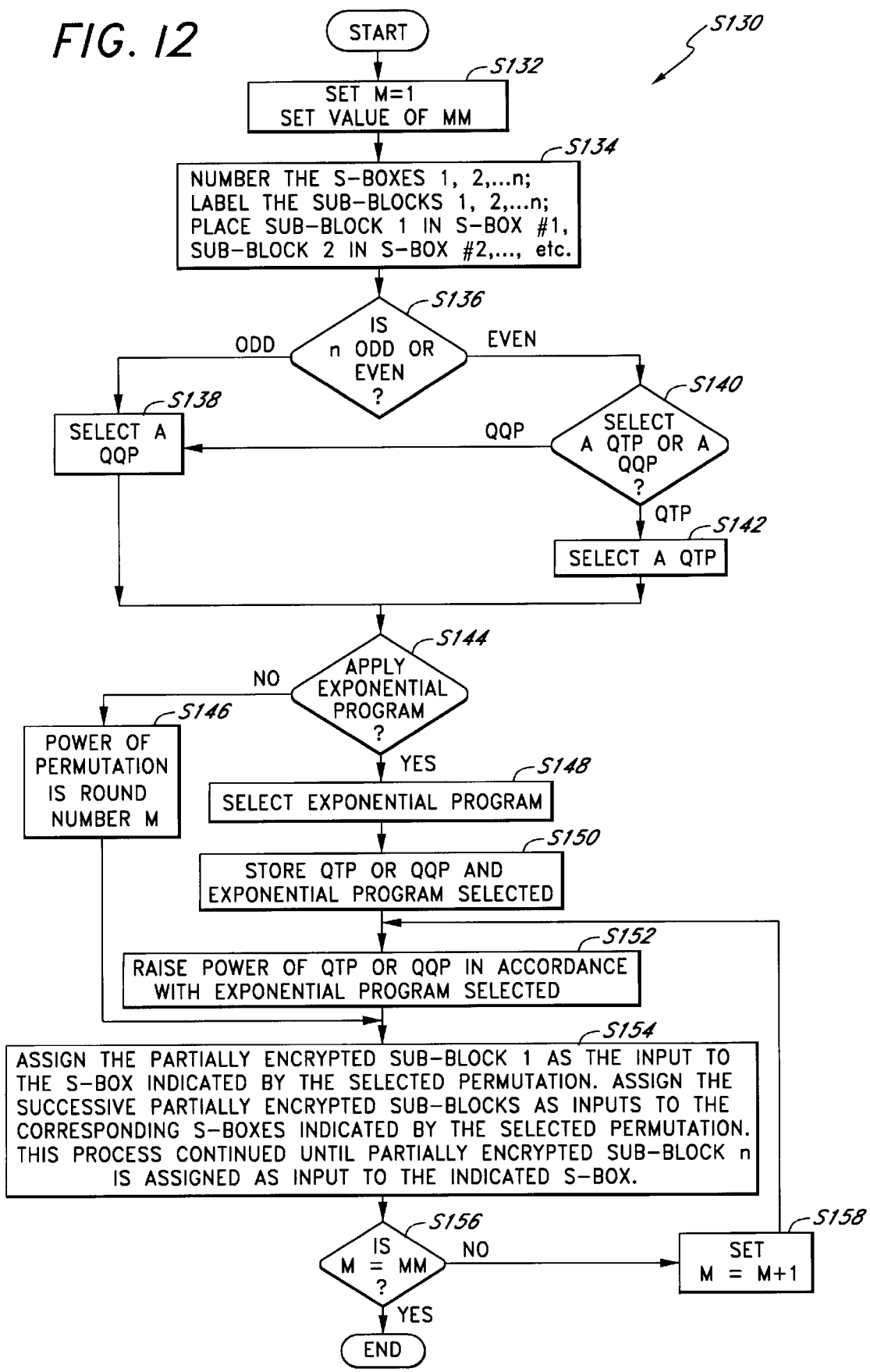
FIG. 12 is a flow chart illustrating an alternate method for encryption in accordance with the present invention.

FIG. 12 is a flow chart of an alternate method of encryption in accordance with the method of the present invention. The process S130 is identical to the process S100 with two exceptions. In decision block S144, if an exponential program is not applied, the process S130 proceeds to process step S146 where the power of the permutation is selected to be the round number M. In addition, in step S154 which corresponds to step S124 in FIG. 11, the partially encrypted sub-block 1 is assigned as the input to the S-box indicated by the selected permutation. The successive partially encrypted sub-blocks are assigned as inputs to the corresponding S-boxes indicated by the selected permutation. This process is continued until the partially encrypted sub-block n is assigned as the input to the indicated S-box.

Figure 13A:
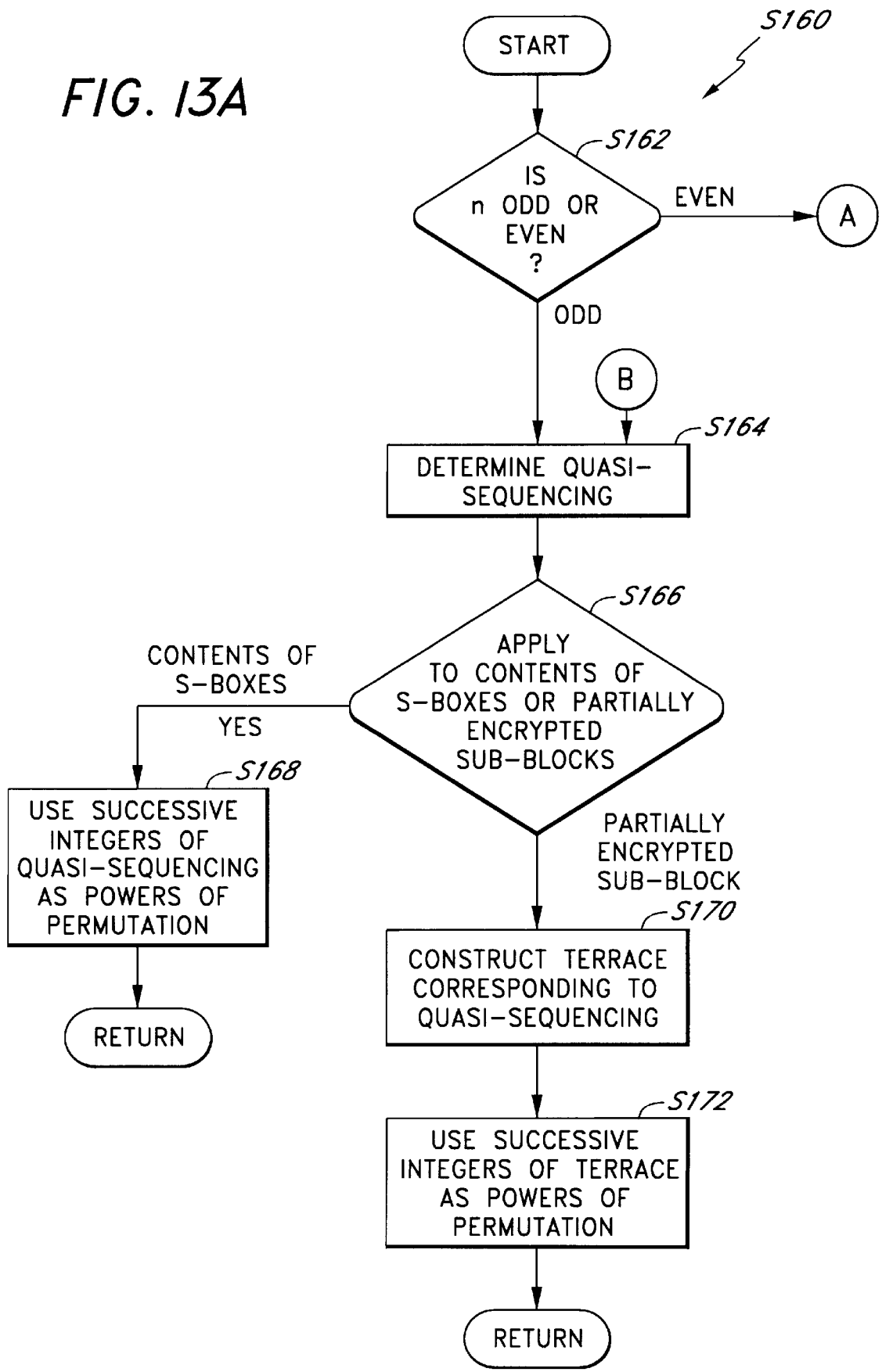
FIGS. 13A and 13B are flow charts illustrating a method for selecting the exponential program of FIGS. 10 and 11 in accordance with the present invention.
Figure 13B:
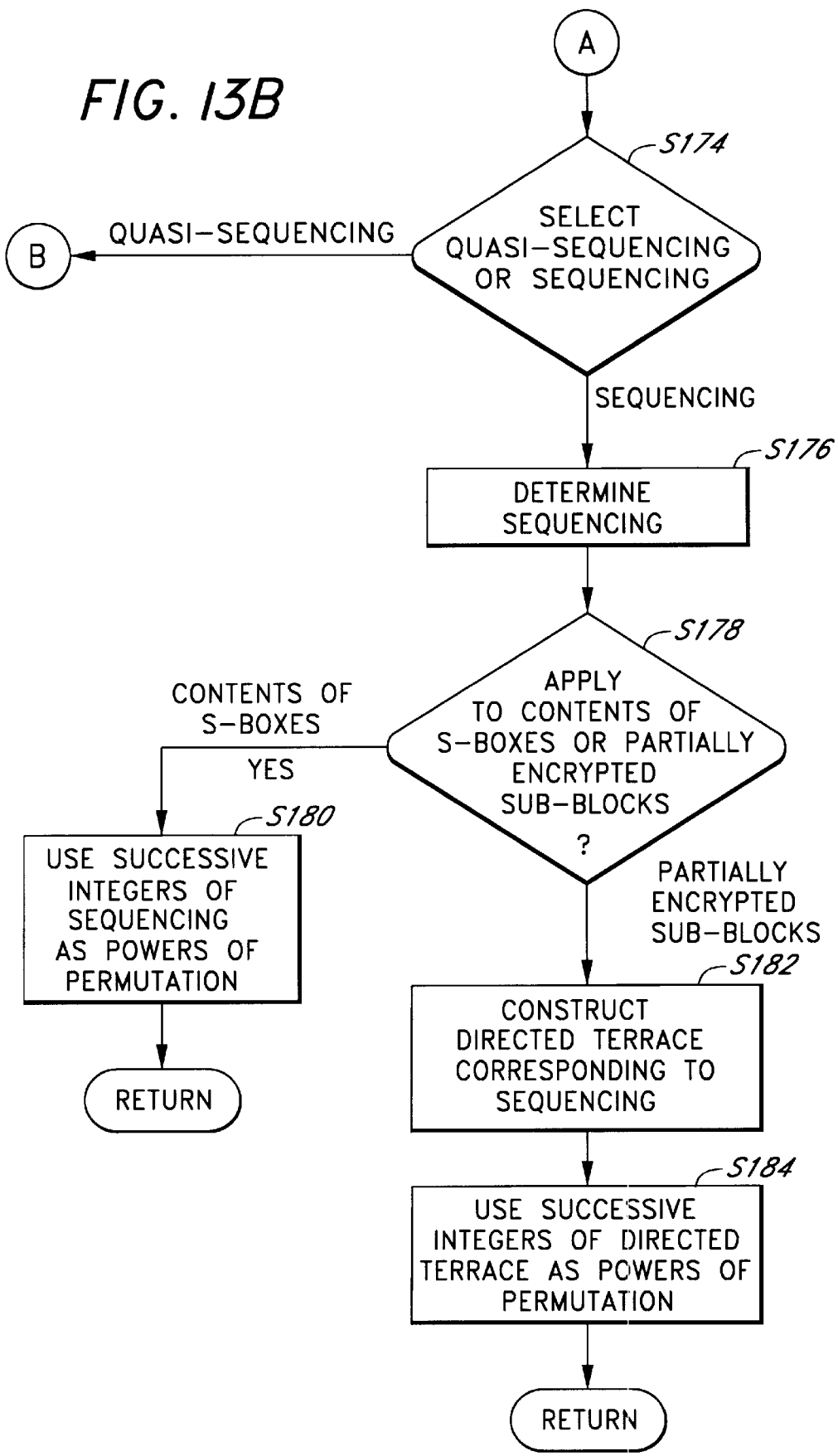

FIGS. 13A and 13B are flow charts illustrating a method for selecting the exponential program discussed in process step S118 of FIG. 11, process step S148 shown in FIG. 12, and the exponential program shown as 36a, 36b, . . . , and 36n as shown in FIG. 10. Beginning with the start state, the process S160 proceeds to decision block S162 where it inquires if n is odd or even. If n is even, the process S160 proceeds to process a as shown in detail in FIG. 13B. If n is odd, the process S160 proceeds to process step S164 where the quasi-sequencing is determined. Control is then passed to decision block S166 where the quasi-sequencing is applied to the contents of the S-boxes or the partially encrypted sub-blocks. If the quasi-sequencing is to be applied to the contents of the S-boxes, then the successive integers of sequencings are used as the powers of permutation as shown in step S168. The process then returns to the main program. If the quasi-sequencing is to be applied to partially encrypted sub-blocks, then a terrace corresponding to the quasi-sequencing is constructed as shown in step S170. The process S160 then proceeds to step S172 where successive integers of the terrace are used as powers of permutation. The process S160 then returns to the main program.

If the process S160 determines in decision step S162 that n is even, it proceeds to process A, which begins by inquiring if quasi-sequencing or sequencing is selected as shown in decision step S174. If quasi-sequencing is selected, the process S160 proceeds to process step S164. If a sequencing is selected, the process S160 proceeds to process step S176 where the sequencing is determined. The process S160 then proceeds to decision step S178 where the sequencing is applied to the contents of the S-boxes or partially encrypted sub-blocks. If a sequencing is to be applied to the contents of the S-boxes, the process S160 proceeds to process step S180 where successive integers of the sequencing are used as the powers of the permutation. If the sequencing is to be applied to the partially encrypted sub-blocks, the process S160 proceeds to process step S182 where a directed terrace corresponding to the sequencing is constructed. Control is then passed to process step S184 where successive integers of the directed terrace are used as powers of permutation.

Figure 14A:
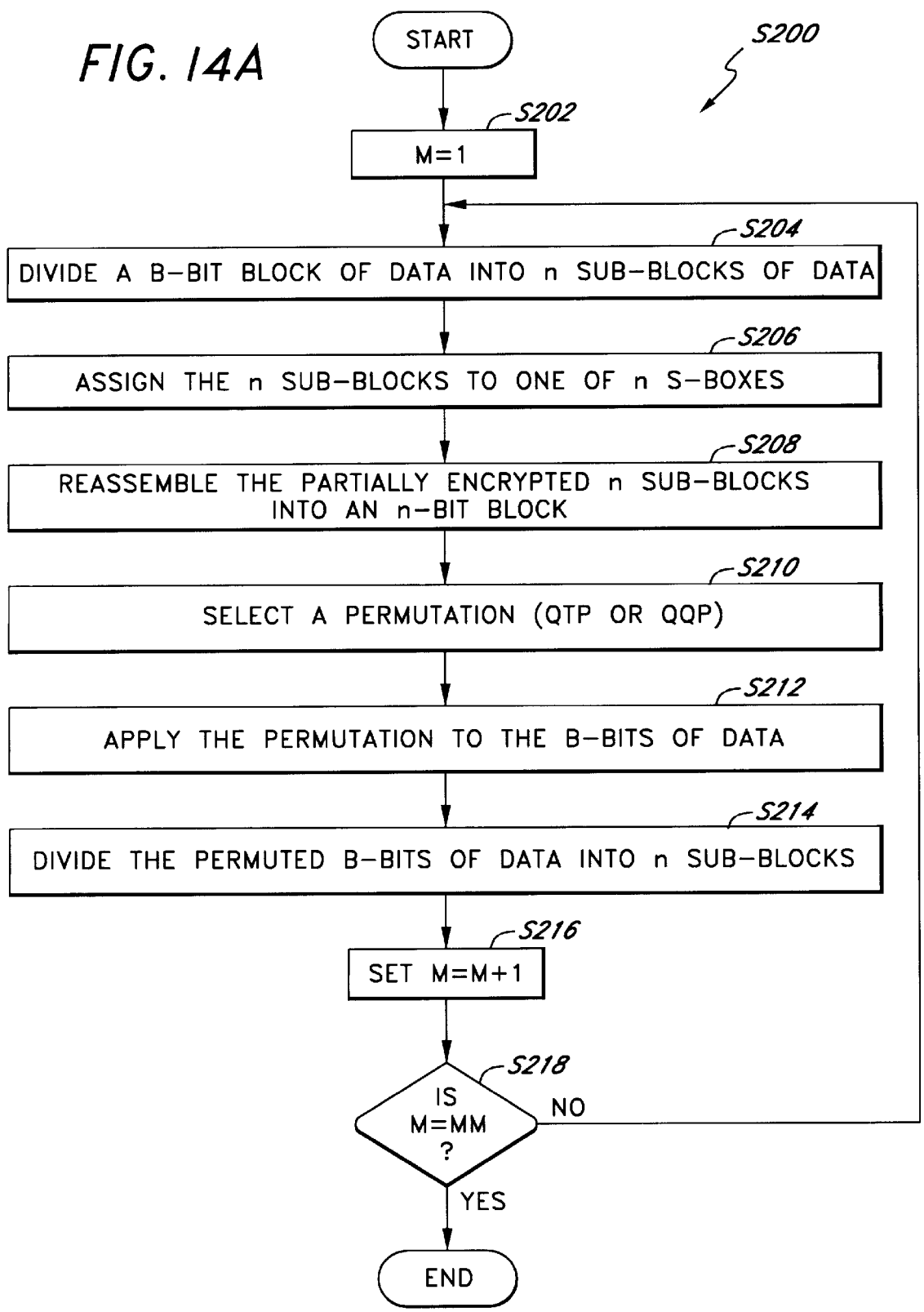
FIGS. 14A, 14B, and 14C are flow charts illustrating a further alternate method for encryption in accordance with another aspect of the present invention.
Figure 14B:
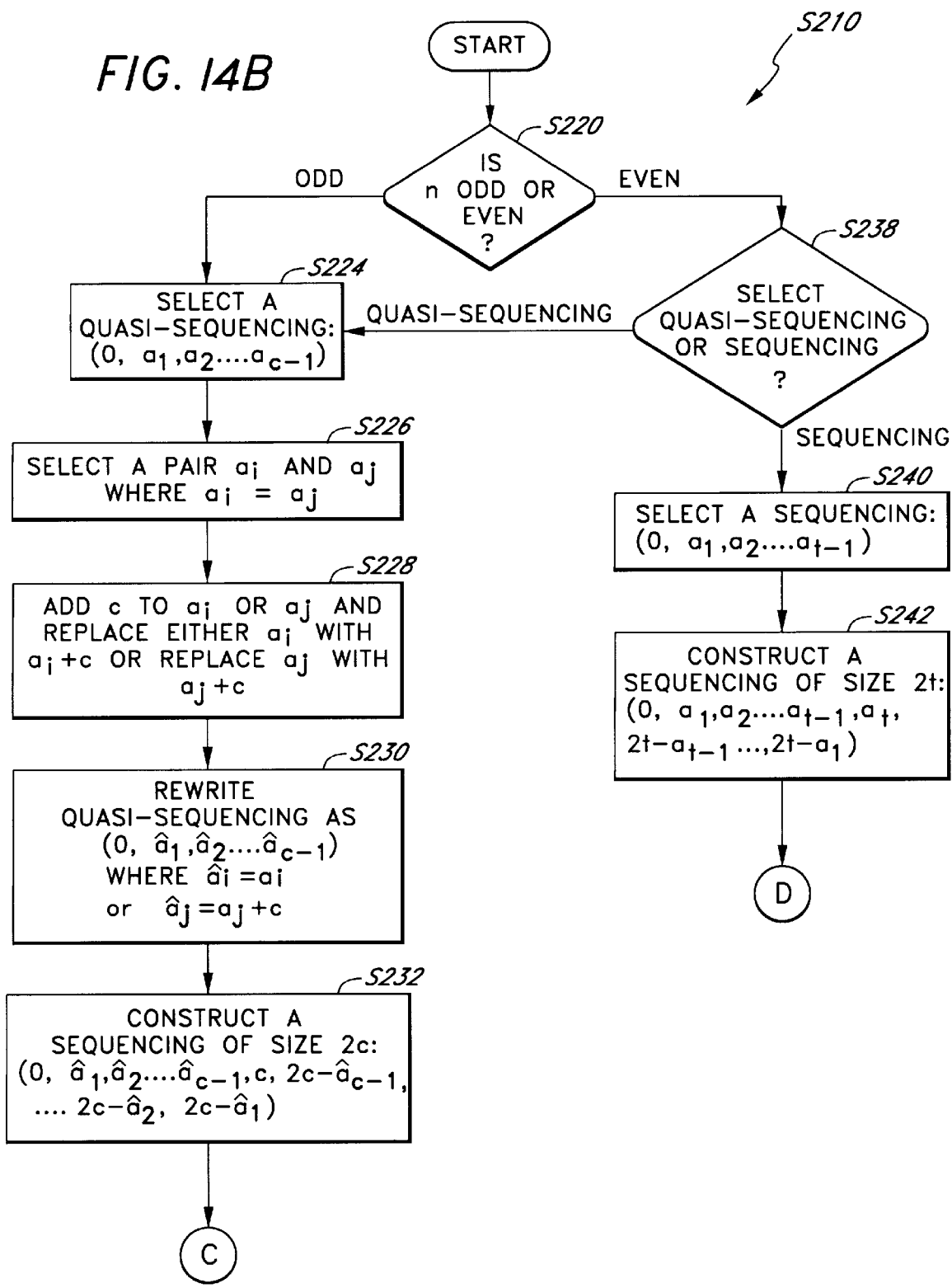
Figure 14C:
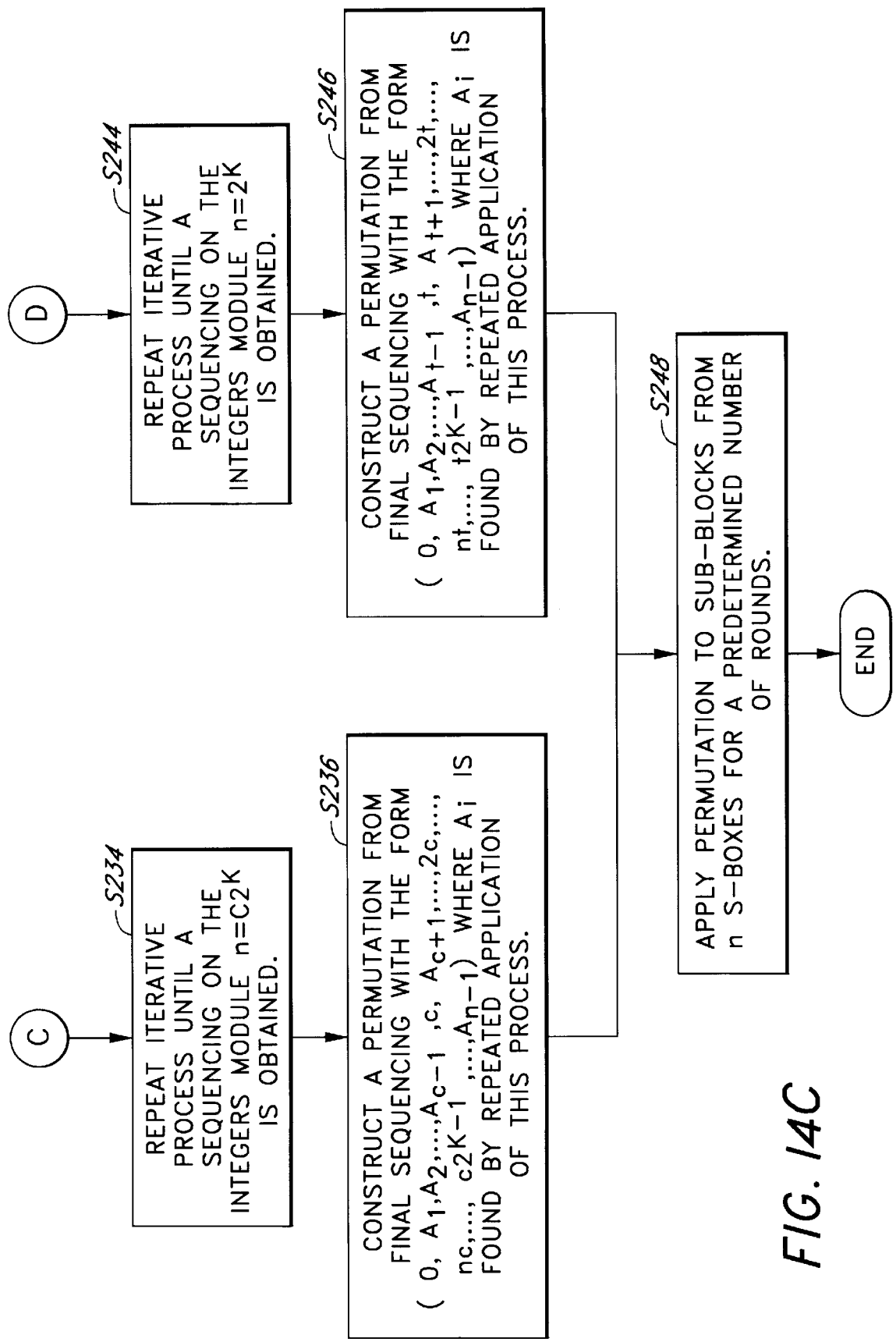

FIGS. 14A, 14B, and 14C are flow charts illustrating a further alternate method for encryption in accordance with another aspect of the present invention. With reference to FIG. 14A, the process S200 begins from a start state and proceeds to process step S202, where a counter M is set to 1. M represents the number of the round of permutation. In addition, MM, the total number of rounds is defined. In one embodiment, MM=c2k, where c is an integer. The process S200 proceeds to process step S204, where a m-bit block of data is divided into n sub-blocks of data. Next, the process S200 proceeds to process step S204 where each of the n sub-blocks is assigned to one of n S-boxes. The process S200 advances to process step S208, where the partially encrypted n sub-blocks are reassembled into an m-bit block. The process S200 then selects a permutation, as shown in step S210, and applies the permutation to the m-bits of data (step S212). Next, the process S200 divides the permuted m-bits of data into n sub-blocks as shown in step S214. The process S200 then increments M by one (step S216) and proceeds to query if M equals to MM. If not, the process S200 returns to process step S204. If M is equal to MM, the process S200 ends.

Process step S210 is illustrated in further detail in FIGS. 14B and 14C and is described below. With reference to FIGS. 14B and 14C, and beginning with a start state, the process S210 proceeds to decision block S220 to inquire if c is odd or even. If c is odd, the process S210 proceeds to process block S224, where a quasi-sequencing is selected. Any quasi-sequencing on the integers modulo c is selected, where the quasi-sequencing may be expressed as:

$$\{0, a_1, a_2, \ldots, a_{c-1}\}$$

The process S210 then proceeds to process block S226, where any pair $a_i$ and $a_j$ such that $a_i = a_j$ of the quasi-sequencing is selected. The process S210 advances to process block S228, where a constant c is added to either $a_i$ or $a_j$, and either replaces $a_i$ with $a_i+c$ or replaces $a_j$ with $a_j+c$. Next, the process S210 proceeds to process block S230, where the quasi-sequencing is rewritten as:

$$\{0, â_1, â_2, \ldots, â_{c-1}\}$$

where $â_i = a_i$ or $â_i = a_i + c$. Control is then passed to process block S232, where a sequencing of size 2c is constructed by writing:

$$\{0, â_1, â_2, \ldots, â_{c-1}, c, 2c-â_{c-1}, \ldots, 2c-â_1\}$$

This is a sequencing (not a quasi-sequencing) of size 2c, that is, sequencing of the integers modulo 2c. The process S210 then proceeds to process block S234, where this iterative process is continued until a sequencing on the integers modulo $m = c2^k$ is obtained:

$$\{0, â_1, \ldots, â_{c-1}, c, 2c-â_{c-1}, \ldots, 2c-â_1 2c, \ldots, mc-[2c-â_1] \ldots, mc-â_1\}$$

Next, control is passed to process block S236, where a quick trickle permutation is constructed from the final sequencing which has the form:

$$\{0, A_1, A_2, \ldots, A_{c-1}, c, A_{c+1}, \ldots, 2c, \ldots, mc, \ldots c^{2k-1}, \ldots A_{m-1}\}$$

where the integers $A_i$ are found by repeated application of the above process. The corresponding quick trickle is obtained as described earlier, by letting $A_i$ be the spacing between the integers i and i+1.

If the decision block S220 determines that c is even, the process S210 proceeds to a second decision block, S238, where it queries if a quasi-sequencing or a sequencing is to be applied. If a quasi-sequencing is to be applied, the process S210 proceeds to process block S224, and proceeds therefrom as described above. If a sequencing is to be applied, the process S210 proceeds to process block S240, a sequencing is selected. The sequencing of the integers modulo c is:

$$\{0 a_1, a_2, \ldots, a_{c-1}\}$$

The process S210 then proceeds to process block S242, where a sequencing of size 2c is constructed:

$$\{0, a_1, a_2, \ldots, a_{c-1}, a_c, 2c-a_{c-1}, \ldots, 2c-a_1\}$$

The process S210 then proceeds to process block S234, where this iterative process is repeated until $m = c2^k$ is reached. Control is then passed to process block S236, where a quick trickle permutation is constructed from the final sequencing which has the form:

$$\{0, A_1, A_2, \ldots, A_{c-1}, c, A_{c+1}, \ldots, 2c, \ldots, mc, \ldots, c^{2k-1}, \ldots A_{m-1}\}$$

where the integers $A_i$ are found by repeated application of the above process.

The permutation thus obtained from process block S236 is utilized in process block S244, where the set of all m bits are assembled from the S-boxes and permuted using the permutation obtained. At the end of each inter round permutation, the permuted set of m bits is divided into n sub-blocks and assigned as inputs to each S-box. The permutations may occur for any predetermined number of rounds. The process S210 then terminates.

The following sections include details of the implementation of the various examples of the above-discussed methods.

METHOD 1

Method 1 may be implemented to generate a row-complete Latin square, and involves process steps S102, S104, S106, S110, S112, S114, S116, S124, S126 and S128 as shown in FIG. 10.

Step 1: Number the S-boxes 1,2, ... ,n from left to right. Labeling the sub-blocks also 1,2, ... ,n for the first round of encryption, the first sub-block goes to the first S-box, the second sub-block to the second S-box, etc. This can be represented by the identity permutation (1) (2) (3) ... (n).

Step 2: Select a quick trickle permutation of size n, that is, a permutation of (1,2, ... ,n).

Step 3: At the end of the first round of encryption, assign the output of S-box No. 1 as the input to the S-box indicated by the permutation, that is, the number following 1 in the permutation. Assign the output of S-box No. 2 as the input to the S-box whose number is that following 2 in the permutation. Continue this process successively until the output of S-box n is assigned as input to the S-box whose number follows n in the permutation.

Step 4: At the end of the second round of encryption, proceed in a manner similar to Step 3. Assign the output of S-box No. 1 again as the input to the S-box indicated by the permutation. This will again be the number following 1 in the permutation and will be the same as in Step 3. Continue this process as in Step 3.

Steps 5 to n+1: Continue the same procedure after each round of encryption. The (n+1)th step will be to take the outputs of the S-boxes at the end of the (n−1)th round of encryption and using the same procedure as in Step 3, assign them as inputs to other S-boxes in the nth and last round of encryption.

Numerical Example of Method 1:

Let n=10. That is, there are ten S-boxes, ten sub-blocks of data, and ten rounds of encryption. Select, as the quick trickle permutation, $_{10}h_2^7$=(1 5 8 3 9 10 4 2 7 6).

For the first round, sub-block 1 goes to S-box 1, sub-block 2 to S-box 2, etc. At the end of the first round, the output of S-box 1 becomes the input to S-box 5, the output of S-box 2 becomes the input to S-box 7, the output of S-box 3 becomes the input to S-box 9, etc., and, finally, the output of S-box 10 is assigned as the input to S-box 4—all for the second round of encryption. This same procedure is followed all the way to the transition from round 9 to round 10.

Note that in this method, the procedure is concerned with the pattern of transfers between S-boxes and not the contents of the S-boxes; that is, the sub-blocks and their partially encrypted successors. For example, sub-block 1 as it is partially encrypted, follows a path through S-boxes 1→5→8→3→9→10→4→2→7→6.

METHOD 2

Method 2 may be implemented to generate a row-complete Latin square, and involves process steps S132, S134, S136, S140, S142, S144, S146, S154, S156 and S158 as shown in FIG. 11.

Step 1: Number the S-boxes 1,2, . . . ,n from left to right. Labeling the sub-blocks also 1,2, . . . ,n for the first round of encryption, the first sub-block goes to the first S-box, the second sub-block to the second S-box, etc. This can be represented by the identity permutation (1) (2) (3) . . . (n).

Step 2: Select a quick trickle permutation of size n, that is, a permutation of (1,2, . . . ,n).

Step 3: At the end of the first round of encryption, assign the partially encrypted sub-block 1 as the input to the S-box indicated by the permutation, that is, the number following 1 in the permutation. Assign the partially encrypted sub-block 2 as the input to the S-box whose number is that following 2 in the permutation. Continue this process successively until the partially encrypted sub-block n is assigned as input to the S-box whose number follows n in the permutation. Note that while this is effectively the same as Step 3 in Method 1, in Method 2, one is tracking data sub-blocks and their partially encrypted successors rather than the contents of S-boxes.

Step 4: Take the square of the permutation used in Step 3. At the end of the second round assign the partially encrypted sub-block 1 as the input to the S-box indicated by the square of the original permutation, that is, the number following 1 in the square of the permutation. Note that this is irrespective of which S-box encrypted sub-block 1 in round 2. Assign the successive partially encrypted sub-blocks as inputs to the corresponding S-boxes indicated by the square of the original permutation. This partially encrypted sub-block 2 will be assigned as the input to the S-box with the number following 2 in the square of the permutation. This process continued until partially encrypted sub-block n is assigned as input to the indicated S-box.

Steps 5 to n+1: Continue the same procedure using the cube of the original permutation after the third round, the fourth power after the fourth round, and finally after the (n−1)th round, the n−1 power of the original permutation is used to assign partially encrypted sub-block 1 to the S-box indicated by the number following 1 in the (n−1)th power of the original permutation, and successively with the remaining partially encrypted sub-blocks.

Numerical Example of Method 2:

Let n=10, as in the first example, and again choose as the quick trickle permutation $_{10}h_2^7$−(1 5 8 3 9 10 4 2 7 6)

At the end of the first round of encryption the partially encrypted sub-block, which is the output of S-box 1, is assigned as the input to S-box 5, partially encrypted sub-block 2 to S-box 7, etc. The net effect is the same as Method 1, but the attention is paid to the sub-blocks rather than to the S-boxes. At the end of the second round, one may use the square of the permutation.

$$(_{10}h_2^7)^2 = _{10}h_2^4 = (1\ 8\ 9\ 4\ 7)\ (5\ 3\ 10\ 2\ 6).$$

Applying this to the original enumeration of the data sub-blocks, partially encrypted sub-block 1 now goes to the S-box 8 for round 3, sub-block 2 goes to S-box 6, and finally, sub-block 10 goes to S-box 2.

At the end of the third round, one repeats this process, still tracking the partially encrypted versions of the original data sub-blocks and now using the cubes:

$$(_{10}h_2^7)^3 = _{10}h_2 = (1\ 3\ 4\ 6\ 8\ 10\ 7\ 5\ 9\ 2).$$

At the end of successive rounds, one uses successive powers of the original permutation:

| | | |
|---|---|---|
| Round 4: | $(_{10}h_2^7)^4 = _{10}h_2^8$ | = (1 9 7 8 4) (5 10 6 3 2) |
| Round 5: | $(_{10}h_2^7)^5 = _{10}h_2^5$ | = (1 10) (5 4) (8 2) (3 7) (9 6) |
| Round 6: | $(_{10}h_2^7)^6 = _{10}h_2^2$ | = (1 4 8 7 9) (3 6 10 5 2) |
| Round 7: | $(_{10}h_2^7)^7 = _{10}h_2^9$ | = (1 2 9 5 7 10 8 6 4 3) |
| Round 8: | $(_{10}h_2^7)^8 = _{10}h_2^6$ | = (1 7 4 9 8) (5 6 2 10 3) |
| Round 9: | $(_{10}h_2^7)^9 = _{10}h_2^3$ | = (1 6 7 2 4 10 9 3 8 5) |

Note that if one tracks the path of a given data sub-block and its partially encrypted successors, through the S-boxes, the path will be the same as in Method 1, e.g., sub-block 1 goes successively through S-boxes

1→5→8→3→9→10→4→2→7→6.

METHOD 3

Method 3 may be implemented to generate a row and column-complete Latin square, and involves the process steps S102, S104, S106, S110, S112, S114, S118, S120, S122, S124, S126 and S128 as shown in FIG. 10 and steps S162, S174, S176 and S180 as shown in FIG. 13B.

Step 1: Number the S-boxes 1,2, . . . ,n from left to right. Labeling the sub-blocks also 1,2, . . . ,n for the first round of encryption, the first sub-block goes to the first S-box, the second sub-block to the second S-box, etc. This can be represented by the identity permutation (1) (2) (3) . . . (n).

Step 2: Select a quick trickle permutation of size n, that is, a permutation of (1,2, . . . ,n).

Step 3: Select any other quick trickle permutation of size n, and determine the corresponding sequencing. Alternatively, use the sequencing corresponding to the quick trickle permutation selected in Step 2. The sequencing has the form $\{a_0.a_1.a_2. \ldots , a_{n-1}\}$.

Step 4: Use the successive integers of the sequencing as powers of the quick trickle permutation selected in Step 2. The first integer in the sequencing $a_0$ is always zero. Any permutation to the zero power is the identity permutation which leaves everything in the sequence to which it is applied, in the original order. See Step 1, Method 1.

Step 5: At the end of the first round of encryption, the permutation selected in Step 2 is taken to the power $a_1$, and applied to assign the outputs of the S-boxes. Assign the output of S-box No. 2 as the input to the S-box whose number is that following 2 in the permutation. Continue this process successively until the output of S-box n is assigned as input to the S-box whose number follows n in the permutation. (The same as Step 3 in Method 1, except that at the end of the first round of encryption.)

Step 6: At the end of the second round of encryption, proceed in a manner similar to Step 5. Assign the output of S-box No. 1 again as the input to the S-box indicated by the permutation selected in Step 2. However, the permutation is now taken to the power $a_2$. Continue this process as in Step 5.

Steps 7 to n+3: These are the same as steps 5 to n+1 in Method 1 except that successive integers $a_0.a_1.a_2.\ldots, a_{n-1}$ are used as powers of the permutation.

Numerical Example of Method 3:

Let n=10 as in the previous example, and again choose as the basic quick trickle permutation $_{10}h_2^7$=(1 5 8 3 9 10 4 2 7 6). For the second quick trickle permutation, choose:

$$_{10}g_7=(1\ 2\ 4\ 6\ 3\ 10\ 9\ 7\ 5\ 8)$$

with corresponding sequencing:

$$\{0\ 1\ 3\ 8\ 6\ 5\ 4\ 2\ 7\ 9\}.$$

As in Method 1, at the end of round 1, the partially encrypted sub-blocks are assigned as inputs to the S-boxes in accordance with the permutation X taken to the power $a_1=1$:

$$(_{10}h_2^7)^1 = _{10}h_2^7 = (1\ 5\ 8\ 3\ 9\ 10\ 4\ 2\ 7\ 6)$$

As before, the output of S-box 1 is assigned as the input to S-box 5, etc.

At the end of the second round, one uses the power of the permutation:

$$(_{10}h_2^7)^3 = _{10}h_2 = (1\ 3\ 4\ 6\ 8\ 10\ 7\ 5\ 9\ 2)$$

in order to assign the outputs of S-boxes in round 2 as inputs to S-boxes for round 3. Continuing this process, at the end of each subsequent round, one uses the power of the permutation indicated by the sequencing as follows:

| Round 3: | $(_{10}h_2^7) = _{10}h_2^6 = (1\ 7\ 4\ 9\ 8)\ (5\ 6\ 2\ 10\ 3)$ |
| Round 4: | $(_{10}h_2^7)^6 = _7h_2^2 = (1\ 4\ 8\ 7\ 9)\ (5\ 2\ 3\ 6\ 10)$ |
| Round 5: | $(_{10}h_2^7)^5 = _{10}h_2^5 = (1\ 10)\ (5\ 4)\ (8\ 2)\ (3\ 7)\ (9\ 6)$ |
| Round 6: | $(_{10}h_2^7)^4 = _{10}h_2^8 = (1\ 9\ 7\ 8\ 4)\ (5\ 10\ 6\ 3\ 2)$ |
| Round 7: | $(_{10}h_2^7)^2 = _{10}h_2^4 = (1\ 8\ 9\ 4\ 7)\ (5\ 3\ 10\ 2\ 6)$ |
| Round 8: | $(_{10}h_2^7)^7 = _{10}h_2^9 = (1\ 2\ 9\ 5\ 7\ 10\ 8\ 6\ 4\ 3)$ |
| Round 9: | $(_{10}h_2^7)^9 = _{10}h_2^3 = (1\ 6\ 7\ 2\ 4\ 10\ 9\ 3\ 8\ 5)$ |

As in Method 1, this procedure is concerned with the pattern of transfers between S-boxes and not directly with the contents of the S-boxes, that is, the sub-blocks and their partially encrypted successors. However, the permutation defines the path followed by each sub-block. For example, sub-block 1 as it is partially encrypted, follows a path through the S-boxes 1→5→9→8→7→3→2→6→4→10. (See Table 1.) Table 1 is the complete Latin square resulting from the example of Method 3.

TABLE 1

| End of Round: | 1 | 2 | 3 | 4 | 5 | 6 | 7 | 8 | 9 | 10 | Permutation Powers |
|---|---|---|---|---|---|---|---|---|---|---|---|
| 1 | A | B | C | D | E | F | G | H | I | J | |
| 2 | F | D | H | J | A | G | B | E | C | I | $h^7$ |
| 3 | D | C | F | H | B | J | I | G | A | E | h |
| 4 | G | J | E | I | F | B | D | A | H | C | $h^6$ |
| 5 | H | F | J | G | C | E | A | I | D | B | $h^2$ |

TABLE 1-continued

| End of Round: | 1 | 2 | 3 | 4 | 5 | 6 | 7 | 8 | 9 | 10 | Permutation Powers |
|---|---|---|---|---|---|---|---|---|---|---|---|
| 6 | B | I | A | C | G | D | J | F | E | H | $h^5$ |
| 7 | C | A | D | F | I | H | E | J | B | G | $h^8$ |
| 8 | E | G | I | B | H | A | F | C | J | D | $h^4$ |
| 9 | I | E | B | A | J | C | H | D | G | F | $h^9$ |
| 10 | J | H | G | E | D | I | C | B | F | A | $h^3$ |

The letters represent sub-blocks, i.e., A is sub-block 1, B is 2, . . . , and J is sub-block 10.

METHOD 4

Method 4 may be implemented to generate a row-and column-complete Latin square, involves process steps S132, S134, S136, S142, S144, S148, S150, S152, S154, S156 and S158 as in FIG. 11 and steps S162, S174, S176, S178, S182 and shown in FIG. 13B.

Step 1: Number the S-boxes 1,2, . . . ,n from left to right. Labeling the sub-blocks also 1,2, . . . ,n for the first round of encryption, the first sub-block goes to the first S-box, the second sub-block to the second S-box, etc. This can be represented by the identity permutation (1) (2) (3) . . . (n).

Step 2: Select a quick trickle permutation of size n, that is, a permutation of (1,2, . . . ,n).

Step 3: Select any other quick trickle permutation of size n, and determine the corresponding sequencing. Alternatively, use the sequencing corresponding to the quick trickle permutation selected in Step 2. The sequencing has the form $\{a_0.a_1.a_2.\ldots, a_{n-1}\}$.

Step 4: Construct the directed terrace corresponding to the sequencing $\{a_0,a_1,a_2, \ldots ,a_{n-1}\}$ where $$b_j = \sum_{i=0}^{j} a_i \text{ modulo } n.$$

$b_0=a_0=0$.

Step 5: Use the successive integers of the directed terrace $\{b_0=0,b_1,b_2, \ldots ,b_{n-1}\}$ as powers of the quick trickle permutation selected in Step 2. As in Method 3, $b_0=0$ gives the identity permutation for the original order at the beginning of round 1.

Step 6: The same as Step 3 in Method 2, at the end of the first round, except that the permutation is raised to the power $b_1$.

Step 7: The same as Step 4 in Method 2, at the end of the second round, except that instead of using the square of the permutation, the power $b_2$ is used.

Steps 8 through n+4: These are again the same as Steps 5 through n+1 in Method 2, except that instead of using as powers of the permutation the integers in natural order 3,4, . . . , n−1, use as powers $b_3, b_4, \ldots , b_{n-1}$ from the directed terrace.

Numerical Example of Method 4:

Once again, let n=10 and choose as the basic quick trickle permutation:

$$_{10}h_2^7=(1\ 5\ 8\ 3\ 9\ 10\ 4\ 2\ 7\ 6).$$

For the second quick trickle permutation again choose:

$$_{10}g_7=(1\ 2\ 4\ 6\ 3\ 10\ 9\ 7\ 5\ 8)$$

with corresponding sequencing:

$$\{0\ 1\ 3\ 8\ 6\ 5\ 4\ 2\ 7\ 9\}$$

and directed terrace:

{0 1 4 2 8 3 7 9 6 5}.

Proceeding as in Method 2, at the end of the first round of encryption, one may use the permutation $(_{10}h_2{}^7)^{b_1}=(_{10}h_2{}^7)^1=_{10}h_2{}^7$ to assign the partially encrypted sub-blocks as inputs for the second round, e.g., partially encrypted sub-block 1 which is the output of S-box 1 becomes the input to S-box 5, etc. Again, as in Method 2, one is paying attention to the sub-blocks rather than the S-boxes.

At the end of the second round, one uses $$(_{10}h_2{}^7)^{b_2}=(_{10}h_2{}^7)^4=_{10}h_2{}^8=(1\ 9\ 7\ 8\ 4)\ (5\ 10\ 6\ 3\ 2).$$

Applying this to the original enumeration of the data sub-blocks, partially encrypted sub-block 1 now goes to S-box 9 for round 3, sub-block 2 goes to S-box 5, etc., and finally sub-block 10 goes to S-box 6.

After successive rounds one applies the following permutations to the partially encrypted data sub-blocks in their original order or enumeration:

TABLE 2

| Round 3: | $(_{10}h_2{}^7)^2 = {}_{10}h_2{}^4 = (1\ 8\ 9\ 4\ 7)\ (5\ 3\ 10\ 2\ 6)$ |
| Round 4: | $(_{10}h_2{}^7)^8 = {}_{10}h_2{}^6 = (1\ 7\ 4\ 9\ 8)\ (5\ 6\ 2\ 10\ 3)$ |
| Round 5: | $(_{10}h_2{}^7)^3 = {}_{10}h_2 = (1\ 3\ 4\ 6\ 8\ 10\ 7\ 5\ 9\ 2)$ |
| Round 6: | $(_{10}h_2{}^7)^7 = {}_{10}h_2{}^9 = (1\ 2\ 9\ 5\ 7\ 10\ 8\ 6\ 4\ 3)$ |
| Round 7: | $(_{10}h_2{}^7)^9 = {}_{10}h_2{}^3 = (1\ 6\ 7\ 2\ 4\ 10\ 9\ 3\ 8\ 5)$ |
| Round 8: | $(_{10}h_2{}^7)^6 = {}_{10}h_2{}^2 = (1\ 4\ 8\ 7\ 9)\ (5\ 2\ 3\ 6\ 10)$ |
| Round 9: | $(_{10}h_2{}^7)^5 = {}_{10}h_2{}^5 = (1\ 10)\ (5\ 4)\ (8\ 2)\ (3\ 7)\ (9\ 6)$ |

Note that if one tracks the path of a given data sub-block and its partially encrypted successors, through the S-boxes, the path will be the same as in Method 3, e.g., sub-block 1 goes successively through S-boxes:

1→5→9→8→7→3→2→6→4→10.

An Alternate Use Of Quick Trickle Permutations

While the primary purpose so far for the use of quick trickle permutations, sequencings, and directed terraces has been efficient inter-round mixing, there is another application. This is key-controlled variation in the cryptographic algorithm. A complete Latin square achieved by Method 3 or 4 gives optimal inter-round mixing; however, changing from one Latin square to another alters the cryptographic algorithm without diminishing the effectiveness of the inter-round mixing. For example, in the case of n=10, there are exactly 288 quick trickle permutations which have no sub-cycles. Eighteen key bits can be used as follows: Use 9 bits to select one of the 288 quick trickle permutations to determine row completeness. A second set of 9 bits may be used to select a sequencing. The sequencing in Method 3 or the directed terrace in Method 4 may be used in conjunction with the Quick Trickle Permutation already selected. In this case, there are 288×288=82,944 possible combinations or 82,944 possible cryptographic algorithms even if the S-boxes and their tables are unchanged. This number will increase rapidly for n greater than 10.

Methods 1, 2, 3, and 4 work as written, only if n is even. This is because sequenceable groups of the integers 1 to n, with addition modulo n, exist only for n even. However there is a substitute if n is odd. This is the use of quasi-sequenceable groups as discussed earlier. Associated with these groups are permutations, slightly different from the quick trickle variety, that is, the spacings $a_1$=the spacing from i to i+1 in the permutation are no longer all unique, but have the following property: if $a_i+a_j=0$ module n (e.g., 0+0=0 and n/2+n/2=n=0 modulo n). Then that $a_i$ appears once in the quasi-sequencing.

For other values of $a_i$ one of three things happen: $a_i$ appears twice, $a_i$ appears once and its inverse modulo n appears once, or $a_i$ does not appear at all, but its inverse $a_i{}^{-1}$ appears twice. Note that the inverse $a_i{}^{-1}$ is the number such that $a_i{}^{-1}+a_i=0$ modulo n. However, as in a sequencing, the $a_i$ must also be such that $b_0=a_0=0$, $b_1=a_0+a_1$, $b_2=a_0+a_1+a_2$ etc., must all be different, that is, they must consist of all of the numbers 0, 1, 2, . . . , n−1 exactly once. We can use this for additional methods of inter-round mixing. Methods 1, 2, 3, and 4 work only if n is even.

METHOD 5

Method 5 may be implemented to generate a quasi-row-complete Latin square when n is odd or even. Method 5 is the same as Method 1 except that a quasi-quick permutation is used and thus involves process steps S102, S104, S106, S108, S114, S116, S124, S126 and S128 as shown in FIG. 11.

Numerical example of Method 5:

Let n=7. That is, there are seven S-boxes, seven sub-blocks of data, and seven rounds of encryption. Choose P=(1 2 3 5 7 4 6) as the quasi-quick permutation. The corresponding quasi-sequencing is: {0 1 1 3 5 3 5} and the terrace is: {0 1 2 5 3 6 4}. Apply P at the end of each round as in Method 1.

METHOD 6

Method 6 may be implemented to generate a quasi-row-complete Latin square when n is odd or even. Method 6 is the same as Method 2 except that a quasi-quick permutation is used. Thus, Method 6 involves process steps S132, S134, S136, S138, S144, S146, S154, S156 and S158 as shown in FIG. 12.

Numerical Example of Method 6:

Use successive powers of p=(1 2 3 5 7 4 6) as in Method 2.

METHOD 7

Method 7 may be implemented to generate a quasi-row-complete, and quasi-column-complete (quasi-complete) Latin square when n is odd or even. The procedure is the same as in Method 3 except that a quasi-quick permutation and a quasi-sequencing are used. Thus, Method 7 involves process steps S102, S104, S106, S108, S114, S118, S120, S122, 1S24, S126, S128 as shown in FIG. 11.

Numerical Example of Method 7:

Let n=7 and again choose the basic quasi-quick permutation p=(1 2 3 5 7 4 6). For the second quasi-quick permutation choose:

$$g=(1\ 4\ 5\ 7\ 3\ 6\ 2)$$

with corresponding quasi-sequencing:

{0 6 5 4 1 3 5}.

As in Method 3, the successive powers of the permutation p, applied at the end of each round, are determined by the quasi-sequencing. At the

| End of round 1: | $p^6 = (1\ 6\ 4\ 7\ 5\ 3\ 2)$ |
| End of round 2: | $p^5 = (1\ 4\ 5\ 2\ 6\ 7\ 3)$ |
| End of round 3: | $p^4 = (4\ 7\ 2\ 4\ 3\ 6\ 5)$ |
| End of round 4: | $p = (1\ 2\ 3\ 5\ 7\ 4\ 6)$ |
| End of round 5: | $p^3 = (1\ 5\ 6\ 3\ 4\ 2\ 7)$ |
| End of round 6: | $p^5 = (1\ 4\ 5\ 2\ 6\ 7\ 3)$ |

This results in the following pattern which provides a quasi-complete Latin square:

TABLE 3

| End of Round: | | | | | | | |
|---|---|---|---|---|---|---|---|
| 1 | A | B | C | D | E | F | G |
| 2 | B | C | E | F | G | A | D |
| 3 | E | G | D | B | F | C | A |
| 4 | F | A | B | G | C | D | E |
| 5 | D | F | A | E | B | G | C |
| 6 | C | E | G | A | D | B | F |
| 7 | G | D | F | C | A | E | B |

METHOD 8

Method 8 may be implemented to generate a quasi-row-complete and quasi-column-complete (quasi-complete) Latin square n is odd or even. The procedure is the same as in Method 4 except that quasi-quick permutations, a quasi-sequencing, and a terrace are used. Thus, Method 8 involves process steps S132, S134, S136, S138, S144, S148, S150, S152, S154, S156 and S158 as shown in FIG. 12 and steps S162, S174, S164, S166, S170, and S17. As shown in FIG. 13A.

Numerical Example of Method 8:

Let n=7. As in Method 7, choose as the basic quasi-quick permutation:

$p$=(1 2 3 5 7 4 6)

for the quasi-quick permutation choose:

$g$=(1 4 5 7 3 6 2)

with corresponding quasi-sequencing:

{0 6 5 4 1 3 5} and terrace:

{0 6 4 1 2 5 3}.

After successive rounds, one applies the following permutations to the partially encrypted data sub-blocks in their original order or enumeration:

| End of round 1: | $p^6$ = (1 6 4 7 5 3 2) |
|---|---|
| End of round 2: | $p^4$ = (1 7 2 4 3 6 5) |
| End of round 3: | $p$ = (1 2 3 5 7 4 6) |
| End of round 4: | $p^2$ = (1 3 7 6 2 5 4) |
| End of round 5: | $p^5$ = (1 4 5 2 6 7 3) |
| End of round 6: | $p^3$ = (1 5 6 3 4 2 7) |

This will produce the same pattern as in Method 7. There is little incentive to use the quasi-complete Latin square versus the complete Latin when n is even, although it certainly can be done with Methods 5 through 8. However a great deal of cryptographic variability and variety can be achieved for n even by using a hybrid system which produces a row-complete, quasi-column complete Latin square. In this case, horizontally, each pair of adjacent neighbors occurs exactly once, and vertically each successor pair occurs twice without regard to order, that is, A followed by B is considered to be the same as B followed by A.

METHOD 9

Method 9 may be implemented when n is even to generate a hybrid row-complete, quasi-column complete Latin square. It involves process steps S102, S104, S110, S112, S114, S118, S120, S122, S124, S126 and S128 as shown in FIG. 11 and steps S162, S174, S164, S166 and S168 as shown in FIG. 13A.

Step 1: Number the S-boxes 1, 2, . . . ,n from left to right. Labeling the sub-blocks also 1, 2, . . . ,n for the first round of encryption, the first sub-block goes to the first S-box, the second sub-block to the second S-box, etc. This can be represented by the identity permutation (1) (2) (3) . . . (n).

Step 2: Select a quick trickle permutation of size n, that is, a permutation of (1, 2, . . . ,n).

Step 3: Select a quasi-quick permutation and determine the corresponding quasi-sequencing.

Step 4: Use the successive integers of the quasi-sequencing as powers of the quick trickle permutation selected in Step 2.

Step 5: (Step 3 in Method 1: At the end of the first round of encryption, assign the outputs of S-box No. 1, S-box No. 2, . . . , S-box No. n as the inputs to the S-boxes indicated by the permutation selected in Step 2 where the permutation selected in Step 2 is taken to the power $a_1$ and applied to assign the outputs of the S-boxes at the end of the first round of encryption. Continue this process successively until the output of S-box n is assigned as input to the S-box whose number follows n in the permutation.

Step 6: At the end of the second round of encryption, proceed in a manner similar to Step 3. Assign the output of S-box No. 1, S-box No. 2, . . . , S-box No. n again as the inputs to the S-boxes indicated by the permutation, except that the permutation is now taken to the power $a_2$.

Steps 7 to n+3: These are the same as steps 5 to n+1 in Method 1 except that successive integers $a_0.a_1.a_2. \ldots , a_{n-1}$ are used as powers of the permutation.

Numerical Example of Method 9:

n=8. To generate a hybrid row-complete, quasi-column complete Latin square choose the basic quick trickle permutation:

$p$=(1 2 4 6 8 7 5 3)

for the second, quasi-quick permutation choose:

$g$=(1 2 7 3 4 6 8 5)

with quasi-sequencing:

{0 1 2 1 3 6 5 4)

and terrace:

{0 1 3 4 7 5 2 6).

As in Method 3, use powers of p as specified by the quasi-sequencing of g, as follows:

| End of round 1: | $p$ = (1 2 4 6 8 7 5 3) |
|---|---|
| End of round 2: | $p^2$ = (1 4 8 5) (2 6 7 3) |
| End of round 3: | $p$ = (1 2 4 6 8 7 5 3) |
| End of round 4: | $p^3$ = (1 6 5 2 8 3 4 7) |
| End of round 5: | $p^6$ = (1 5 8 4 ) (2 3 7 6) |
| End of round 6: | $p^5$ = (1 7 4 3 8 2 5 6) |
| End of round 7: | $p^4$ = (1 8) (2 7) (3 6) (4 5) |

This results in the following pattern which provides a row-complete, quasi-column-complete, Latin square:

TABLE 4

| End of Round: | | | | | | | | | Permutation Powers |
|---|---|---|---|---|---|---|---|---|---|
| 1 | A | B | C | D | E | F | G | H | $p^0$ |
| 2 | C | A | E | B | G | D | H | F | $p$ |
| 3 | G | E | H | C | F | A | D | B | $p^2$ |
| 4 | H | G | F | E | D | C | B | A | $p$ |
| 5 | B | D | A | F | C | H | E | G | $p^3$ |
| 6 | F | H | D | G | B | E | A | C | $p^6$ |
| 7 | E | C | G | A | H | B | F | D | $p^5$ |
| 8 | D | F | B | H | A | G | C | E | $p^4$ |

METHOD 10

Method 10 may be implemented when n is even to-generate a hybrid row-complete, quasi-column complete Latin square. The method involves process steps S132, S134, S136, S140, S142, S144, S148, S150, S152, S154, S156 and S158 as shown in FIG. 11 and steps S162, S174, S164, S166, S170 and S172 as shown in FIG. 13A.

Step 1: Number the S-boxes 1, 2, . . . ,n from left to right. Labeling the sub-blocks also 1, 2, . . . ,n for the first round of encryption, the first sub-block goes to the first S-box, the second sub-block to the second S-box, etc. This can be represented by the identity permutation (1) (2) (3) . . . (n).

Step 2: Select a quick trickle permutation of size n, that is, a permutation of (1, 2, . . . ,n).

Step 3: Select a quasi-quick permutation and determine the corresponding quasi-sequencing.

Step 4: Determine the terrace corresponding to the quasi-sequencing in Step 3 and use successive integers of the terrace as powers of the quick trickle permutation selected in Step 2.

Step 5: Use the successive integers of the directed terrace $\{b_0=0, b_1, b_2, \ldots, b_{n-1}\}$ as powers of the quick trickle permutation selected in Step 2. As in Method 3, $b_0=0$ gives the identity permutation for the original order at the beginning of round 1.

Step 6: The same as Step 3 in Method 2, at the end of the first round, except that the permutation is raised to the power $b_1$.

Step 7: The same as Step 4 in Method 2, at the end of the second round, except that instead of using the square of the permutation, the power $b_2$ is used.

Steps 8 through n+4: These are again the same as Steps 5 through n+1 in Method 2, except that instead of using as powers of the permutation the integers in natural order 3,4, . . . , n−1, use as powers $b_3, b_4, \ldots, b_{n-1}$ from the directed terrace.

Numerical Example of Method 10:

n=8. Choose the same permutation, quasi-sequencing, and terrace as in the example of Method 9. As in Method 4, use powers of P as specified by the terrace:

{0 1 3 4 7 5 2 6}

As in Methods 2, 4, 6, and 8, after successive rounds, one applies the following permutations to the partially encrypted sub-blocks in their original order or enumeration:

| End of round 1: | p = (1 2 4 6 8 7 5 3) |
|---|---|
| End of round 2: | $p^3$ = (1 6 5 2 8 3 4 7) |
| End of round 3: | $p^4$ = (1 8) (2 7) (3 6) (4 5) |
| End of round 4: | $p^7$ = (1 3 5 7 8 6 4 2) |
| End of round 5: | $p^5$ = (1 7 4 3 8 2 5 6) |
| End of round 6: | $p^2$ = (1 4 8 5) (2 6 7 3) |
| End of round 7: | $p^5$ = (1 5 8 4) (2 3 7 6) |

This will produce the same pattern as in Method 9, namely, Table 4.

METHOD 11

Method 11 may be implemented as shown in FIGS. 8, 14A 14B and 14C, using the Quick Trickle Permutation for mixing in bit permutation systems as discussed under the section "Method of Generating Large Quick Trickle Permutations." Assume that there are m bits to be encrypted in the block substitution device, divided into n sub-blocks, encrypted, assembled back into an m-bit partially encrypted word, and ready for inter-round mixing by bit permutation. Assume that there are R rounds of encryption.

Step 1: Choose or generate a quick trickle permutation as above. Select R−1 integers, less than m which are relatively prime to m, that is, numbers which have no common divisors with m. If $m=2^k$ this means that any odd numbers less than m can be selected. These will be used as exponents or powers of the quick trickle permutation P. If $m=c2^k$ where c is odd, then choose odd integers which have no common divisors of c. For example, if $m=2^6=64$, choose any odd numbers less than 64. If $m=15 \cdot 2^2=60$, choose odd numbers which are not multiples of 3 or 5, e.g., 7, 11, 13, . . . , 53, etc.

Step 2: Arrange the odd integers in arbitrary or randomly chosen order: $a_1, a_2, \ldots, a_{m-1}$. At the end of round 1, assemble the partially encrypted outputs of the individual s-boxes into an m-bit word. Permute the bits using quick trickle permutation $P^{a_i}$. The resulting permuted m-bit word is then broken into n sub-blocks again as inputs to the same S-boxes for the second round of encryption. This process is repeated until the outputs of the (R−1)th round are permuted and become the inputs to round R. This is illustrated in FIG. 8 for m=64 and using n=8 S-boxes. What is unique here is the use of and generation of quick trickle permutations with their special statistical qualities.

The present invention provides an iterated block substitution system in which the inter round mixing schemes are changed frequently. In addition, the present invention provides an iterated block substitution system in which transposition of bits or permutation of sub-blocks is not dependent upon a single or fixed permutation or transposition. Furthermore, the present invention provides a system in which an efficient mechanism is used to find permutations which will directly generate statistically optimized mixing patterns in signal processing activities thereby providing a more secure encryption process.

Modifications and variations of the embodiments described above may be made by those skilled in the art while remaining within the true scope and spirit of this invention. Thus, although the present invention has been described in terms of certain preferred embodiments, other embodiments that will be apparent to those of ordinary skill in the art are also within the scope of this invention. Accordingly, the scope of the invention is intended to be defined only by the claims which follow.

APPENDIX 1

All quick trickle permutations and sequencings for $n = 4, 6,$ and $8$. Powers with subcycles are omitted.

| Permutation | Sequencing $a_i = i \to i+1$ |
|---|---|
| $n = 4$ | $s = 2$ |
| $_4g = (1\,2\,4\,3)$ | $\{0\,1\,\underline{2}\,3\}$ |
| $_4g^3 = (1\,3\,4\,2)$ | $\{0\,3\,\underline{2}\,1\}$ |
| | |
| $n = 6$ | $s = 3$ |
| $_6g_1 = (1\,2\,4\,6\,5\,3)$ | $\{0\,1\,4\,\underline{3}\,2\,5\}$ |
| $_6g_1^5 = (1\,3\,5\,6\,4\,2)$ | $\{0\,5\,2\,\underline{3}\,4\,1\}$ |
| | |
| $_6g_2 = (1\,3\,2\,6\,4\,5)$ | $\{0\,2\,5\,\underline{3}\,1\,4\}$ |
| $_6g_2^5 = (1\,5\,4\,6\,2\,3)$ | $\{0\,4\,1\,\underline{3}\,5\,2\}$ |

| Symmetric Equivalence Class | |
|---|---|
| $n = 8$ | $s = 4$ |
| $_8g_1 = (1\,2\,4\,6\,8\,7\,5\,3)$ | $\{0\,1\,6\,3\,\underline{4}\,5\,2\,7\}$ |
| $_8g_1^3 = (1\,6\,5\,2\,8\,3\,4\,7)$ | $\{0\,3\,2\,1\,\underline{4}\,7\,6\,5\}$ |
| $_8g_1^5 = (1\,7\,4\,3\,8\,2\,5\,6)$ | $\{0\,5\,6\,7\,\underline{4}\,1\,2\,3\}$ |
| $_8g_1^7 = (1\,3\,5\,7\,8\,6\,4\,2)$ | $\{0\,7\,2\,5\,\underline{4}\,3\,6\,1\}$ |
| | |
| $_8g_2 = (1\,7\,5\,6\,8\,2\,4\,3)$ | $\{0\,5\,2\,7\,\underline{4}\,1\,6\,3\}$ |
| $_8g_2^3 = (1\,6\,4\,7\,8\,3\,5\,2)$ | $\{0\,7\,6\,5\,\underline{4}\,3\,2\,1\}$ |
| $_8g_2^5 = (1\,2\,5\,3\,8\,7\,4\,6)$ | $\{0\,1\,2\,3\,\underline{4}\,5\,6\,7\}$ |
| $_8g_2^7 = (1\,3\,4\,2\,8\,6\,5\,7)$ | $\{0\,3\,6\,1\,\underline{4}\,7\,2\,5\}$ |

Appendix 1 - Continued

Asymmetric Equivalence Class

| Permutation | Sequencing |
|---|---|
| $_sh_1 = (1\,2\,7\,4\,8\,6\,5\,3)$ | $\{0\,1\,6\,\underline{4}\,3\,7\,5\,2\}$ |
| $_sh_1^3 = (1\,4\,5\,2\,8\,3\,7\,6)$ | $\{0\,3\,2\,\underline{4}\,1\,5\,7\,6\}$ |
| $_sh_1^5 = (1\,6\,7\,3\,8\,2\,5\,4)$ | $\{0\,5\,6\,\underline{4}\,7\,3\,1\,2\}$ |
| $_sh_1^7 = (1\,3\,5\,6\,8\,4\,7\,2)$ | $\{0\,7\,2\,\underline{4}\,5\,1\,3\,6\}$ |
| | |
| $_sh_2 = (1\,7\,6\,4\,8\,5\,2\,3)$ | $\{0\,6\,1\,\underline{4}\,2\,5\,7\,3\}$ |
| $_sh_2^3 = (1\,4\,2\,7\,8\,3\,6\,5)$ | $\{0\,2\,3\,\underline{4}\,6\,7\,5\,1\}$ |
| $_sh_2^5 = (1\,5\,6\,3\,8\,7\,2\,4)$ | $\{0\,6\,5\,\underline{4}\,2\,1\,3\,7\}$ |
| $_sh_2^7 = (1\,3\,2\,5\,8\,4\,6\,7)$ | $\{0\,2\,7\,\underline{4}\,6\,3\,1\,5\}$ |
| | |
| $_sh_3 = (1\,5\,3\,2\,8\,6\,7\,4)$ | $\{0\,3\,7\,5\,2\,\underline{4}\,1\,6\}$ |
| $_sh_3^3 = (1\,2\,7\,5\,8\,4\,3\,6)$ | $\{0\,1\,5\,7\,6\,\underline{4}\,3\,2\}$ |
| $_sh_3^5 = (1\,6\,3\,4\,8\,5\,7\,2)$ | $\{0\,7\,3\,1\,2\,\underline{4}\,5\,6\}$ |
| $_sh_3^7 = (1\,4\,7\,6\,8\,2\,3\,5)$ | $\{0\,5\,1\,3\,6\,\underline{4}\,7\,2\}$ |
| | |
| $_sh_4 = (1\,5\,2\,7\,8\,6\,4\,3)$ | $\{0\,2\,5\,7\,3\,\underline{4}\,6\,1\}$ |
| $_sh_4^3 = (1\,7\,4\,5\,8\,3\,2\,6)$ | $\{0\,6\,7\,5\,1\,\underline{4}\,2\,3\}$ |
| $_sh_4^5 = (1\,6\,2\,3\,8\,5\,4\,7)$ | $\{0\,2\,1\,3\,7\,\underline{4}\,6\,5\}$ |
| $_sh_4^7 = (1\,3\,4\,6\,8\,7\,2\,5)$ | $\{0\,6\,3\,1\,5\,\underline{4}\,2\,7\}$ |

APPENDIX 2

Examples of quick trickle permutations and sequencings for $n = 10, 12, 14,$ and $16$. Powers with subcycles are omitted.

$$\begin{array}{cc} \text{Permutation} & \text{Sequencing} \\ n = 10 & s = 5 \end{array}$$

Symmetric Equivalence Class $_{10}\mathcal{E}_1 = (1\ 2\ 4\ 6\ 8\ 10\ 9\ 7\ 5\ 3)\quad\{0\ 1\ 8\ 3\ 6\ \underline{5}\ 4\ 7\ 2\ 9\}$
$_{10}\mathcal{E}_1^3 = (1\ 7\ 8\ 2\ 5\ 10\ 4\ 3\ 9\ 6)\quad\{0\ 3\ 4\ 9\ 8\ \underline{5}\ 2\ 1\ 6\ 7\}$
$_{10}\mathcal{E}_1^7 = (1\ 6\ 9\ 3\ 4\ 10\ 5\ 2\ 8\ 7)\quad\{0\ 7\ 6\ 1\ 2\ \underline{5}\ 8\ 9\ 4\ 3\}$
$_{10}\mathcal{E}_1^9 = (1\ 3\ 5\ 7\ 9\ 10\ 8\ 6\ 4\ 2)\quad\{0\ 9\ 2\ 7\ 4\ \underline{5}\ 6\ 3\ 8\ 1\}$ $_{10}\mathcal{E}_2 = (1\ 3\ 5\ 4\ 2\ 10\ 8\ 6\ 7\ 9)\quad\{0\ 4\ 7\ 2\ 9\ \underline{5}\ 1\ 8\ 3\ 6\}$
$_{10}\mathcal{E}_2^3 = (1\ 6\ 2\ 3\ 7\ 10\ 5\ 9\ 8\ 4)\quad\{0\ 2\ 1\ 6\ 7\ \underline{5}\ 3\ 4\ 9\ 8\}$
$_{10}\mathcal{E}_2^7 = (1\ 4\ 8\ 9\ 5\ 10\ 7\ 3\ 2\ 6)\quad\{0\ 8\ 9\ 4\ 3\ \underline{5}\ 7\ 6\ 1\ 2\}$
$_{10}\mathcal{E}_2^9 = (1\ 9\ 7\ 6\ 8\ 10\ 2\ 4\ 5\ 3)\quad\{0\ 6\ 3\ 8\ 1\ \underline{5}\ 9\ 2\ 7\ 4\}$ $_{10}\mathcal{E}_3 = (1\ 2\ 5\ 3\ 7\ 10\ 9\ 6\ 8\ 4)\quad\{0\ 1\ 2\ 6\ 3\ \underline{5}\ 7\ 4\ 8\ 9\}$
$_{10}\mathcal{E}_3^3 = (1\ 6\ 7\ 2\ 8\ 10\ 5\ 4\ 9\ 3)\quad\{0\ 3\ 6\ 8\ 9\ \underline{5}\ 1\ 2\ 4\ 7\}$
$_{10}\mathcal{E}_3^7 = (1\ 3\ 9\ 4\ 5\ 10\ 8\ 2\ 7\ 6)\quad\{0\ 7\ 4\ 2\ 1\ \underline{5}\ 9\ 8\ 6\ 3\}$
$_{10}\mathcal{E}_3^9 = (1\ 4\ 8\ 6\ 9\ 10\ 7\ 3\ 5\ 2)\quad\{0\ 9\ 8\ 4\ 7\ \underline{5}\ 3\ 6\ 2\ 1\}$ $_{10}\mathcal{E}_4 = (1\ 3\ 9\ 6\ 7\ 10\ 8\ 2\ 5\ 4)\quad\{0\ 7\ 4\ 8\ 9\ \underline{5}\ 1\ 2\ 6\ 3\}$
$_{10}\mathcal{E}_4^3 = (1\ 2\ 7\ 3\ 5\ 10\ 9\ 4\ 8\ 6)\quad\{0\ 1\ 2\ 4\ 7\ \underline{5}\ 3\ 6\ 8\ 9\}$
$_{10}\mathcal{E}_4^7 = (1\ 6\ 8\ 4\ 9\ 10\ 5\ 3\ 7\ 2)\quad\{0\ 9\ 8\ 6\ 3\ \underline{5}\ 7\ 4\ 2\ 1\}$
$_{10}\mathcal{E}_4^9 = (1\ 4\ 5\ 2\ 8\ 10\ 7\ 6\ 9\ 3)\quad\{0\ 3\ 6\ 2\ 1\ \underline{5}\ 9\ 8\ 4\ 7\}$

3

APPENDIX 2 - Continued

| Permutation $n = 10$ | Sequencing $s = 5$ |
|---|---|
| \multicolumn{2}{c}{Symmetric Equivalence Class} | |
| $_{10}g_5 = (1\ 7\ 8\ 6\ 2\ 10\ 4\ 3\ 5\ 9)$ | $\{0\ 4\ 3\ 9\ 2\ \underline{5}\ 8\ 1\ 7\ 6\}$ |
| $_{10}g_5^3 = (1\ 3\ 2\ 7\ 5\ 10\ 8\ 9\ 4\ 6)$ | $\{0\ 2\ 9\ 7\ 6\ \underline{5}\ 4\ 3\ 1\ 8\}$ |
| $_{10}g_5^7 = (1\ 6\ 4\ 9\ 8\ 10\ 5\ 7\ 2\ 3)$ | $\{0\ 8\ 1\ 3\ 4\ \underline{5}\ 6\ 7\ 9\ 2\}$ |
| $_{10}g_5^9 = (1\ 9\ 5\ 3\ 4\ 10\ 2\ 6\ 8\ 7)$ | $\{0\ 6\ 7\ 1\ 8\ \underline{5}\ 2\ 9\ 3\ 4\}$ |
| | |
| $_{10}g_6 = (1\ 7\ 5\ 9\ 8\ 10\ 4\ 6\ 2\ 3)$ | $\{0\ 8\ 1\ 7\ 6\ \underline{5}\ 4\ 3\ 9\ 2\}$ |
| $_{10}g_6^3 = (1\ 6\ 8\ 7\ 2\ 10\ 5\ 3\ 4\ 9)$ | $\{0\ 4\ 3\ 1\ 8\ \underline{5}\ 2\ 9\ 7\ 6\}$ |
| $_{10}g_6^7 = (1\ 9\ 4\ 3\ 5\ 10\ 2\ 7\ 8\ 6)$ | $\{0\ 6\ 7\ 9\ 2\ \underline{5}\ 8\ 1\ 7\ 4\}$ |
| $_{10}g_6^9 = (1\ 3\ 2\ 6\ 4\ 10\ 8\ 9\ 5\ 7)$ | $\{0\ 2\ 9\ 3\ 4\ \underline{5}\ 6\ 7\ 1\ 8\}$ |
| $_{10}g_7 = (1\ 2\ 4\ 6\ 3\ 10\ 9\ 7\ 5\ 8)$ | $\{0\ 1\ 3\ 8\ 6\ \underline{5}\ 4\ 2\ 7\ 9\}$ |
| $_{10}g_7^3 = (1\ 7\ 3\ 2\ 5\ 10\ 4\ 8\ 9\ 6)$ | $\{0\ 3\ 9\ 4\ 8\ \underline{5}\ 2\ 6\ 1\ 7\}$ |
| $_{10}g_7^7 = (1\ 6\ 9\ 8\ 4\ 10\ 5\ 2\ 3\ 7)$ | $\{0\ 7\ 1\ 6\ 2\ \underline{5}\ 8\ 4\ 9\ 3\}$ |
| $_{10}g_7^9 = (1\ 8\ 5\ 7\ 9\ 10\ 3\ 6\ 4\ 2)$ | $\{0\ 9\ 7\ 2\ 4\ \underline{5}\ 6\ 8\ 3\ 1\}$ |
| | |
| $_{10}g_8 = (1\ 8\ 5\ 4\ 2\ 10\ 3\ 6\ 7\ 9)$ | $\{0\ 4\ 2\ 7\ 9\ \underline{5}\ 1\ 3\ 8\ 6\}$ |
| $_{10}g_8^3 = (1\ 6\ 2\ 8\ 7\ 10\ 5\ 9\ 3\ 4)$ | $\{0\ 2\ 6\ 1\ 7\ \underline{5}\ 3\ 9\ 4\ 8\}$ |
| $_{10}g_8^7 = (1\ 4\ 3\ 9\ 5\ 10\ 7\ 8\ 2\ 6)$ | $\{0\ 8\ 4\ 9\ 3\ \underline{5}\ 7\ 1\ 6\ 2\}$ |
| $_{10}g_8^9 = (1\ 9\ 7\ 6\ 3\ 10\ 2\ 4\ 5\ 8)$ | $\{0\ 6\ 8\ 3\ 1\ \underline{5}\ 9\ 7\ 2\ 4\}$ |

APPENDIX 2 - Continued

Asymmetric Equivalence Class

| Permutation | Sequencing |
|---|---|
| $_{10}h_1 = (1\,2\,4\,3\,6\,10\,8\,5\,7\,9)$ | $\{0\,1\,2\,9\,\underline{5}\,7\,4\,8\,3\,6\}$ |
| $_{10}h_1^3 = (1\,5\,6\,2\,7\,10\,4\,9\,8\,3)$ | $\{0\,3\,6\,7\,\underline{5}\,1\,2\,4\,9\,8\}$ |
| $_{10}h_1^7 = (1\,3\,8\,9\,4\,10\,7\,2\,6\,5)$ | $\{0\,7\,4\,3\,\underline{5}\,9\,8\,6\,1\,2\}$ |
| $_{10}h_1^9 = (1\,9\,7\,5\,8\,10\,6\,3\,4\,2)$ | $\{0\,9\,8\,1\,\underline{5}\,3\,6\,2\,7\,4\}$ |
| | |
| $_{10}h_2 = (1\,3\,4\,6\,8\,10\,7\,5\,9\,2)$ | $\{0\,9\,2\,1\,\underline{5}\,6\,3\,8\,4\,7\}$ |
| $_{10}h_2^3 = (1\,5\,8\,3\,9\,10\,4\,2\,7\,6)$ | $\{0\,7\,6\,3\,\underline{5}\,8\,9\,4\,2\,1\}$ |
| $_{10}h_2^7 = (1\,6\,7\,2\,4\,10\,9\,3\,8\,5)$ | $\{0\,3\,4\,7\,\underline{5}\,2\,1\,6\,8\,9\}$ |
| $_{10}h_2^9 = (1\,2\,9\,5\,7\,10\,8\,6\,4\,3)$ | $\{0\,1\,8\,9\,\underline{5}\,4\,7\,2\,6\,3\}$ |
| | |
| $_{10}h_3 = (1\,3\,5\,7\,8\,10\,9\,2\,6\,4)$ | $\{0\,7\,4\,8\,3\,6\,\underline{5}\,1\,2\,9\}$ |
| $_{10}h_3^3 = (1\,2\,8\,3\,6\,10\,5\,4\,9\,7)$ | $\{0\,1\,2\,4\,9\,8\,\underline{5}\,3\,6\,7\}$ |
| $_{10}h_3^7 = (1\,7\,9\,4\,5\,10\,6\,3\,8\,2)$ | $\{0\,9\,8\,6\,1\,2\,\underline{5}\,7\,4\,3\}$ |
| $_{10}h_3^9 = (1\,4\,6\,2\,9\,10\,8\,7\,5\,3)$ | $\{0\,3\,6\,2\,7\,4\,\underline{5}\,9\,8\,1\}$ |
| | |
| $_{10}h_4 = (1\,5\,8\,7\,9\,10\,2\,4\,6\,3)$ | $\{0\,6\,3\,8\,4\,7\,\underline{5}\,9\,2\,1\}$ |
| $_{10}h_4^3 = (1\,4\,9\,5\,6\,10\,8\,3\,2\,7)$ | $\{0\,8\,9\,4\,2\,1\,\underline{5}\,7\,6\,3\}$ |
| $_{10}h_4^7 = (1\,7\,2\,3\,8\,10\,6\,5\,9\,4)$ | $\{0\,2\,1\,6\,8\,9\,\underline{5}\,3\,4\,7\}$ |
| $_{10}h_4^9 = (1\,3\,6\,4\,2\,10\,9\,7\,8\,5)$ | $\{0\,4\,7\,2\,6\,3\,\underline{5}\,1\,8\,9\}$ |

APPENDIX 2 - Continued

Asymmetric Equivalence Class

| Permutation | Sequencing |
|---|---|
| $_{10}h_5 = (1\ 8\ 7\ 4\ 2\ 10\ 3\ 9\ 5\ 6)$ | $\{0\ 4\ 2\ 7\ \underline{5}\ 1\ 3\ 9\ 6\ 8\}$ |
| $_{10}h_5^3 = (1\ 9\ 2\ 8\ 5\ 10\ 7\ 6\ 3\ 4)$ | $\{0\ 2\ 6\ 1\ \underline{5}\ 3\ 9\ 7\ 8\ 4\}$ |
| $_{10}h_5^7 = (1\ 4\ 3\ 6\ 7\ 10\ 5\ 8\ 2\ 9)$ | $\{0\ 8\ 4\ 9\ \underline{5}\ 7\ 1\ 3\ 2\ 6\}$ |
| $_{10}h_5^9 = (1\ 6\ 5\ 9\ 3\ 10\ 2\ 4\ 7\ 8)$ | $\{0\ 6\ 8\ 3\ \underline{5}\ 9\ 7\ 1\ 4\ 2\}$ |
| | |
| $_{10}h_6 = (1\ 8\ 7\ 4\ 9\ 10\ 6\ 2\ 5\ 3)$ | $\{0\ 7\ 2\ 4\ \underline{5}\ 8\ 6\ 9\ 3\ 1\}$ |
| $_{10}h_6^3 = (1\ 2\ 9\ 8\ 5\ 10\ 7\ 3\ 6\ 4)$ | $\{0\ 1\ 6\ 2\ \underline{5}\ 4\ 8\ 7\ 9\ 3\}$ |
| $_{10}h_6^7 = (1\ 4\ 6\ 3\ 7\ 10\ 5\ 8\ 9\ 2)$ | $\{0\ 9\ 4\ 8\ \underline{5}\ 6\ 2\ 3\ 1\ 7\}$ |
| $_{10}h_6^9 = (1\ 3\ 5\ 2\ 6\ 10\ 9\ 4\ 7\ 8)$ | $\{0\ 3\ 8\ 6\ \underline{5}\ 2\ 4\ 1\ 7\ 9\}$ |
| | |
| $_{10}h_7 = (1\ 2\ 7\ 4\ 3\ 10\ 8\ 6\ 9\ 5)$ | $\{0\ 1\ 3\ 9\ 6\ 8\ \underline{5}\ 4\ 2\ 7\}$ |
| $_{10}h_7^3 = (1\ 6\ 3\ 2\ 9\ 10\ 7\ 5\ 8\ 4)$ | $\{0\ 3\ 9\ 7\ 8\ 4\ \underline{5}\ 2\ 6\ 1\}$ |
| $_{10}h_7^7 = (1\ 4\ 8\ 5\ 7\ 10\ 9\ 2\ 3\ 6)$ | $\{0\ 7\ 1\ 3\ 2\ 6\ \underline{5}\ 8\ 4\ 9\}$ |
| $_{10}h_7^9 = (1\ 5\ 9\ 6\ 8\ 10\ 3\ 4\ 7\ 2)$ | $\{0\ 9\ 7\ 1\ 4\ 2\ \underline{5}\ 6\ 8\ 3\}$ |
| | |
| $_{10}h_8 = (1\ 9\ 7\ 4\ 3\ 10\ 5\ 6\ 2\ 8)$ | $\{0\ 8\ 6\ 9\ 3\ 1\ \underline{5}\ 7\ 2\ 4\}$ |
| $_{10}h_8^3 = (1\ 6\ 3\ 9\ 2\ 10\ 7\ 8\ 5\ 4)$ | $\{0\ 4\ 8\ 7\ 9\ 3\ \underline{5}\ 1\ 6\ 2\}$ |
| $_{10}h_8^7 = (1\ 4\ 5\ 8\ 7\ 10\ 2\ 9\ 3\ 6)$ | $\{0\ 6\ 2\ 3\ 1\ 7\ \underline{5}\ 9\ 4\ 8\}$ |
| $_{10}h_8^9 = (1\ 8\ 2\ 6\ 5\ 10\ 3\ 4\ 7\ 9)$ | $\{0\ 2\ 4\ 1\ 7\ 9\ \underline{5}\ 3\ 8\ 6\}$ |

Symmetric Equivalence Class

| | $n = 12$ | $s = 6$ |
|---|---|---|
| | Permutation | Sequencing |
| $_{12}g_1 =$ | (1 2 4 6 8 10 12 11 9 7 5 3) | {0 1 10 3 8 5 6̲ 7 4 9 2 11} |
| $_{12}g_1^5 =$ | (1 10 5 6 9 2 12 3 8 7 4 11) | {0 5 2 3 4 1 6̲ 11 8 9 10 7} |
| $_{12}g_1^7 =$ | (1 11 4 7 8 3 12 2 9 6 5 10) | {0 7 10 9 8 11 6̲ 1 4 3 2 5} |
| $_{12}g_1^{11} =$ | (1 3 5 7 9 11 12 10 8 6 4 2) | {0 11 2 9 4 7 6̲ 5 8 3 10 1} |
| | | |
| $_{12}g_2 =$ | (1 11 9 7 8 10 12 2 4 6 5 3) | {0 7 4 9 2 11 6̲ 1 10 3 8 5} |
| $_{12}g_2^5 =$ | (1 10 5 7 4 11 12 3 8 6 9 2) | {0 11 8 9 10 7 6̲ 5 2 3 4 1} |
| $_{12}g_2^7 =$ | (1 2 9 6 8 3 12 11 4 7 5 10) | {0 1 4 3 2 5 6̲ 7 10 9 8 11} |
| $_{12}g_2^{11} =$ | (1 3 5 6 4 2 12 10 8 7 9 11) | {0 5 8 3 10 1 6̲ 11 2 9 4 7} |
| | | |
| $_{12}g_3 =$ | (1 10 2 6 9 8 12 3 11 7 4 5) | {0 2 5 3 1 4 6̲ 8 11 9 7 10} |
| $_{12}g_3^5 =$ | (1 8 4 6 11 10 12 5 9 7 2 3) | {0 10 1 3 5 8 6̲ 4 7 9 11 2} |
| $_{12}g_3^7 =$ | (1 3 2 7 9 5 12 10 11 6 4 8) | {0 2 11 9 7 4 6̲ 8 5 3 1 10} |
| $_{12}g_3^{11} =$ | (1 5 4 7 11 3 12 8 9 6 2 10) | {0 10 7 9 11 8 6̲ 4 1 3 5 2} |
| | | |
| $_{12}g_4 =$ | (1 5 9 6 2 3 12 8 4 7 11 10) | {0 4 1 3 5 2 6̲ 10 7 9 11 8} |
| $_{12}g_4^5 =$ | (1 3 11 6 4 5 12 10 2 7 9 8) | {0 8 5 3 11 10 6̲ 2 11 9 7 4} |
| $_{12}g_4^7 =$ | (1 8 9 7 2 10 12 5 4 6 11 3) | {0 4 7 9 11 2 6̲ 10 1 3 5 8} |
| $_{12}g_4^{11} =$ | (1 10 11 7 4 8 12 3 2 6 9 5) | {0 8 11 9 7 10 6̲ 2 5 3 1 4} |

| $n=12$ Permutation | Symmetric - Continued Sequencing |
|---|---|
| $_{12}g_5 = (1\ 2\ 9\ 5\ 3\ 6\ 12\ 11\ 4\ 8\ 10\ 7)$ | $\{0\ 1\ 3\ 4\ 7\ 2\ \underline{6}\ 10\ 5\ 8\ 9\ 11\}$ |
| $_{12}g_5^5 = (1\ 6\ 10\ 5\ 4\ 2\ 12\ 7\ 3\ 8\ 9\ 11)$ | $\{0\ 5\ 3\ 8\ 11\ 10\ \underline{6}\ 2\ 1\ 4\ 9\ 7\}$ |
| $_{12}g_5^7 = (1\ 11\ 9\ 8\ 3\ 7\ 12\ 2\ 4\ 5\ 10\ 6)$ | $\{0\ 7\ 9\ 4\ 1\ 2\ \underline{6}\ 10\ 11\ 8\ 3\ 5\}$ |
| $_{12}g_5^{11} = (1\ 7\ 10\ 8\ 4\ 11\ 12\ 6\ 3\ 5\ 9\ 2)$ | $\{0\ 11\ 9\ 8\ 5\ 10\ \underline{6}\ 2\ 7\ 4\ 3\ 1\}$ |
| $_{12}g_6 = (1\ 4\ 2\ 10\ 5\ 6\ 12\ 9\ 11\ 3\ 8\ 7)$ | $\{0\ 2\ 7\ 4\ 3\ \underline{6}\ 11\ 9\ 8\ 5\ 10\}$ |
| $_{12}g_6^5 = (1\ 6\ 8\ 10\ 11\ 4\ 12\ 7\ 5\ 3\ 2\ 9)$ | $\{0\ 10\ 11\ 8\ 3\ 5\ \underline{6}\ 7\ 9\ 4\ 1\ 2\}$ |
| $_{12}g_6^7 = (1\ 9\ 2\ 3\ 5\ 7\ 12\ 4\ 11\ 10\ 8\ 6)$ | $\{0\ 2\ 1\ 4\ 9\ 7\ \underline{6}\ 5\ 3\ 8\ 11\ 10\}$ |
| $_{12}g_6^{11} = (1\ 7\ 8\ 3\ 11\ 9\ 12\ 6\ 5\ 10\ 2\ 4)$ | $\{0\ 10\ 5\ 8\ 9\ 11\ \underline{6}\ 1\ 3\ 4\ 7\ 2\}$ |

| | Asymmetric Equivalence Class |
|---|---|
| $_{12}h_1 = (1\;4\;2\;8\;7\;3\;12\;5\;10\;11\;9\;6)$ | $\{0\;2\;3\;8\;\underline{6}\;4\;5\;11\;7\;10\;1\;9\}$ |
| $_{12}h_1^5 = (1\;3\;9\;8\;10\;4\;12\;6\;7\;11\;2\;5)$ | $\{0\;10\;3\;4\;\underline{6}\;8\;1\;7\;11\;2\;5\;9\}$ |
| $_{12}h_1^7 = (1\;5\;2\;11\;7\;6\;12\;4\;10\;8\;9\;3)$ | $\{0\;2\;9\;8\;\underline{6}\;4\;11\;5\;1\;10\;7\;3\}$ |
| $_{12}h_1^{11} = (1\;6\;9\;11\;10\;5\;12\;3\;7\;8\;2\;4)$ | $\{0\;10\;9\;4\;\underline{6}\;8\;7\;1\;5\;2\;11\;3\}$ |
| | |
| $_{12}h_2 = (1\;4\;11\;8\;6\;7\;12\;5\;2\;10\;9\;3)$ | $\{0\;8\;3\;2\;\underline{6}\;9\;11\;0\;7\;11\;5\;4\}$ |
| $_{12}h_2^5 = (1\;7\;9\;8\;2\;4\;12\;3\;6\;10\;11\;5)$ | $\{0\;4\;3\;10\;\underline{6}\;9\;5\;2\;11\;7\;1\;8\}$ |
| $_{12}h_2^7 = (1\;5\;11\;10\;6\;3\;12\;4\;2\;8\;9\;7)$ | $\{0\;4\;9\;10\;\underline{6}\;3\;11\;2\;5\;1\;7\;8\}$ |
| $_{12}h_2^{11} = (1\;3\;9\;10\;2\;5\;12\;7\;6\;8\;11\;4)$ | $\{0\;4\;9\;10\;\underline{6}\;3\;11\;2\;5\;1\;7\;8\}$ |
| | |
| $_{12}h_3 = (1\;6\;7\;5\;2\;9\;12\;10\;4\;11\;8)$ | $\{0\;4\;5\;11\;7\;10\;1\;9\;\underline{6}\;2\;3\;8\}$ |
| $_{12}h_3^5 = (1\;9\;11\;5\;4\;6\;12\;8\;2\;3\;7\;10)$ | $\{0\;4\;11\;5\;1\;10\;7\;3\;\underline{6}\;2\;9\;8\}$ |
| $_{12}h_3^7 = (1\;10\;7\;3\;2\;8\;12\;6\;4\;5\;11\;9)$ | $\{0\;4\;11\;5\;1\;10\;7\;3\;\underline{6}\;2\;9\;8\}$ |
| $_{12}h_3^{11} = (1\;8\;11\;3\;4\;10\;12\;9\;2\;5\;7\;6)$ | $\{0\;8\;7\;1\;5\;2\;11\;3\;\underline{6}\;10\;9\;4\}$ |
| | |
| $_{12}h_4 = (1\;10\;6\;5\;11\;9\;12\;7\;4\;2\;3\;8)$ | $\{0\;9\;1\;10\;7\;11\;5\;4\;\underline{6}\;8\;3\;2\}$ |
| $_{12}h_4^5 = (1\;9\;3\;5\;4\;10\;12\;8\;11\;2\;6\;7)$ | $\{0\;9\;5\;2\;11\;7\;1\;8\;\underline{6}\;4\;3\;10\}$ |
| $_{12}h_4^7 = (1\;7\;6\;2\;11\;8\;12\;10\;4\;5\;3\;9)$ | $\{0\;3\;7\;10\;1\;5\;11\;4\;\underline{6}\;8\;9\;2\}$ |
| $_{12}h_4^{11} = (1\;8\;3\;2\;4\;7\;12\;9\;11\;5\;6\;10)$ | $\{0\;3\;1\;12\;5\;1\;7\;8\;\underline{6}\;4\;9\;10\}$ |

$n = 12$ Asymmetric $_{12}h_5 = (1\ 10\ 2\ 9\ 8\ 6\ 12\ 3\ 4\ 7\ 11\ 5)$ {0 2 5 13 $\underline{6}$ 4 7 11 10 9 8}
$_{12}h_5^5 = (1\ 6\ 11\ 9\ 4\ 10\ 12\ 5\ 8\ 7\ 2\ 3)$ {0 10 15 3 $\underline{6}$ 8 11 7 2 9 4}
$_{12}h_5^7 = (1\ 3\ 2\ 7\ 8\ 5\ 12\ 10\ 4\ 9\ 11\ 6)$ {0 2 11 7 9 $\underline{6}$ 4 1 5 10 3 8}
$_{12}h_5^{11} = (1\ 5\ 11\ 7\ 4\ 3\ 12\ 6\ 8\ 9\ 2\ 10)$ {0 10 7 11 9 $\underline{6}$ 8 5 12 3 4}

$_{12}h_6 = (1\ 7\ 11\ 2\ 3\ 6\ 12\ 10\ 9\ 4\ 8\ 5)$ {0 3 15 2 $\underline{6}$ 8 9 10 11 7 4}
$_{12}h_6^5 = (1\ 6\ 8\ 2\ 9\ 7\ 12\ 5\ 3\ 4\ 11\ 10)$ {0 3 5 11 0 $\underline{6}$ 4 9 2 7 11 8}
$_{12}h_6^7 = (1\ 10\ 11\ 4\ 3\ 5\ 12\ 7\ 9\ 2\ 8\ 6)$ {0 9 7 11 2 $\underline{6}$ 8 3 10 5 1 4}
$_{12}h_6^{11} = (1\ 5\ 8\ 4\ 9\ 10\ 12\ 6\ 3\ 2\ 11\ 7)$ {0 9 11 7 10 $\underline{6}$ 4 3 2 1 5 8}

$_{12}h_7 = (1\ 7\ 10\ 11\ 2\ 6\ 12\ 8\ 5\ 9\ 4\ 3)$ {0 4 7 11 10 9 8 $\underline{6}$ 2 5 1 3}
$_{12}h_7^5 = (1\ 6\ 4\ 11\ 5\ 7\ 12\ 3\ 2\ 9\ 10\ 8)$ {0 8 11 7 2 9 4 $\underline{6}$ 10 1 5 3}
$_{12}h_7^7 = (1\ 8\ 10\ 9\ 2\ 3\ 12\ 7\ 5\ 11\ 4\ 6)$ {0 4 15 10 3 8 $\underline{6}$ 2 11 7 9}
$_{12}h_7^{11} = (1\ 3\ 4\ 9\ 5\ 8\ 12\ 6\ 2\ 11\ 10\ 7)$ {0 8 5 12 3 4 $\underline{6}$ 10 7 11 9}

$_{12}h_8 = (1\ 7\ 5\ 4\ 11\ 3\ 12\ 8\ 2\ 6\ 9\ 10)$ {0 8 9 10 11 7 4 $\underline{6}$ 3 1 5 2}
$_{12}h_8^5 = (1\ 3\ 9\ 4\ 2\ 7\ 12\ 10\ 11\ 6\ 5\ 8)$ {0 4 9 2 7 11 8 $\underline{6}$ 3 5 11 0}
$_{12}h_8^7 = (1\ 8\ 5\ 6\ 11\ 10\ 12\ 7\ 2\ 4\ 9\ 3)$ {0 8 3 10 5 1 4 $\underline{6}$ 9 7 11 2}
$_{12}h_8^{11} = (1\ 10\ 9\ 6\ 2\ 8\ 12\ 3\ 11\ 4\ 5\ 7)$ {0 4 3 2 1 5 8 $\underline{6}$ 9 11 7 10}

Symmetric Equivalence Class

| | n = 14 | s = 7 |
|---|---|---|
| | Permutation | Sequencing |
| $_{14}S_1$ | = (1 2 4 6 8 10 12 14 13 11 9 7 5 3) | {0 1 12 3 10 5 8 7 6 9 4 11 2 13} |
| $_{14}S_1^3$ | = (1 10 9 2 12 7 4 14 5 6 13 3 8 11) | {0 3 8 9 2 1 10 7 4 13 12 5 6 11} |
| $_{14}S_1^5$ | = (1 6 12 11 5 2 8 14 9 3 4 10 13 7) | {0 5 4 1 8 11 12 7 2 3 6 13 10 9} |
| $_{14}S_1^9$ | = (1 7 13 10 4 3 9 14 8 2 5 11 12 6) | {0 9 10 13 6 3 2 7 12 11 8 1 4 5} |
| $_{14}S_1^{11}$ | = (1 11 8 3 13 6 5 14 4 7 12 2 9 10) | {0 11 6 5 12 13 4 7 10 1 2 9 8 3} |
| $_{14}S_1^{13}$ | = (1 3 5 7 9 11 13 14 12 10 8 6 4 2) | {0 13 2 11 4 9 6 7 8 5 10 3 12 1} |
| | | |
| $_{14}S_2$ | = (1 3 5 7 6 4 2 14 12 10 8 9 11 13) | {0 6 9 4 11 2 13 7 1 12 3 10 5 8} |
| $_{14}S_2^3$ | = (1 4 8 3 2 9 5 14 11 7 12 13 6 10) | {0 4 13 12 5 6 11 7 3 8 9 2 1 10} |
| $_{14}S_2^5$ | = (1 7 2 10 11 3 6 14 8 13 5 4 12 9) | {0 2 3 6 13 10 9 7 5 4 1 8 11 12} |
| $_{14}S_2^9$ | = (1 9 12 4 5 13 8 14 6 3 11 10 2 7) | {0 12 11 8 1 4 5 7 9 10 13 6 3 2} |
| $_{14}S_2^{11}$ | = (1 10 6 13 12 7 11 14 5 9 2 3 8 4) | {0 10 1 2 9 8 3 7 11 6 5 12 13 4} |
| $_{14}S_2^{13}$ | = (1 13 11 9 8 10 12 14 2 4 6 7 5 3) | {0 8 5 10 3 12 1 7 13 2 11 4 9 6} |

Asymmetric Equivalence Class

| $n = 14$ | $s = 7$ |
|---|---|
| Permutation | Sequencing |
| $_{14}h_1 = (1\ 2\ 4\ 3\ 12\ 5\ 7\ 14\ 11\ 9\ 13\ 8\ 6\ 10)$ | $\{0\ 1\ 2\ 13\ 3\ \underline{7}\ 8\ 5\ 12\ 4\ 9\ 10\ 6\ 11\}$ |
| $_{14}h_1^3 = (1\ 5\ 13\ 2\ 7\ 8\ 4\ 14\ 6\ 3\ 11\ 10\ 12\ 9)$ | $\{0\ 3\ 6\ 11\ 9\ \underline{7}\ 10\ 1\ 8\ 12\ 13\ 2\ 4\ 5\}$ |
| $_{14}h_1^5 = (1\ 3\ 7\ 9\ 6\ 2\ 12\ 14\ 13\ 10\ 4\ 5\ 11\ 8)$ | $\{0\ 5\ 10\ 9\ 1\ \underline{7}\ 12\ 11\ 4\ 6\ 3\ 8\ 2\ 13\}$ |
| $_{14}h_1^9 = (1\ 8\ 11\ 5\ 4\ 10\ 13\ 14\ 12\ 2\ 6\ 9\ 7\ 3)$ | $\{0\ 9\ 4\ 5\ 13\ \underline{7}\ 2\ 3\ 10\ 8\ 11\ 6\ 12\ 1\}$ |
| $_{14}h_1^{11} = (1\ 9\ 12\ 10\ 1\ 13\ 6\ 14\ 4\ 8\ 7\ 2\ 13\ 5)$ | $\{0\ 11\ 8\ 3\ 5\ \underline{7}\ 4\ 13\ 6\ 2\ 1\ 12\ 10\ 9\}$ |
| $_{14}h_1^{13} = (1\ 10\ 6\ 8\ 13\ 9\ 11\ 14\ 7\ 5\ 12\ 3\ 4\ 2)$ | $\{0\ 13\ 12\ 1\ 11\ \underline{7}\ 6\ 9\ 2\ 10\ 5\ 4\ 8\ 3\}$ |
| | |
| $_{14}h_2 = (1\ 8\ 3\ 2\ 4\ 5\ 10\ 14\ 12\ 7\ 11\ 9\ 6\ 13)$ | $\{0\ 3\ 13\ 2\ 1\ \underline{7}\ 11\ 6\ 10\ 9\ 4\ 12\ 5\ 8\}$ |
| $_{14}h_2^3 = (1\ 5\ 11\ 8\ 10\ 9\ 3\ 14\ 6\ 2\ 12\ 13\ 4\ 7)$ | $\{0\ 9\ 11\ 6\ 3\ \underline{7}\ 5\ 4\ 2\ 13\ 12\ 8\ 1\ 10\}$ |
| $_{14}h_2^5 = (1\ 2\ 10\ 7\ 6\ 8\ 4\ 14\ 11\ 13\ 3\ 5\ 12\ 9)$ | $\{0\ 1\ 9\ 10\ 5\ \underline{7}\ 13\ 2\ 8\ 3\ 6\ 4\ 11\ 12\}$ |
| $_{14}h_2^9 = (1\ 9\ 12\ 5\ 3\ 13\ 11\ 14\ 4\ 8\ 6\ 7\ 10\ 2)$ | $\{0\ 13\ 5\ 4\ 9\ \underline{7}\ 11\ 2\ 6\ 11\ 8\ 10\ 3\ 2\}$ |
| $_{14}h_2^{11} = (1\ 7\ 4\ 13\ 12\ 2\ 6\ 14\ 3\ 9\ 10\ 8\ 11\ 5)$ | $\{0\ 5\ 3\ 8\ 11\ \underline{7}\ 9\ 10\ 12\ 1\ 2\ 6\ 13\ 4\}$ |
| $_{14}h_2^{13} = (1\ 13\ 6\ 9\ 11\ 7\ 12\ 14\ 10\ 5\ 4\ 2\ 3\ 8)$ | $\{0\ 11\ 1\ 12\ 13\ \underline{7}\ 3\ 8\ 4\ 5\ 10\ 2\ 9\ 6\}$ |
| | |
| $_{14}h_3 = (1\ 5\ 10\ 11\ 13\ 12\ 7\ 14\ 2\ 9\ 6\ 4\ 8\ 3)$ | $\{0\ 8\ 5\ 12\ 4\ 9\ 10\ 6\ 11\ \underline{7}\ 12\ 13\ 3\}$ |
| $_{14}h_3^3 = (1\ 12\ 6\ 5\ 7\ 4\ 10\ 14\ 8\ 11\ 2\ 3\ 13\ 9)$ | $\{0\ 10\ 1\ 8\ 12\ 13\ 2\ 4\ 5\ \underline{7}\ 3\ 6\ 11\ 9\}$ |
| $_{14}h_3^5 = (1\ 11\ 7\ 9\ 8\ 5\ 13\ 14\ 6\ 3\ 10\ 12\ 2\ 4)$ | $\{0\ 12\ 11\ 4\ 6\ 3\ 8\ 2\ 13\ \underline{7}\ 5\ 10\ 9\ 1\}$ |
| $_{14}h_3^9 = (1\ 4\ 2\ 12\ 10\ 3\ 6\ 14\ 13\ 5\ 8\ 9\ 7\ 11)$ | $\{0\ 2\ 3\ 10\ 8\ 11\ 6\ 12\ 1\ \underline{7}\ 9\ 4\ 5\ 13\}$ |
| $_{14}h_3^{11} = (1\ 9\ 13\ 3\ 2\ 11\ 8\ 14\ 10\ 4\ 7\ 5\ 6\ 12)$ | $\{0\ 4\ 13\ 6\ 2\ 1\ 12\ 10\ 9\ \underline{7}\ 11\ 8\ 3\ 5\}$ |
| $_{14}h_3^{13} = (1\ 3\ 8\ 4\ 6\ 9\ 2\ 14\ 7\ 12\ 13\ 11\ 10\ 5)$ | $\{0\ 6\ 9\ 2\ 10\ 5\ 4\ 8\ 3\ \underline{7}\ 13\ 12\ 1\ 11\}$ |
| | |
| $_{14}h_4 = (1\ 8\ 10\ 3\ 12\ 11\ 13\ 14\ 5\ 9\ 7\ 2\ 6\ 4)$ | $\{0\ 11\ 6\ 10\ 9\ 4\ 12\ 5\ 8\ \underline{7}\ 3\ 13\ 2\ 1\}$ |
| $_{14}h_4^3 = (1\ 11\ 7\ 8\ 13\ 2\ 10\ 14\ 6\ 3\ 5\ 4\ 12\ 9)$ | $\{0\ 5\ 4\ 2\ 13\ 12\ 8\ 1\ 10\ \underline{7}\ 9\ 11\ 6\ 3\}$ |
| $_{14}h_4^5 = (1\ 3\ 13\ 9\ 6\ 8\ 12\ 14\ 7\ 4\ 10\ 1\ 15\ 2)$ | $\{0\ 13\ 2\ 8\ 3\ 6\ 4\ 11\ 12\ \underline{7}\ 1\ 9\ 10\ 5\}$ |
| $_{14}h_4^9 = (1\ 2\ 5\ 11\ 10\ 4\ 7\ 14\ 12\ 8\ 6\ 9\ 13\ 3)$ | $\{0\ 1\ 12\ 6\ 11\ 8\ 10\ 3\ 2\ \underline{7}\ 13\ 5\ 4\ 9\}$ |
| $_{14}h_4^{11} = (1\ 9\ 12\ 4\ 5\ 3\ 6\ 14\ 10\ 2\ 13\ 8\ 7\ 11)$ | $\{0\ 9\ 10\ 12\ 1\ 2\ 6\ 13\ 4\ \underline{7}\ 5\ 3\ 8\ 11\}$ |
| $_{14}h_4^{13} = (1\ 4\ 6\ 2\ 7\ 9\ 5\ 14\ 13\ 11\ 12\ 3\ 10\ 8)$ | $\{0\ 3\ 8\ 4\ 5\ 10\ 2\ 9\ 6\ \underline{7}\ 11\ 11\ 12\ 13\}$ |

Symmetric Equivalence Class

| | n = 16 | s = 8 |
|---|---|---|
| | Permutation | Sequencing |
| $_{16}\delta_1$ = | (1 2 4 6 8 10 12 14 16 15 13 11 9 7 5 3) | {0 1 14 3 12 5 10 7 $\underline{8}$ 9 6 11 4 13 2 15} |
| $_{16}\delta_1^3$ = | (1 11 12 2 9 14 4 7 16 6 5 15 8 3 13 10) | {0 3 10 9 4 15 14 5 $\underline{8}$ 11 2 11 2 7 6 13} |
| $_{16}\delta_1^5$ = | (1 7 13 14 8 2 5 11 16 10 4 3 9 15 12 6) | {0 5 6 15 12 9 2 3 $\underline{8}$ 13 14 7 4 11 0 11} |
| $_{16}\delta_1^7$ = | (1 14 5 10 9 6 13 2 16 3 12 7 8 11 4 15) | {0 7 2 5 4 3 6 1 $\underline{8}$ 15 10 13 12 11 14 9} |
| $_{16}\delta_1^9$ = | (1 15 4 11 8 7 12 3 16 2 13 6 9 10 5 14) | {0 9 14 11 12 13 10 15 $\underline{8}$ 1 6 3 4 5 2 7} |
| $_{16}\delta_1^{11}$ = | (1 6 12 15 9 3 4 10 16 11 5 2 8 14 13 7) | {0 11 10 14 7 14 13 $\underline{8}$ 3 2 9 12 15 6 5} |
| $_{16}\delta_1^{13}$ = | (1 10 13 3 8 15 5 6 16 7 4 14 9 2 12 11) | {0 13 6 7 12 12 11 $\underline{8}$ 5 14 15 4 9 10 3} |
| $_{16}\delta_1^{15}$ = | (1 3 5 7 9 11 13 15 16 14 12 10 8 6 4 2) | {0 15 2 13 4 11 6 9 $\underline{8}$ 7 10 5 12 3 14 1} |
| | | |
| $_{16}\delta_2$ = | (1 3 5 7 8 6 4 2 16 14 12 10 9 11 13 15) | {0 7 10 5 12 3 14 1 $\underline{8}$ 15 2 13 4 11 6 9} |
| $_{16}\delta_2^3$ = | (1 10 4 3 9 2 5 11 16 7 13 14 8 15 12 6) | {0 5 14 15 4 9 10 3 $\underline{8}$ 13 6 7 12 1 2 11} |
| $_{16}\delta_2^5$ = | (1 11 12 2 8 13 10 16 6 5 15 9 14 4 7) | {0 3 2 9 12 15 6 5 $\underline{8}$ 11 10 14 7 14 13} |
| $_{16}\delta_2^7$ = | (1 2 13 6 9 7 12 3 16 15 4 11 8 10 5 14) | {0 1 6 3 4 5 2 7 $\underline{8}$ 9 14 11 12 13 10 15} |
| $_{16}\delta_2^9$ = | (1 14 5 10 8 11 4 15 16 3 12 7 9 6 13 2) | {0 15 10 13 12 11 14 9 $\underline{8}$ 7 2 5 4 3 6 1} |
| $_{16}\delta_2^{11}$ = | (1 7 4 14 9 15 5 6 16 10 13 3 8 2 12 11) | {0 13 14 7 4 11 0 11 $\underline{8}$ 5 6 15 12 9 2 3} |
| $_{16}\delta_2^{13}$ = | (1 6 12 15 8 14 13 7 16 11 5 2 9 3 4 10) | {0 11 2 11 2 7 6 13 $\underline{8}$ 3 10 9 4 15 14 5} |
| $_{16}\delta_2^{15}$ = | (1 15 13 11 9 10 12 14 16 2 4 6 8 7 5 3) | {0 9 6 11 4 13 2 15 $\underline{8}$ 1 14 3 12 5 10 7} |

$n = 16$    Symmetric Equivalence Classes - Continued $_{16}g_3 = (1\ 14\ 13\ 2\ 9\ 6\ 12\ 7\ 16\ 3\ 4\ 15\ 8\ 11\ 5\ 10)$    $\{0\ 3\ 6\ 14\ 7\ 2\ 5\ \underline{8}\ 11\ 14\ 9\ 12\ 15\ 10\ 13\}$ $_{16}g_3^3 = (1\ 15\ 12\ 14\ 8\ 7\ 13\ 11\ 16\ 2\ 5\ 3\ 9\ 10\ 4\ 6)$    $\{0\ 9\ 2\ 3\ 12\ 5\ 6\ 15\ \underline{8}\ 1\ 10\ 11\ 4\ 13\ 14\ 7\ 3\}$ $_{16}g_3^5 = (1\ 11\ 4\ 7\ 9\ 14\ 5\ 15\ 16\ 6\ 13\ 10\ 8\ 3\ 12\ 2)$    $\{0\ 15\ 14\ 5\ 4\ 3\ 10\ 9\ \underline{8}\ 7\ 6\ 13\ 12\ 11\ 2\ 1\}$ $_{16}g_3^7 = (1\ 7\ 5\ 6\ 8\ 2\ 4\ 14\ 16\ 10\ 12\ 11\ 9\ 15\ 13\ 3)$    $\{0\ 5\ 10\ 7\ 12\ 1\ 14\ 3\ \underline{8}\ 13\ 2\ 15\ 4\ 9\ 6\ 11\}$ $_{16}g_3^9 = (1\ 3\ 13\ 15\ 9\ 11\ 12\ 10\ 16\ 14\ 4\ 2\ 8\ 6\ 5\ 7)$    $\{0\ 11\ 6\ 9\ 4\ 15\ 2\ 13\ \underline{8}\ 3\ 14\ 1\ 12\ 7\ 10\ 5\}$ $_{16}g_3^{11} = (1\ 2\ 12\ 3\ 8\ 10\ 13\ 6\ 16\ 15\ 5\ 14\ 9\ 7\ 4\ 11)$    $\{0\ 1\ 2\ 11\ 12\ 13\ 6\ 7\ \underline{8}\ 9\ 10\ 3\ 4\ 5\ 14\ 15\}$ $_{16}g_3^{13} = (1\ 6\ 4\ 10\ 9\ 3\ 5\ 2\ 16\ 11\ 13\ 7\ 8\ 14\ 12\ 15)$    $\{0\ 7\ 14\ 13\ 4\ 11\ 10\ 1\ \underline{8}\ 15\ 6\ 5\ 12\ 3\ 2\ 9\}$ $_{16}g_3^{15} = (1\ 10\ 5\ 11\ 8\ 15\ 4\ 3\ 16\ 7\ 12\ 6\ 9\ 2\ 13\ 14)$    $\{0\ 13\ 10\ 15\ 12\ 9\ 14\ 11\ \underline{8}\ 5\ 2\ 7\ 4\ 1\ 6\ 3\}$ $_{16}g_4 = (1\ 14\ 4\ 15\ 8\ 11\ 12\ 7\ 16\ 3\ 13\ 2\ 9\ 6\ 5\ 10)$    $\{0\ 11\ 14\ 9\ 12\ 15\ 10\ 13\ \underline{8}\ 3\ 6\ 1\ 4\ 7\ 2\ 5\}$ $_{16}g_4^3 = (1\ 2\ 12\ 14\ 9\ 7\ 4\ 6\ 16\ 15\ 5\ 3\ 8\ 10\ 13\ 11)$    $\{0\ 1\ 10\ 11\ 4\ 13\ 14\ 7\ \underline{8}\ 9\ 2\ 3\ 12\ 5\ 6\ 15\}$ $_{16}g_4^5 = (1\ 6\ 13\ 7\ 8\ 14\ 5\ 2\ 16\ 11\ 4\ 10\ 9\ 3\ 12\ 15)$    $\{0\ 7\ 6\ 13\ 12\ 11\ 2\ 1\ \underline{8}\ 15\ 14\ 5\ 4\ 3\ 10\ 9\}$ $_{16}g_4^7 = (1\ 7\ 5\ 11\ 9\ 15\ 13\ 14\ 16\ 10\ 12\ 6\ 8\ 2\ 4\ 3)$    $\{0\ 13\ 2\ 15\ 4\ 9\ 6\ 11\ \underline{8}\ 5\ 10\ 7\ 12\ 1\ 14\ 3\}$ $_{16}g_4^9 = (1\ 3\ 4\ 2\ 8\ 6\ 12\ 10\ 16\ 14\ 13\ 15\ 9\ 11\ 5\ 7)$    $\{0\ 3\ 14\ 1\ 12\ 7\ 10\ 5\ \underline{8}\ 11\ 6\ 9\ 4\ 15\ 2\ 13\}$ $_{16}g_4^{11} = (1\ 15\ 12\ 3\ 9\ 10\ 4\ 11\ 16\ 2\ 5\ 14\ 8\ 7\ 13\ 6)$    $\{0\ 9\ 10\ 3\ 4\ 5\ 14\ 15\ \underline{8}\ 1\ 2\ 11\ 12\ 13\ 6\ 7\}$ $_{16}g_4^{13} = (1\ 11\ 13\ 10\ 8\ 3\ 5\ 15\ 16\ 6\ 4\ 7\ 9\ 14\ 12\ 2)$    $\{0\ 15\ 6\ 5\ 12\ 3\ 2\ 9\ \underline{8}\ 7\ 14\ 13\ 4\ 11\ 10\ 1\}$ $_{16}g_4^{15} = (1\ 10\ 5\ 6\ 9\ 2\ 13\ 3\ 16\ 7\ 12\ 11\ 8\ 15\ 4\ 14)$    $\{0\ 5\ 2\ 7\ 4\ 1\ 6\ 3\ \underline{8}\ 13\ 10\ 15\ 12\ 9\ 14\ 11\}$ $n = 16$ Symmetric Equivalence Classes - Continued $_{16}g_5 = (1\ 2\ 10\ 13\ 9\ 6\ 12\ 3\ 16\ 15\ 7\ 4\ 8\ 11\ 5\ 14)$ $\{0\ 1\ 6\ 4\ 3\ 7\ 5\ 2\ 8\ 14\ 11\ 9\ 13\ 12\ 10\ 15\}$ $_{16}g_5^3 = (1\ 4\ 12\ 2\ 8\ 3\ 10\ 11\ 16\ 13\ 5\ 15\ 9\ 14\ 7\ 6)$ $\{0\ 3\ 2\ 12\ 9\ 5\ 15\ 6\ 8\ 10\ 1\ 11\ 7\ 4\ 14\ 13\}$ $_{16}g_5^5 = (1\ 11\ 7\ 3\ 9\ 2\ 5\ 4\ 16\ 6\ 10\ 14\ 8\ 15\ 12\ 13)$ $\{0\ 5\ 14\ 4\ 15\ 3\ 9\ 10\ 8\ 6\ 7\ 13\ 1\ 12\ 2\ 11\}$ $_{16}g_5^7 = (1\ 3\ 5\ 6\ 8\ 13\ 7\ 2\ 16\ 14\ 12\ 11\ 9\ 4\ 10\ 15)$ $\{0\ 7\ 10\ 12\ 5\ 13\ 14\ 8\ 2\ 13\ 15\ 11\ 4\ 6\ 9\}$ $_{16}g_5^9 = (1\ 15\ 10\ 4\ 9\ 11\ 12\ 14\ 16\ 2\ 7\ 13\ 8\ 6\ 5\ 3)$ $\{0\ 9\ 6\ 4\ 11\ 15\ 13\ 2\ 8\ 14\ 3\ 1\ 5\ 12\ 10\ 7\}$ $_{16}g_5^{11} = (1\ 13\ 12\ 15\ 8\ 14\ 10\ 6\ 16\ 4\ 5\ 2\ 9\ 3\ 7\ 11)$ $\{0\ 11\ 2\ 12\ 1\ 13\ 7\ 6\ 8\ 10\ 9\ 3\ 15\ 4\ 14\ 5\}$ $_{16}g_5^{13} = (1\ 6\ 7\ 14\ 9\ 15\ 5\ 13\ 16\ 11\ 10\ 3\ 8\ 2\ 12\ 4)$ $\{0\ 13\ 14\ 4\ 7\ 11\ 1\ 10\ 8\ 6\ 15\ 5\ 9\ 12\ 2\ 3\}$ $_{16}g_5^{15} = (1\ 14\ 5\ 11\ 8\ 4\ 7\ 15\ 16\ 3\ 12\ 6\ 9\ 13\ 10\ 2)$ $\{0\ 15\ 10\ 12\ 13\ 9\ 11\ 14\ 8\ 2\ 5\ 7\ 3\ 4\ 6\ 1\}$ $_{16}g_6 = (1\ 14\ 4\ 11\ 8\ 7\ 15\ 12\ 16\ 3\ 13\ 6\ 9\ 10\ 2\ 5)$ $\{0\ 14\ 11\ 9\ 13\ 12\ 10\ 15\ 8\ 1\ 6\ 4\ 3\ 7\ 5\ 2\}$ $_{16}g_6^3 = (1\ 6\ 15\ 14\ 9\ 12\ 4\ 10\ 16\ 11\ 2\ 3\ 8\ 5\ 13\ 7)$ $\{0\ 10\ 1\ 11\ 7\ 4\ 14\ 13\ 8\ 3\ 2\ 12\ 9\ 5\ 15\ 6\}$ $_{16}g_6^5 = (1\ 10\ 13\ 12\ 8\ 14\ 2\ 6\ 16\ 7\ 4\ 5\ 9\ 3\ 15\ 11)$ $\{0\ 6\ 7\ 13\ 1\ 12\ 2\ 11\ 8\ 5\ 14\ 4\ 15\ 3\ 9\ 10\}$ $_{16}g_6^7 = (1\ 12\ 2\ 7\ 9\ 11\ 13\ 14\ 16\ 5\ 15\ 10\ 8\ 6\ 4\ 3)$ $\{0\ 2\ 13\ 15\ 11\ 4\ 6\ 9\ 8\ 7\ 10\ 12\ 5\ 13\ 14\}$ $_{16}g_6^9 = (1\ 3\ 4\ 6\ 8\ 10\ 15\ 5\ 16\ 14\ 13\ 11\ 9\ 7\ 2\ 12)$ $\{0\ 14\ 3\ 1\ 5\ 12\ 10\ 7\ 8\ 9\ 6\ 4\ 11\ 15\ 13\ 2\}$ $_{16}g_6^{11} = (1\ 11\ 15\ 3\ 9\ 5\ 4\ 7\ 16\ 6\ 2\ 14\ 8\ 12\ 13\ 10)$ $\{0\ 10\ 9\ 3\ 15\ 4\ 14\ 5\ 8\ 11\ 2\ 12\ 1\ 13\ 7\ 6\}$ $_{16}g_6^{13} = (1\ 7\ 13\ 5\ 8\ 3\ 2\ 11\ 16\ 10\ 4\ 12\ 9\ 14\ 15\ 1)$ $\{0\ 6\ 15\ 5\ 9\ 12\ 2\ 3\ 8\ 13\ 14\ 4\ 7\ 11\ 1\ 10\}$ $_{16}g_6^{15} = (1\ 5\ 2\ 10\ 9\ 6\ 13\ 3\ 16\ 12\ 15\ 7\ 8\ 11\ 4\ 14)$ $\{0\ 2\ 5\ 7\ 3\ 4\ 6\ 1\ 8\ 15\ 10\ 12\ 13\ 9\ 11\ 14\}$ Asymmetric Equivalence Class n = 16    s = 8

| Permutation | Sequencing |
|---|---|
| $_{16}h_1 = (1\ 2\ 13\ 3\ 6\ 8\ 12\ 11\ 16\ 4\ 9\ 7\ 5\ 15\ 10\ 14)$ | $\{0\ 1\ 2\ 6\ 3\ \underline{8}\ 7\ 10\ 5\ 4\ 9\ 15\ 12\ 13\ 14\ 11\}$ |
| $_{16}h_1^3 = (1\ 7\ 12\ 2\ 5\ 11\ 13\ 15\ 16\ 3\ 10\ 4\ 6\ 14\ 9\ 8)$ | $\{0\ 3\ 6\ 2\ 9\ \underline{8}\ 5\ 14\ 15\ 12\ 11\ 13\ 4\ 7\ 10\ 1\}$ |
| $_{16}h_1^5 = (1\ 15\ 9\ 11\ 6\ 2\ 10\ 7\ 16\ 8\ 13\ 14\ 5\ 4\ 12\ 3)$ | $\{0\ 5\ 10\ 14\ 15\ \underline{8}\ 3\ 2\ 9\ 4\ 13\ 11\ 12\ 1\ 6\ 7\}$ |
| $_{16}h_1^7 = (1\ 11\ 10\ 8\ 5\ 3\ 9\ 2\ 16\ 14\ 12\ 15\ 6\ 7\ 13\ 4)$ | $\{0\ 7\ 14\ 10\ 5\ \underline{8}\ 1\ 6\ 3\ 12\ 15\ 9\ 4\ 11\ 2\ 13\}$ |
| $_{16}h_1^9 = (1\ 4\ 13\ 7\ 6\ 15\ 12\ 14\ 16\ 2\ 9\ 3\ 5\ 8\ 10\ 11)$ | $\{0\ 9\ 2\ 6\ 11\ \underline{8}\ 15\ 10\ 13\ 4\ 17\ 12\ 5\ 14\ 3\}$ |
| $_{16}h_1^{11} = (1\ 3\ 12\ 4\ 5\ 14\ 13\ 8\ 16\ 7\ 10\ 2\ 6\ 11\ 9\ 15)$ | $\{0\ 11\ 6\ 2\ 1\ \underline{8}\ 13\ 14\ 7\ 12\ 3\ 5\ 4\ 15\ 10\ 9\}$ |
| $_{16}h_1^{13} = (1\ 8\ 9\ 14\ 6\ 4\ 10\ 3\ 16\ 15\ 13\ 11\ 5\ 2\ 12\ 7)$ | $\{0\ 13\ 10\ 14\ 7\ \underline{8}\ 11\ 2\ 1\ 4\ 5\ 3\ 12\ 9\ 6\ 15\}$ |
| $_{16}h_1^{15} = (1\ 14\ 10\ 15\ 5\ 7\ 9\ 4\ 16\ 11\ 12\ 8\ 6\ 3\ 13\ 2)$ | $\{0\ 15\ 14\ 10\ 13\ \underline{8}\ 9\ 6\ 11\ 12\ 7\ 14\ 3\ 2\ 5\}$ |
| $_{16}h_2 = (1\ 15\ 13\ 2\ 6\ 11\ 10\ 14\ 16\ 3\ 9\ 4\ 5\ 8\ 12\ 7)$ | $\{0\ 3\ 6\ 2\ 1\ \underline{8}\ 11\ 14\ 13\ 12\ 15\ 9\ 4\ 5\ 10\ 7\}$ |
| $_{16}h_2^3 = (1\ 4\ 10\ 15\ 5\ 14\ 13\ 8\ 16\ 2\ 12\ 3\ 6\ 7\ 9\ 11)$ | $\{0\ 9\ 2\ 6\ 3\ \underline{8}\ 1\ 10\ 7\ 4\ 13\ 11\ 12\ 15\ 14\ 5\}$ |
| $_{16}h_2^5 = (1\ 8\ 9\ 14\ 6\ 15\ 12\ 4\ 16\ 11\ 13\ 7\ 5\ 3\ 10\ 2)$ | $\{0\ 15\ 14\ 10\ 5\ \underline{8}\ 7\ 6\ 11\ 12\ 11\ 13\ 4\ 9\ 2\ 3\}$ |
| $_{16}h_2^7 = (1\ 14\ 12\ 11\ 5\ 2\ 9\ 15\ 16\ 7\ 10\ 8\ 6\ 4\ 13\ 3)$ | $\{0\ 5\ 10\ 14\ 7\ \underline{8}\ 13\ 2\ 11\ 4\ 9\ 15\ 12\ 3\ 6\ 1\}$ |
| $_{16}h_2^9 = (1\ 3\ 13\ 4\ 6\ 8\ 10\ 7\ 16\ 15\ 9\ 2\ 5\ 11\ 12\ 14)$ | $\{0\ 11\ 6\ 2\ 9\ \underline{8}\ 3\ 14\ 5\ 12\ 7\ 14\ 13\ 10\ 15\}$ |
| $_{16}h_2^{11} = (1\ 2\ 10\ 3\ 5\ 7\ 13\ 11\ 16\ 4\ 12\ 15\ 6\ 14\ 9\ 8)$ | $\{0\ 1\ 2\ 6\ 11\ \underline{8}\ 9\ 10\ 15\ 4\ 5\ 3\ 12\ 7\ 14\ 13\}$ |
| $_{16}h_2^{13} = (1\ 11\ 9\ 7\ 6\ 3\ 12\ 2\ 16\ 8\ 13\ 14\ 5\ 15\ 10\ 4)$ | $\{0\ 7\ 14\ 10\ 13\ \underline{8}\ 15\ 6\ 9\ 12\ 3\ 5\ 4\ 12\ 11\}$ |
| $_{16}h_2^{15} = (1\ 7\ 12\ 8\ 5\ 4\ 9\ 3\ 16\ 14\ 10\ 11\ 6\ 2\ 13\ 15)$ | $\{0\ 13\ 10\ 14\ 15\ \underline{8}\ 5\ 2\ 3\ 4\ 17\ 12\ 11\ 6\ 9\}$ |

Asymmetric Equivalence Class (Continued)

| | |
|---|---|
| $n = 16$ | $s = 8$ |
| Permutation | Sequencing |
| $_{16}h_3 = (1\ 3\ 7\ 6\ 11\ 15\ 4\ 2\ 16\ 10\ 5\ 9\ 12\ 13\ 8\ 14)$ | $\{0\ 7\ 10\ 5\ 4\ 9\ 15\ 12\ 13\ 14\ 11\ \underline{8}\ 1\ 2\ 6\ 3\}$ |
| $_{16}h_3^3 = (1\ 9\ 4\ 3\ 12\ 2\ 7\ 13\ 16\ 6\ 8\ 10\ 11\ 14\ 5\ 15)$ | $\{0\ 5\ 14\ 15\ 12\ 11\ 13\ 4\ 7\ 10\ 1\ \underline{8}\ 3\ 6\ 2\ 9\}$ |
| $_{16}h_3^5 = (1\ 13\ 5\ 2\ 11\ 3\ 8\ 9\ 16\ 15\ 7\ 14\ 12\ 10\ 4\ 6)$ | $\{0\ 3\ 2\ 9\ 4\ 13\ 11\ 12\ 16\ 7\ \underline{8}\ 5\ 10\ 14\ 15\}$ |
| $_{16}h_3^7 = (1\ 2\ 8\ 15\ 12\ 6\ 5\ 3\ 16\ 14\ 4\ 13\ 11\ 9\ 7\ 10)$ | $\{0\ 1\ 6\ 3\ 12\ 15\ 9\ 4\ 11\ 2\ 13\ \underline{8}\ 7\ 14\ 10\ 5\}$ |
| $_{16}h_3^9 = (1\ 10\ 7\ 9\ 11\ 13\ 4\ 14\ 16\ 3\ 5\ 6\ 12\ 15\ 8\ 2)$ | $\{0\ 15\ 10\ 13\ 4\ 17\ 12\ 5\ 14\ 3\ \underline{8}\ 9\ 2\ 6\ 11\}$ |
| $_{16}h_3^{11} = (1\ 6\ 4\ 10\ 12\ 14\ 7\ 15\ 16\ 9\ 8\ 3\ 11\ 2\ 5\ 13)$ | $\{0\ 13\ 14\ 7\ 12\ 3,5\ 4\ 15\ 10\ 9\ \underline{8}\ 11\ 6\ 2\ 1\}$ |
| $_{16}h_3^{13} = (1\ 15\ 5\ 14\ 11\ 10\ 8\ 6\ 16\ 13\ 7\ 2\ 12\ 3\ 4\ 9)$ | $\{0\ 11\ 2\ 14\ 5\ 3\ 12\ 9\ 6\ 15\ \underline{8}\ 13\ 10\ 14\ 7\}$ |
| $_{16}h_3^{15} = (1\ 14\ 8\ 13\ 12\ 9\ 5\ 10\ 16\ 2\ 4\ 15\ 11\ 6\ 7\ 3)$ | $\{0\ 9\ 6\ 11\ 12\ 7\ 14\ 3\ 2\ 5\ \underline{8}\ 15\ 14\ 10\ 13\}$ |
| | |
| $_{16}h_4 = (1\ 6\ 5\ 9\ 11\ 14\ 4\ 15\ 16\ 3\ 7\ 2\ 12\ 10\ 8\ 13)$ | $\{0\ 11\ 14\ 13\ 12\ 15\ 9\ 4\ 5\ 10\ 7\ \underline{8}\ 3\ 6\ 2\ 1\}$ |
| $_{16}h_4^3 = (1\ 2\ 4\ 6\ 12\ 15\ 5\ 10\ 16\ 9\ 8\ 3\ 11\ 13\ 7\ 14)$ | $\{0\ 1\ 10\ 7\ 4\ 13\ 11\ 12\ 15\ 14\ 5\ \underline{8}\ 9\ 2\ 6\ 3\}$ |
| $_{16}h_4^5 = (1\ 10\ 7\ 15\ 11\ 6\ 8\ 2\ 16\ 14\ 5\ 13\ 12\ 3\ 4\ 9)$ | $\{0\ 7\ 6\ 11\ 2\ 11\ 13\ 4\ 9\ 2\ 3\ \underline{8}\ 15\ 14\ 10\ 5\}$ |
| $_{16}h_4^7 = (1\ 15\ 8\ 14\ 12\ 9\ 7\ 6\ 16\ 13\ 4\ 10\ 11\ 2\ 5\ 3)$ | $\{0\ 13\ 2\ 11\ 4\ 9\ 15\ 12\ 3\ 6\ 1\ \underline{8}\ 5\ 10\ 14\ 7\}$ |
| $_{16}h_4^9 = (1\ 3\ 5\ 2\ 11\ 10\ 4\ 13\ 16\ 6\ 7\ 9\ 12\ 14\ 8\ 15)$ | $\{0\ 3\ 14\ 5\ 12\ 7\ 14\ 13\ 10\ 15\ \underline{8}\ 11\ 6\ 2\ 9\}$ |
| $_{16}h_4^{11} = (1\ 9\ 4\ 3\ 12\ 13\ 5\ 14\ 16\ 2\ 8\ 6\ 11\ 15\ 7\ 10)$ | $\{0\ 9\ 10\ 15\ 4\ 5\ 3\ 12\ 7\ 14\ 13\ \underline{8}\ 1\ 2\ 6\ 11\}$ |
| $_{16}h_4^{13} = (1\ 14\ 7\ 13\ 11\ 3\ 8\ 9\ 16\ 10\ 5\ 15\ 12\ 6\ 4\ 2)$ | $\{0\ 15\ 6\ 9\ 12\ 3\ 5\ 4\ 12\ 11\ \underline{8}\ 7\ 14\ 10\ 13\}$ |
| $_{16}h_4^{15} = (1\ 13\ 8\ 10\ 12\ 2\ 7\ 3\ 16\ 15\ 4\ 14\ 11\ 9\ 5\ 6)$ | $\{0\ 5\ 2\ 3\ 4\ 17\ 12\ 11\ 6\ 9\ \underline{8}\ 13\ 10\ 14\ 15\}$ |

17

$n = 16$    Asymmetric Equivalence Classes (Continued)

$_{16}h_5 = (1\ 2\ 4\ 6\ 12\ 8\ 15\ 10\ 16\ 14\ 13\ 11\ 9\ 7\ 5\ 3)$    $\{0\ 1\ 14\ 3\ 12\ 5\ 10\ \underline{8}\ 7\ 11\ 4\ 9\ 6\ 15\ 13\ 2\}$ $_{16}h_5^3 = (1\ 11\ 15\ 2\ 9\ 10\ 4\ 7\ 16\ 6\ 5\ 14\ 12\ 3\ 13\ 8)$    $\{0\ 3\ 10\ 9\ 4\ 15\ 14\ \underline{8}\ 5\ 11\ 2\ 11\ 2\ 13\ 7\ 6\}$ $_{16}h_5^5 = (1\ 7\ 13\ 10\ 12\ 2\ 5\ 11\ 16\ 8\ 4\ 3\ 9\ 14\ 15\ 6)$    $\{0\ 5\ 6\ 15\ 12\ 9\ 2\ \underline{8}\ 3\ 7\ 4\ 13\ 14\ 11\ 1\ 10\}$ $_{16}h_5^7 = (1\ 10\ 5\ 8\ 9\ 6\ 13\ 2\ 16\ 3\ 15\ 7\ 12\ 11\ 4\ 14)$    $\{0\ 7\ 2\ 5\ 4\ 3\ 6\ \underline{8}\ 1\ 13\ 12\ 15\ 10\ 9\ 11\ 14\}$ $_{16}h_5^9 = (1\ 14\ 4\ 11\ 12\ 7\ 15\ 3\ 16\ 2\ 13\ 6\ 9\ 8\ 5\ 10)$    $\{0\ 9\ 14\ 11\ 12\ 13\ 10\ \underline{8}\ 15\ 3\ 4\ 1\ 6\ 7\ 5\ 2\}$ $_{16}h_5^{11} = (1\ 6\ 15\ 14\ 9\ 3\ 4\ 8\ 16\ 11\ 5\ 2\ 12\ 10\ 13\ 7)$    $\{0\ 11\ 10\ 1\ 4\ 7\ 14\ \underline{8}\ 13\ 9\ 12\ 3\ 2\ 5\ 15\ 6\}$ $_{16}h_5^{13} = (1\ 8\ 13\ 3\ 12\ 14\ 5\ 6\ 16\ 7\ 4\ 10\ 9\ 2\ 15\ 11)$    $\{0\ 13\ 6\ 7\ 12\ 1\ 2\ \underline{8}\ 11\ 15\ 4\ 5\ 14\ 3\ 9\ 10\}$ $_{16}h_5^{15} = (1\ 3\ 5\ 7\ 9\ 11\ 13\ 14\ 16\ 10\ 15\ 8\ 12\ 6\ 4\ 2)$    $\{0\ 15\ 2\ 13\ 4\ 11\ 6\ \underline{8}\ 9\ 5\ 12\ 7\ 10\ 1\ 3\ 14\}$ $_{16}h_6 = (1\ 15\ 13\ 11\ 10\ 8\ 14\ 9\ 16\ 12\ 2\ 4\ 6\ 7\ 5\ 3)$    $\{0\ 10\ 5\ 12\ 3\ 14\ 1\ \underline{8}\ 2\ 13\ 15\ 6\ 9\ 4\ 11\ 7\}$ $_{16}h_6^3 = (1\ 4\ 14\ 15\ 6\ 9\ 13\ 7\ 16\ 11\ 5\ 12\ 10\ 3\ 2\ 8)$    $\{0\ 14\ 15\ 4\ 9\ 10\ 3\ \underline{8}\ 6\ 7\ 13\ 2\ 11\ 12\ 1\ 5\}$ $_{16}h_6^5 = (1\ 7\ 2\ 9\ 10\ 15\ 5\ 4\ 16\ 8\ 13\ 3\ 6\ 12\ 14\ 11)$    $\{0\ 2\ 9\ 12\ 15\ 6\ 5\ \underline{8}\ 10\ 11\ 14\ 13\ 4\ 7\ 3\}$ $_{16}h_6^7 = (1\ 9\ 5\ 8\ 6\ 11\ 2\ 15\ 16\ 3\ 14\ 7\ 10\ 4\ 13\ 12)$    $\{0\ 6\ 3\ 4\ 5\ 2\ 7\ \underline{8}\ 14\ 11\ 9\ 10\ 15\ 12\ 13\ 1\}$ $_{16}h_6^9 = (1\ 12\ 13\ 4\ 10\ 7\ 14\ 3\ 16\ 15\ 2\ 11\ 6\ 8\ 5\ 9)$    $\{0\ 10\ 13\ 12\ 11\ 14\ 9\ \underline{8}\ 2\ 5\ 7\ 6\ 1\ 4\ 3\ 15\}$ $_{16}h_6^{11} = (1\ 11\ 14\ 12\ 6\ 3\ 13\ 8\ 16\ 4\ 5\ 15\ 10\ 9\ 2\ 7)$    $\{0\ 14\ 7\ 4\ 1\ 10\ 11\ \underline{8}\ 6\ 15\ 5\ 2\ 3\ 12\ 9\ 13\}$ $_{16}h_6^{13} = (1\ 8\ 2\ 3\ 10\ 12\ 5\ 11\ 16\ 7\ 13\ 9\ 6\ 15\ 14\ 4)$    $\{0\ 2\ 11\ 2\ 7\ 6\ 13\ \underline{8}\ 10\ 9\ 3\ 14\ 5\ 4\ 15\ 11\}$ $_{16}h_6^{15} = (1\ 3\ 5\ 7\ 6\ 4\ 2\ 12\ 16\ 9\ 14\ 8\ 10\ 11\ 13\ 15)$    $\{0\ 6\ 11\ 4\ 13\ 2\ 15\ \underline{8}\ 14\ 3\ 1\ 10\ 7\ 12\ 5\ 9\}$

I claim:

1. A method of encryption to be performed by a computer, comprising:
   (a) receiving successive blocks of data, each block of data being sub-divided into n sub-blocks of data, where n is an integer, the sub-block being assigned to n individual substitution boxes;
   (b) selecting one of a quick trickle or a quasi quick trickle permutation as a base permutation;
   (c) determining if a set of preselected exponents is to be applied to the base permutation;
   (d) generating the set of preselected exponents from one of a quick trickle or a quasi quick trickle permutation;
   (e)(1) applying the set of preselected exponents to the base permutation if step (c) determines that a preselected set of exponents is to be applied, to obtain a sequence of permutations, otherwise (e)(2) applying an integer k as an exponent to the base permutation for the kth round of encryption to obtain a resulting permutation;
   (f) for each round in a predetermined number of rounds, if (e)(1) is applied, applying a corresponding one of the permutations to the partially encrypted sub-blocks, assigning each partially encrypted sub-block as an input to the substitution box whose number is indicated by the the corresponding one of the sequence of permutations, and if (e)(2) is applied, applying the resulting permutation to the partially encrypted sub-blocks, assigning each partially encrypted sub-block as an input to the substitution box whose number is indicated by the resulting kth permutation; and
   (g) repeating (e) and (f) for the predetermined number of rounds; and
   (h) displaying the encrypted data provided in step (g).

2. The method of claim 1, wherein in (a), n is even.

3. The method of claim 2, wherein in (b), the quick trickle permutation is one in which a totality of spacings from a location of an element i to a location of an element i+1 are all different and constitute a sequencing.

4. The method of claim 3, wherein (b) comprises selecting the quick trickle permutation and generating the quick trickle permutation by:
   providing a sequencing $\{0,a_1,a_2, \ldots ,a_{n-1}\}$ which is a sequence of all of the elements of a group of n elements arranged in such an order that the sequence of partial sums $b_0=0$, $b_1=a_1$, $b_2=a_1+a_2$, $b_3=a_1+a_2+a_3$, $\ldots$, $b_{n-1}$, are all different, which when applied as exponents to a permutation g provides a sequence of permutations $g^0$, $g^{a_1}$, $g^{a_2}$, $\ldots$, $g^{a_{n-1}}$, and where $g^0$, $g^0 \circ g^{a_1}=g^{b_1}$, $g^0 \circ g^{a_1} \circ g^{a_2}=g^{b_2}$, $\ldots$, such that the sequence of exponents $\{0,b_1,b_2, \ldots ,b_{n-1}\}$ is a directed terrace; and
   wherein in step (d) the step of applying the set of preselected exponents comprises the step of applying successive integers of the directed terrace as the set of preselected exponents of the permutation.

5. The method of claim 4, wherein the number of rounds is multiple of n.

6. The method of claim 1, wherein (b) comprises selecting the quasi quick trickle permutation and generating the quasi quick trickle permutation by:
   providing a quasi-sequencing which is a sequence of elements $\{a_i\}$ of a group of n elements $\{0,a_1,a_2, \ldots ,a_{n-1}\}$, where the following occurs: the group element $a_i$ such that $a_i=a_i^{-1}$ occurs once and for each other group element: either (i) $a_i$ occurs twice and $a_i^{-1}$ does not occur, or, (ii) $a_i$ and $a_i^{-1}$ each occurs once, or (iii) $a_i^{-1}$ occurs twice and $a_i$ does not occur; where the group elements are arranged in such an order that the sequence of partial sums $b_0=0$, $b_1=a_1+a_2$, $b_3=a_1+a_2+a_3$, $\ldots$, $b_{n-1}$, are all different, which when applied as exponents to a permutation g provides a sequence of permutations $g^0$, $g^{a_1}$, $g^{a_2}$, $\ldots$, $g^{a_{n-1}}$, and where $g^0$, $g^0 \circ g^{a_1}=g^{b_1}$, $g^0 \circ g^{a_1} \circ g^{a_2}=g^{b_2}$, $\ldots$, such that the sequence of exponents $\{0,b_1,b_2, \ldots ,b_{n-1}\}$ is a terrace; and
   wherein in (d) the step of applying the set of preselected exponents comprises the step of applying successive integers of the directed terrace as the set of preselected exponents of the permutation.

7. The method of claim 1, wherein in (b), the quasi quick trickle permutation is one in which a totality of spacings from a location of an element i to a location of an element i+1 are either different or occur no more than twice and constitute a quasi sequencing.

8. The method of claim 1, wherein in (a), n is odd.

9. The method of claim 1, wherein in (g), the number of rounds is multiple of n.

* * * * *